US008230426B2

(12) United States Patent
Powers et al.

(10) Patent No.: US 8,230,426 B2
(45) Date of Patent: Jul. 24, 2012

(54) MULTICORE DISTRIBUTED PROCESSING SYSTEM USING SELECTION OF AVAILABLE WORKUNITS BASED ON THE COMPARISON OF CONCURRENCY ATTRIBUTES WITH THE PARALLEL PROCESSING CHARACTERISTICS

(75) Inventors: John T. Powers, Lafayette, CA (US); Robert W. Anderson, Oakland, CA (US); Nathan Trueblood, Oakland, CA (US); Daniel Ciruli, Oakland, CA (US)

(73) Assignee: Digipede Technologies, LLC, Lafayette, CA (US)

( * ) Notice: Subject to any disclaimer, the term of this patent is extended or adjusted under 35 U.S.C. 154(b) by 1256 days.

(21) Appl. No.: 11/855,135

(22) Filed: Sep. 13, 2007

(65) Prior Publication Data
US 2009/0049443 A1     Feb. 19, 2009

Related U.S. Application Data

(63) Continuation-in-part of application No. 11/245,952, filed on Oct. 6, 2005, now abandoned.

(51) Int. Cl.
G06F 9/46     (2006.01)
G06F 15/16    (2006.01)

(52) U.S. Cl. .................... 718/102; 718/100; 712/28
(58) Field of Classification Search ............... 712/28
See application file for complete search history.

(56) References Cited

U.S. PATENT DOCUMENTS

| | | | | |
|---|---|---|---|---|
| 5,325,525 A | * | 6/1994 | Shan et al. | 718/104 |
| 5,452,461 A | * | 9/1995 | Umekita et al. | 717/149 |
| 5,887,141 A | * | 3/1999 | Trugman | 709/227 |
| 5,960,200 A | * | 9/1999 | Eager et al. | 717/147 |
| 6,009,455 A | * | 12/1999 | Doyle | 709/201 |
| 6,457,041 B1 | * | 9/2002 | Hutchison | 709/203 |
| 6,499,063 B1 | * | 12/2002 | Chessell et al. | 719/315 |
| 6,505,250 B2 | * | 1/2003 | Freund et al. | 709/226 |
| 6,668,275 B1 | * | 12/2003 | Alsup et al. | 709/208 |
| 7,174,381 B2 | * | 2/2007 | Gulko et al. | 709/226 |
| 7,234,126 B2 | * | 6/2007 | Catthoor et al. | 716/104 |
| 7,395,536 B2 | * | 7/2008 | Verbeke et al. | 718/100 |
| 2003/0061260 A1 | * | 3/2003 | Rajkumar | 709/104 |
| 2003/0120700 A1 | * | 6/2003 | Boudnik et al. | 709/102 |
| 2003/0126260 A1 | * | 7/2003 | Husain et al. | 709/225 |
| 2005/0198634 A1 | * | 9/2005 | Nielsen et al. | 718/100 |

* cited by examiner

*Primary Examiner* — Meng An
*Assistant Examiner* — Abu Z Ghaffari
(74) *Attorney, Agent, or Firm* — Law Office of Jonathan Hollander PC

(57) ABSTRACT

A distributed processing system delegates the allocation and control of computing work units to agent applications running on computing resources including multi-processor and multi-core systems. The distributed processing system includes at least one agent associated with at least one computing resource. The distributed processing system creates work units corresponding with execution phases of applications. Work units can be associated with concurrency data that specifies how applications are executed on multiple processors and/or processor cores. The agent collects information about its associated computing resources and requests work units from the server using this information and the concurrency data. An agent can monitor the performance of executing work units to better select subsequent work units. The distributed processing system may also be implemented within a single computing resource to improve processor core utilization of applications. Additional computing resources can augment the single computing resource and execute pending work units at any time.

25 Claims, 37 Drawing Sheets

All Jobs    List View 220

| ID | Job Name | Priority | Started | Progress | Status | Last Result |
|---|---|---|---|---|---|---|
| 4310 | formatdb | 1 | | 0/1 (0%) | Aborted | |
| 4311 | formatdb 25 | 1 | | 0/1 (0%) | Aborted | |
| 4312 | formatdb 25 | 1 | | 0/1 (0%) | Aborted | |
| 4313 | formatdb 25 | 1 | 8/20/2004 1:14:35 PM | 0/1 (0%) | Aborted | |
| 4314 | formatdb 25 | 1 | 8/20/2004 1:21:04 PM | 0/1 (0%) | Aborted | |
| 4315 | formatdb 25 | 1 | 8/20/2004 1:24:46 PM | 0/1 (0%) | Aborted | |
| 4316 | formatdb | 1 | 8/20/2004 1:55:19 PM | 0/1 (0%) | Aborted | |
| 4317 | format DB 25 | 1 | 8/20/2004 2:23:25 PM | 0/1 (0%) | Aborted | |
| 4318 | format DB 25 | 1 | 8/20/2004 2:32:14 PM | 0/1 (0%) | Aborted | |
| 4319 | format DB 25 | 1 | | 0/1 (0%) | Aborted | |
| 4320 | format DB 1 | 1 | 8/20/2004 2:46:28 PM | 0/1 (0%) | Aborted | |
| 4321 | format DB 1 | 1 | 8/20/2004 3:15:55 PM | 0/1 (0%) | Aborted | |
| 4322 | format DB cmdline test | 1 | 8/20/2004 3:24:09 PM | 0/1 (0%) | Failed | |
| 4323 | format DB cmdline test | 1 | 8/20/2004 3:33:07 PM | 0/1 (0%) | Aborted | |
| 4324 | format DB jd67 | 1 | 8/20/2004 3:56:45 PM | 0/1 (0%) | Aborted | |

MULTICORE DISTRIBUTED PROCESSING SYSTEM USING SELECTION OF AVAILABLE WORKUNITS BASED ON THE COMPARISON OF CONCURRENCY ATTRIBUTES WITH THE PARALLEL PROCESSING CHARACTERISTICS

CROSS REFERENCE TO RELATED APPLICATIONS

This application is a continuation in part of U.S. patent application Ser. No. 11/245,952, filed Oct. 6, 2005, now abandoned, which is incorporated by reference herein for all purposes. This application is related to U.S. patent application Ser. Nos. 11/245,993, now abandoned; 11/245,945, now abandoned; and 11/246,000, all filed Oct. 6, 2005 and incorporated by reference herein for all purposes.

BACKGROUND OF THE INVENTION

The invention relates to the field of parallel processing systems. As enterprises deploy applications with increasing requirements for computation, data handling, and transaction throughput, individual computers are increasingly unable to meet performance demands. Traditional solutions to this problem include use of more powerful servers, such as those including multiple processors, and dedicated clusters of servers.

Distributed computing is a form of computing through which an application may be run on many computers linked via a network. Cluster computing is a particular form of distributed computing through which multiple instances of applications may be executed across a large number of identical computers interconnected via a dedicated communications network. A large computing task is divided into a set of smaller tasks, which are then processed sequentially or simultaneously by the computers in the cluster. Although clusters typically use commodity hardware to control costs, enterprises must spend a great deal of time and money to acquire and maintain large clusters of computers. Additionally, increasing the capabilities of a cluster requires adding more dedicated servers to the cluster and typically requires additional networking hardware and extensive reconfiguration of the software controlling the cluster. Further, software for controlling and optimizing clusters requires significant specialized expertise to develop and maintain.

Some experimental distributed computing systems attempt to harvest otherwise unused computing resources in an enterprise, such as idle desktop computers in an enterprise. However, these systems typically require applications specifically developed for distributed computing environments. Furthermore, configuring, deploying, and maintaining these systems and their applications is difficult and unwieldy. Unlike typical cluster systems with identical computers, enterprises may have a wide variety of computers with vastly different capabilities. If a distributing computing system is poorly designed or misconfigured, the application may overwhelm an enterprise's computers and/or networks, preventing them from performing their primary function and potentially crippling the operations of an enterprise. To coordinate the operations of computers in these types of distributed computing systems, a powerful central server is required. Scalability of the distributed computing system is often limited by the capabilities of the central server. Additionally, security for these distributed computing systems ranges from poor to non-existent. Also, there are poor facilities for monitoring and potentially billing for use of a distributed computing system, limiting the ability of enterprises to allocate costs and realize revenue for executing applications.

Additionally, recent advances in microprocessor designs have made processors with multiple independent processing cores and computing systems with multiple processors much more prevalent. Typically, applications must be specifically engineered to take advantage of multiple processors and multicore processors. For example, applications may have to be specifically engineered to operate using multiple threads of execution to take advantage of multiple processors and multicore processors. In many cases, if an application is not engineered to take advantage of multiple processors and multicore processors, then the extra processors and processor cores will not be utilized by the application.

In many cases, it is difficult or impossible to engineer older or legacy applications to take advantage of multiple processors and multicore processors. For example, an application originally designed to operate on a single processor or processor core may require substantial re-engineering to be adapted to take advantage of multiple processors and multicore processors. For some legacy applications, the source code of the application may not be available for modification.

It is therefore desirable for a distributed processing system to utilize an enterprise's shared and dedicated computing resources flexibly. It is also desirable for the distributed processing system to enable the configuration and deployment of applications, including legacy applications, without conversion or recompilation. It is further desirable for the distributed processing system to be able to match computing tasks with appropriate computing resources to optimize the utilization of available resources and to avoid overwhelming computers and/or networks. It is desirable for the distributed processing system to be readily scalable, to provide security for both computing resources processing data and for the data itself, and to provide metering, pricing, accounting, and billing tools enabling efficient compensation for the usage of computing resources. Additionally, it is desirable for a distributed processing system to specifically take advantage of multiple processors and multicore processors to further improve execution performance of applications.

BRIEF SUMMARY OF THE INVENTION

An embodiment of a distributed processing system comprises intelligent agents and a control server. An agent is associated with each computing resource. The agents are configured to provide information about the computing resource on which they run, such as the processor(s), main memory, network capacity, storage capacity, available software applications and licenses, available local data resources, and other attributes. A computing resource can include one or more processors, with each processor having one or more processor cores, with each processor and processor core capable of executing instructions and processing data independently of the other processors and/or processor cores.

In an embodiment, applications are divided into execution phases that typically include a start-up or initialization phase, an application iteration phase, and a post-processing and shut-down phase. The distributed processing system creates work units corresponding with some or all of these phases. Each work unit is a portion of the application that can potentially be executed in parallel with other portions of the application. For example, each application iteration in the application iteration phase may be a separate work unit. Work units can be associated with concurrency data that specifies how applications are executed on multiple processors and/or processor cores.

In an embodiment of the distributed processing system, agents use information about their associated computing resources as well as concurrency data associated with work units to select work units to be executed. The agents request selected work units from the server and receive work units matching their requests from the server. The agent manages the execution of work units on its computing node, and returns results as specified.

In an embodiment, an agent can monitor the performance of work units executing on a computing resource to generate performance data. The agent can select subsequent work units for execution based on the performance data of similar previously executed work units.

In an embodiment, work units executed in parallel on a computing resource can be executed within a single process or separate processes, depending upon the behavior of the applications associated with the work units. In an embodiment, application hosting behavior is specified for work units to indicate to an agent the most efficient way to execute work units in parallel.

In an embodiment, applications can be associated with properties and/or attributes that define the concurrency and application hosting behavior for the application. In this embodiment, the distributed processing system can automatically evaluate these properties and/or attributes associated with applications and execute the applications in the most appropriate manner.

In an embodiment, concurrency and application hosting behavior is defined in a declarative manner by application developers within the application source code or using attributes defined outside the application. Declarative properties allow developers to "pre-configure" their applications for execution by distributed processing systems. Attributes are useful for legacy applications not originally intended for distributed processing systems where accessing and/or modifying the source code is impractical or impossible.

In a further embodiment, the distributed processing system can be used to improve performance of applications on a single computing resource with multiple processors and processor cores. A combined control server and agent module distributes the work units corresponding to the phases of the application execution to one or more processors or processor cores. Each processor or processor core executes a different instance of the application to process its assigned work units. Because this embodiment is implemented within a single computing resource, it can use faster and relatively lightweight internal communication systems.

In a further embodiment, this single computing resource system can be augmented with additional computing resources at any time. When one or more additional computing resources are added to the pool of available computing resources, an additional agent application associated with each additional computing resource contacts the combined control server and agent module to request work units for execution. In response to requests from additional agent applications, the combined control server and agent module provides work units to the additional computing resources for execution, potentially in parallel with the work units executed by the original computing resource.

BRIEF DESCRIPTION OF THE DRAWINGS

The invention will be described with reference to the drawings, in which:

FIGS. 17A-B illustrate example screen displays of a workbench application according to an embodiment of the invention;

DETAILED DESCRIPTION OF THE INVENTION

An embodiment of the invention is a distributed processing system that delegates the allocation and control of computing tasks to intelligent agent applications running on each of the computing resources. This approach provides the advantage of allowing more flexible control of the computing resources, more efficient allocation of the computing resources, more accurate information about the computing resources available to the distributed processing system, greater scalability of the distributed computing system, and less complex requirements for developing or adapting applications for the distributed computing system.

An embodiment of the distributed processing system includes an intelligent agent, a server, and a set of application programmer interfaces (APIs). The intelligent agent is run on every computer system that can contribute computing resources to the distributed processing system. For example, the intelligent agent can run on each node of a dedicated cluster, or on a shared or dedicated desktop computer, or on a shared or dedicated laptop computer, or on a shared or dedicated server. The server software runs on one or more computers networked in such a way that it can communicate with the intelligent agents.

In another embodiment, a single intelligent agent is associated with a several computers. For example, an agent can be executed by a head node of a computing cluster that includes two or more computers. In this arrangement, the agent coordinates the assignment of distributed computing tasks to all of the computers in the computing cluster. To the distributed processing system, the computing cluster and its single intelligent agent appear as a single computing resource.

The intelligent agents are configured to collect and provide information about the computing nodes on which they run. Each agent takes measurements of the processor, main memory, network capacity, storage capacity, and other attributes of the computing node on which it is installed. The agent uses this information to assess the ability of its computing node to complete jobs and/or work units for jobs posted on the server. The agent manages the execution of work units on its computing node, and returns results as specified by the requirements of a particular job.

Figure 1:
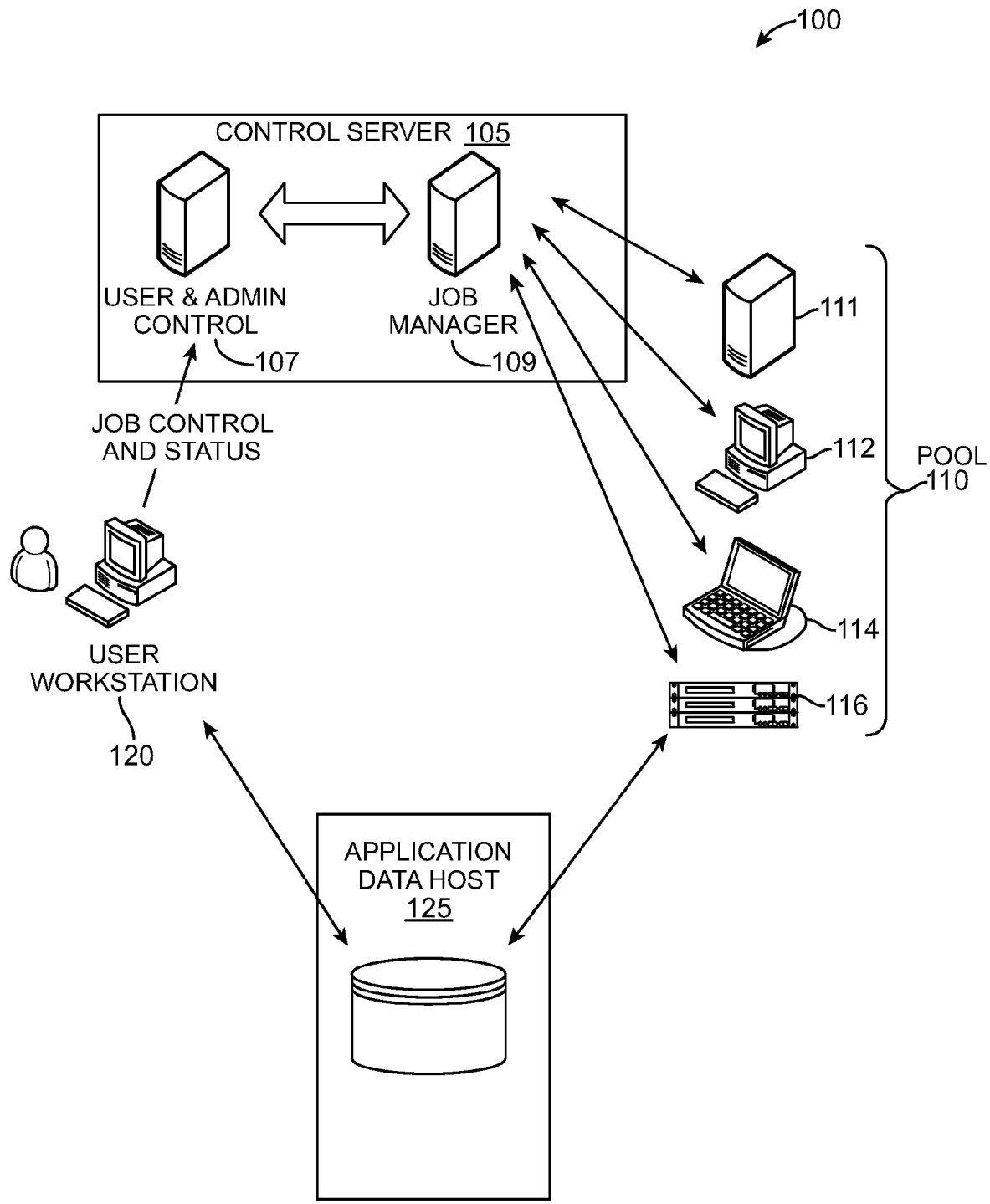
FIG. 1 illustrates a distributed processing system according to an embodiment of the invention.

FIG. 1 illustrates a distributed processing system 100 according to an embodiment of the invention. Distributed processing system 100 includes a control server 105 connected via a communications network with at least one pool 110 of computing resources. Computing resources are computers that are made available to the distributed processing system. Computing resources can include server computers 111, desktop computers 112, laptop computers 114, and nodes within clusters 116. The computing resources can be dedicated for the exclusive use in pool 110 or shared with other pools within the distributed processing system and with other applications outside of the distributed processing system. Furthermore, the computing resources in pool 110 can be allocated dynamically, with computers added or removed from the pool 110 as necessary.

The control server 105 is a software application that supports all of the user control and monitoring required of a distributed computing platform. The control server 105 includes user and administrative controls 107 for managing all user interactions with the distributed processing system 100. In an embodiment, user and administrative controls 107 are provided in the form of a website accessible from one or more user workstations 120. The user and administrative controls 107 provide users with user administration functions and computing resource management functions for defining resource availability; one or more computing resource pools; submission, monitoring and control of computing tasks to be performed by the distributed processing system; and distributed processing system status.

The control server 105 includes job manager 109 that is responsible for managing and allocating computing tasks to the computing resources of pool 110 and any additional pools. In an embodiment discussed in more detail below, a Web services API facilitates communications between the control server 105 and the computing resources of pool 110. The control server 105 also includes a database for the storage of persistent system management data.

Each computing resource includes an agent application that manages its respective computing resource for the distributed processing system 100. In an embodiment, the agent is a small, unobtrusive program capable of operating without interaction from the user, if any, of the computing resource. The agent is capable of downloading and installing updates to itself, and it also manages installation, update, and removal of programs and data on the computing resource.

In an embodiment, users submit one or more jobs to the control server 105 from one or more workstations 120 via the user and administrative controls 107. A job is a computing task to be run on the distributed processing system. Typically, a job can be divided into multiple work units or tasks. Each work unit is typically run on one computing resource in pool 110; however, a work unit may be run on multiple computing resources to guarantee timely work unit completion in desktop environments on shared resources. Typically at least a portion of the set of work units of a job can be executed in parallel by at least a portion of the computing resources of pool 110, enabling the distributed processing system to utilize multiple computing resources to execute the job with vastly increased performance.

During normal operation, each computing resource's agent periodically queries the control server 105 to identify any work units that need to be processed. The agent then selects an appropriate work unit to execute on the computing resource based on factors including the priority assigned to that work unit; the computing resource's capabilities, including processing capability, amount of memory and disk space, available bandwidth, current availability, installed applications and data; and the computing resource's schedule of usage by users, if the computing resource is shared with users. A work unit typically specifies that an application process a set of application data. In an embodiment, upon selecting a work unit, the agent retrieves any required application data either from its persistent local cache or from application data host 125 and starts an instance of the associated application on the computing resource to process the application data.

When the application has completed its processing of the application data, an embodiment of the distributed processing system stores the results of the work unit on an application data host, on the computing resource, on another computing resource, the workstation of the distributed processing system user, or any other data storage device in communication with the distributed processing system. The results from a work unit can be used as application data for additional work units. In a further embodiment, a job includes additional work units to combine results from previously completed work units. Upon completion of its assigned work unit, the agent then notifies the control server 105 that the work unit is completed and can process additional work units in a similar manner. When the control server 105 has been notified that all of the work units associated with a job are complete, the control server 105 notifies the user. Additionally, the control server 105 can notify the user workstation 120 of the location of the job results in application data host 125.

Figure 2:
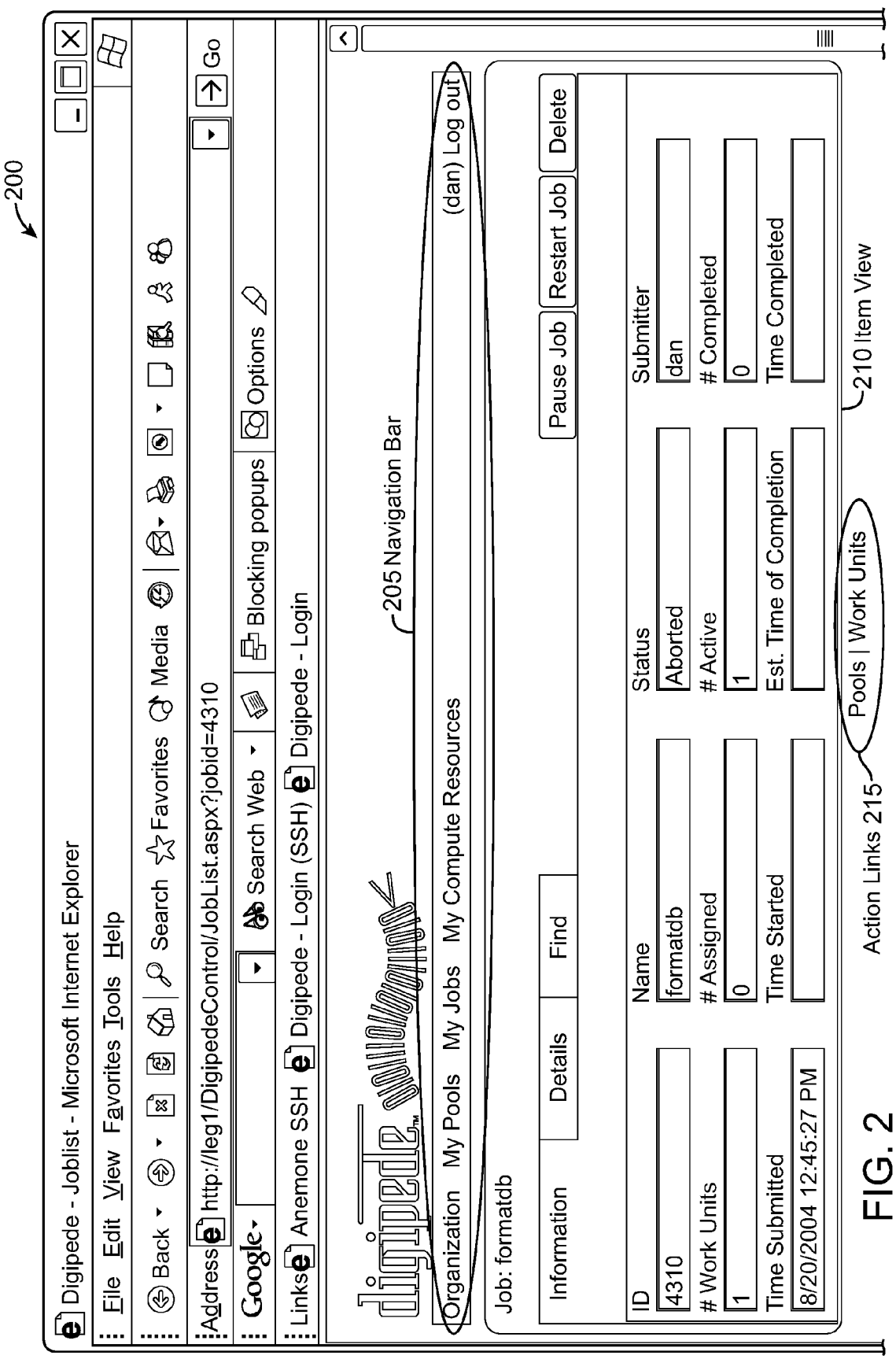
FIG. 2 illustrates a user interface for a distributed processing system according to an embodiment of the invention.

FIG. 2 illustrates a user interface 200 for a distributed processing system according to an embodiment of the invention. In an embodiment, user interface 200 presents the user and administrative controls 107 via a web browser on a workstation such as workstation 120, as discussed above. To access an embodiment of the user interface 200, users must log in with a valid username and password. A login will be valid until the window is closed, the user logs out, or the user interface has been idle for a predetermined amount of time.

User interface 200 includes a Navigation Bar 205, an Item View 210, Related Links 215, and a List View 220. Navigation Bar 205 includes top level links which allow users to navigate to and look at the highest level of information pertaining to the distributed processing system. Within the navigation bar, the "Organization" link directs users to the Organization screen, where users can view information about organization implementing the distributed processing system. Similarly, the "My Pools," "My Jobs," and "My Computing Resources" links enable users to view information on the pools, jobs, and computing resources, respectively, associated with the distributed processing system. In a further embodiment, the Navigation Bar is always visible in the user interface 200 regardless of the information viewed by the user. Additionally, the Navigation Bar includes a "Log out" link enabling users to log out of the distributed processing system, ensuring that no one else will have access to the system using a user's account.

Below the Navigation Bar 205 is the Item View 210. Item view 210 provides information about a single item (e.g., job, pool, computing resource, or work unit) in the distributed processing system. The title of the Item view 210 states type and name of the currently displayed item. In this example, item view 210 displays an item of type "Job" called "formatdb". Item View 210 typically has more than one "tab" of information in them. By selecting the various tabs, users can view more information about the item. In this example, there are three tabs: Information, Details and Find.

Item View 210 frequently includes Action Buttons for initiating functions applicable to the currently displayed item, such as the "Restart Job" button for restarting the example job displayed in item view 210. Additionally, tabs may include actions. For example, the Find tab can include a search action enabling users to locate one or more jobs matching a search criteria.

Related Links 215 navigate users to other screens related to the currently displayed item. For example, in the user interface 200 there are related links for "Pools" and "Work Units." Selecting the "Pools" link takes users to the Pools screen to display only the pools that this job had been submitted on. Similarly, selecting the "Work Units" link would take users to the Work Units screen to display only the work units for this job.

A List View 220 provides general information about a number of items. The user interface shows an example Job, so the List View 220 includes a list of jobs and the several columns of information give high-level details about each item in the list. As items are selected in the list, as indicated by a blue background for the row in this example, detailed information about the selected item is displayed in the Item View 210 above. List view 220 can separate long lists of items into "pages," with a control enabling users to view each page.

In a further embodiment, list view 220 includes a find function to "filter" the items being listed or to find a particular item. For example, users can filter by the name of the job, by the submitter, or by the status. The user interface filters the items in list view 220 by the filter criteria provided by the user and displays the resulting filtered list in the List View 220. In this form, the title of the List View will change to indicate that the list is filtered (e.g., from "All Jobs" to "Find Results"). List View 220 also enables users to sort the items being listed by selecting a column header (e.g., "ID," "Job Name," "Priority," etc.) to sort the column in ascending order or descending order.

To use an embodiment of the distributed processing system, user interface 200 enables users to submit jobs to be processed. An embodiment of the user interface 200 allows users to upload a job submission file specifying a job to be performed. In a further embodiment, the job submission file is a XML format data file. The job submission file can be created manually by a user or generated automatically using an application to fill in a predefined template. To submit a job on a pool using user interface 200, the user selects the desired pool in the Pool List View 220. When the pool has been selected, the user activates the "Submit Job" tab and inputs the full path to a valid Job Submission XML file. A new job will be created in accordance with the job submission file and submitted on the selected pool.

Figure 3:
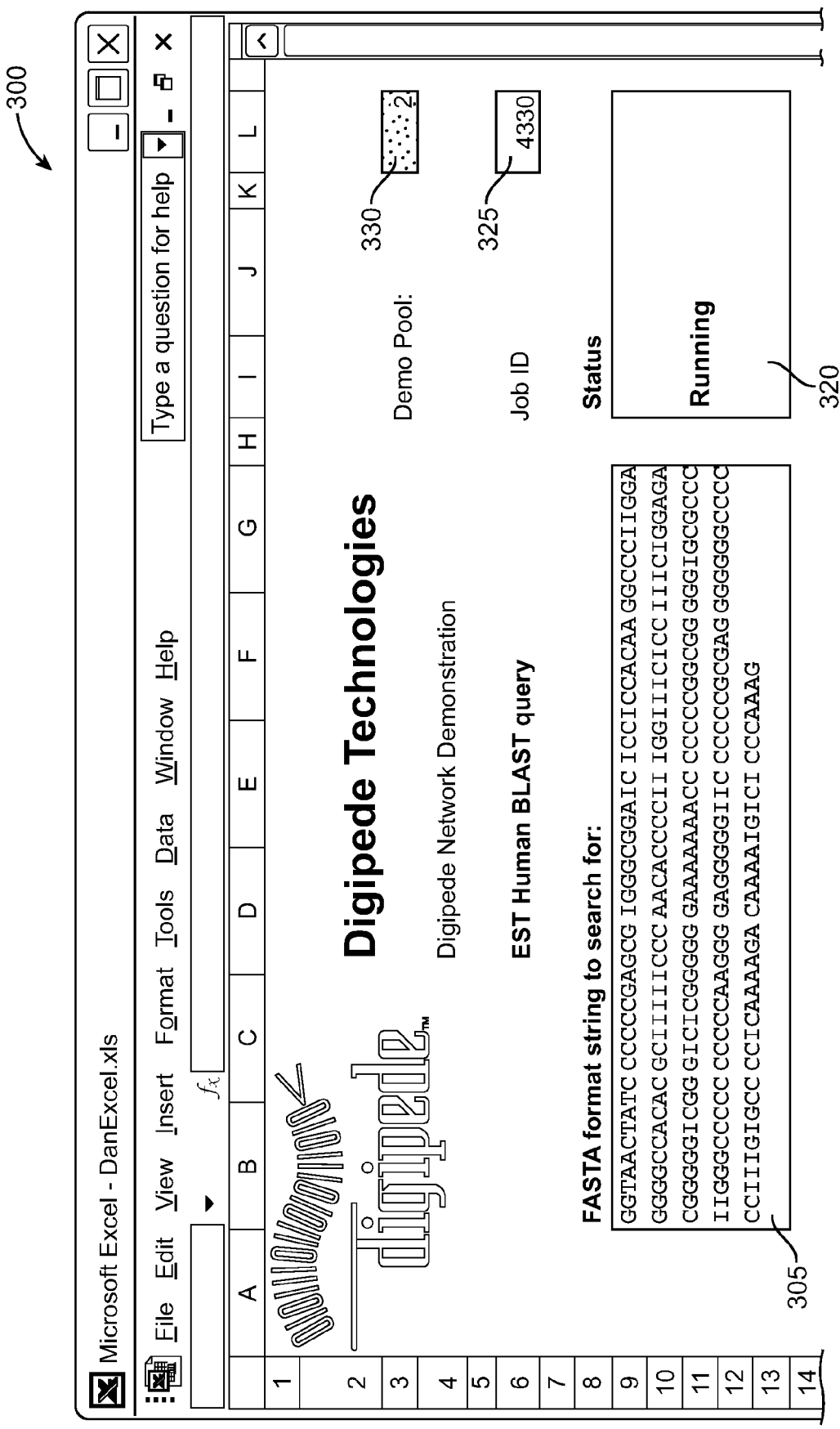
FIG. 3 illustrates an example custom application user interface adapted to utilize an embodiment of the invention.
Figure 3:
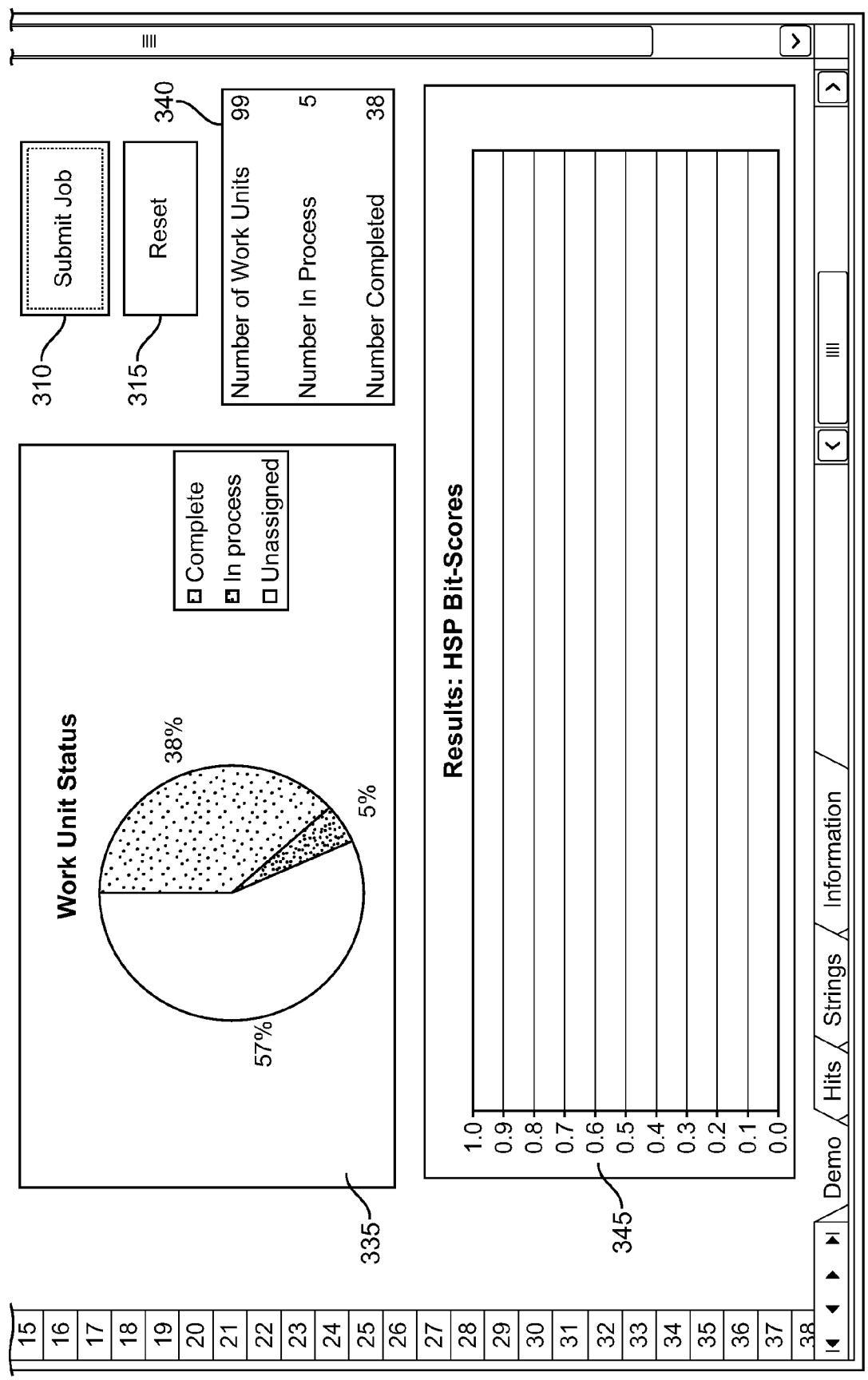

In a further embodiment, job submission files can also be created using a custom designed user interface tailored to specific applications executed by the distributed processing system. FIG. 3 illustrates an example custom user interface 300 according to an embodiment of the invention. Custom user interfaces can be created in any programming or scripting language running on any type of environment. For example, custom user interface 300 is implemented within a spreadsheet application such as Microsoft Excel using the spreadsheet application's built-in programming language and user interface widgets. Example custom user interface 300 is adapted to operate NCBI BLAST, a genetics application, within the distributed processing system. However, custom user interfaces can be similarly created for any other application.

User interface 300 includes an input field 305 adapted to receive application input from a user. In this example, the application input is a genetic sequence to be searched for by the distributed processing system in a genetic database. After providing application input in field 305, the user selects the submit job control 310 to submit the job to the distributed processing unit. The user interface 300 generates a job submission file including the application input provided by the user and communicates this job submission file to the control server. A reset control 315 allows the user to discard the application input and submit a new job. In an embodiment, the user interface 300 and the control server of the distributed processing system communicate using a Web services interface, for example using XML, SOAP, and WSDL. In a further embodiment, the user interface 300 employs the distributed processing system API through the distributed processing framework using Microsoft.NET or COM, User interface 300 includes several status indicators to provide users with information on the progress of a pending job. Status indicator 320 displays a text message on the status of the currently submitted job. Status indicators 325 and 330 display a job ID number for the currently submitted job and a pool ID number for the pool that will execute the currently submitted job. Chart indicator 335 displays a graphical representation of the progress of the currently submitted job. Status indicator 340 displays more detailed text messages indicating the progress of the currently submitted job. Status indicators 320, 325, 330, 335, and 340 use status information retrieved by user interface 300 from the control server. In an embodiment, status information on one or more jobs can be retrieved using a Web services interface. As discussed in detail below, the control service receives status information from one or more agent applications while their respective computing resources are processing jobs.

Output display 345 presents the results of a job to a user. In an embodiment, the interface 300 receives an indication that a job is complete from the control server of the distributed processing system and then retrieves the results from an application data store, as described above.

Figure 4:
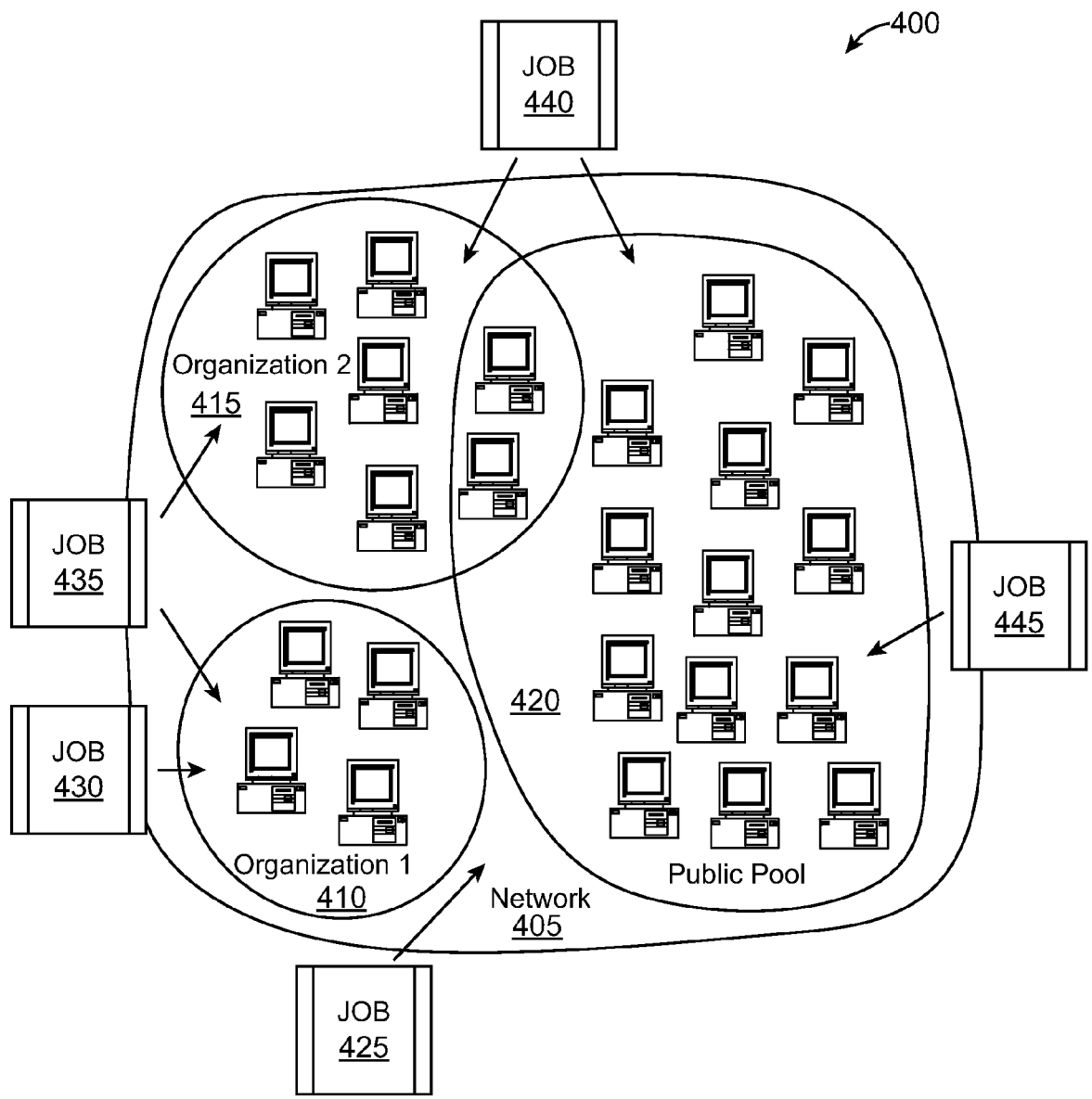
FIG. 4 illustrates an example set of pools of computing resources according to an embodiment of the invention.

FIG. 4 illustrates an example set of pools of computing resources 400 according to an embodiment of the invention. As discussed above, a pool is a group of computing resources that can work together on a job. Computers can be grouped into pools according to department (e.g., "Accounting Pool"), location ("$2^{nd}$ floor servers"), capabilities ("Systems faster than 1 GHz") or any other grouping. The set of pools 400 includes a root pool 405 including every computing resource connected with the network. In an embodiment, the root pool 405 provides a platform for execution of distributed processing testing jobs and an underlying channel with which to communicate to every agent. The set of pools 400 also includes Organization 1 pool 410, Organization 2 pool 415, and a public pool 420. As illustrated in FIG. 4, computers can belong to more than one pool. For example, some of the computing resources in Organization 2 pool 415 are also included in the public pool 420.

Jobs can be assigned to pools in a number of different configurations. Job 425 is assigned to the entire root pool 405. An embodiment of the distributed processing system restricts the type of jobs that can be executed by the root pool 405 to prevent misuse. Job 430 is an example of a job that is constrained to a specific Pool, such as pool 410. An example of application for this type of job would be an office or enterprise interested in harvesting their own idle computing resources without using any outside computing resources. Job 435 is an example of a job that can be run on computing resources across multiple pools, such as pools 410 and 415. An application of this example could be two companies or related entities that have a shared trust relationship and allow jobs to run on computing resources in their offices. Job 440, like job 435, runs in multiple Pools. Job 440 uses the computing resources of a public pool 420 in addition to a private pool 415. An application of this example would be a computing resource service provider leasing access to public pool 420 to customers that need additional computing resources. Job 445 is an example of a job that runs on computing resources in a public pool 420.

Figure 5:
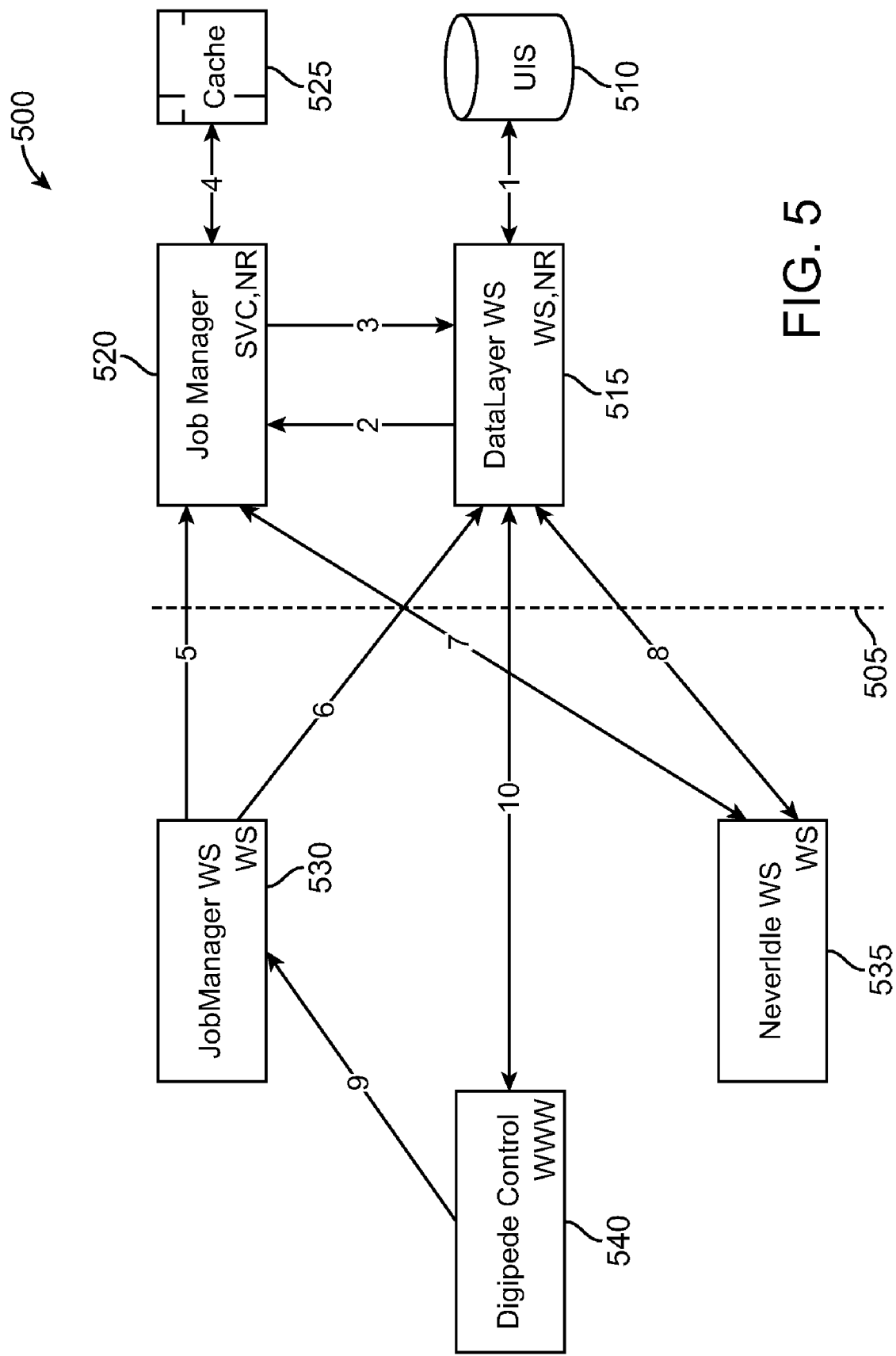
FIG. 5 illustrates a control server for a distributed processing system according to an embodiment of the invention.

FIG. 5 illustrates a control server 500 for a distributed processing system according to an embodiment of the invention. The Control server 500 is made up of several components. In an embodiment, the components to the left of the dashed line 505 are accessible through internal or public networks, while those to the right of dashed line 505 are for internal use only. Control server 500 includes a database 510 for storing information related to the configuration, administration, and operation of the distributed processing system. In an embodiment, the database 510 is implemented with Microsoft SQL Server.

The datalayer service 515 manages access to the database 510. The datalayer 515 provides data to calling applications as well as provides an asynchronous update mechanism for the Job Manager to "lazily" update data. In an embodiment, the datalayer service 515 also acts as an authentication service for all external access and performs caching to improve database 510 performance. The datalayer 510 also can convert between different data object types and database table formats, if necessary.

Job Manager 520 manages all active jobs and work units in the distributed processing system by assigning work units to agents in response to their requests. Job Manager 520 fetches and stores all persistent data in the database 510, accessed via datalayer 515. Job Manager also uses cache 525 for temporarily storing persistent data.

An embodiment of the job manager 520 includes an availability store that stores information on the current status of all active computing resources. This embodiment also includes a work unit store for tracking active work units available for assignment to agents. A status updater updates newly acquired status information from agents to the availability store. If the computing resource associated with an agent's status information is new or being reintroduced to the availability store, data associated with the computing resource is fetched from the database 510. The job manager 520 includes an allocator responsible for assigning work units (and by extension, their associated applications) to specific computing resources. The job manager 520 includes a cleaner responsible for detecting stale work unit assignments and computing resources and doing the appropriate cleanup action including work unit reassignment when necessary. It is also responsible for crediting work unit completion back to the central database. The job manager also includes a stager responsible for bringing work units into the work unit store. In a further embodiment, the job manager facilitates job scheduling through communication with the agents about job and work unit priority levels, and may reserve time on specific pools or computing resources for specific jobs or work units. The job manager may make use of availability forecasts developed by the agents to further improve system throughput.

Job manager Web service 530 provides an interface for job submission and control. Job manager Web service 530 can be utilized by user interfaces such as interfaces 200 and 300 discussed above. Job manager Web service 530 communicates control signals to the job manager 520 and application control data and other data submissions relating to job definition and control to datalayer Web service 515.

The NeverIdle Web service 535 is the control server-side component for communicating with agents running on computing resources. The NeverIdle Web service 535 communicates with the job manager 520 to relay work unit requests and work unit status update messages from agents. The NeverIdle Web service 535 also communicates JobTable, preferences, user messages, agent versions, agent registrations, and agent status data with the datalayer Web service 515.

In an embodiment, the NeverIdle Web service 535 provides a custom API facilitating interaction between agents and the control server. In this embodiment, the NeverIdle Web service 535 functions as a gateway between the control server and agents, passing through messages. The NeverIdle Web service 535 routes messages to the various components of the control server as required by the message content, in some cases requiring duplication. In a further embodiment, the NeverIdle Web service 535 can cache data as appropriate to reduce unnecessary calls against the database.

In an embodiment, NeverIdle Web service 535 messages can include user preferences and operations, such as adding or removing a computing resource associated with an agent from a pool. NeverIdle Web service 535 messages can also include diagnostic information, such as service failures, and general logging information. The NeverIdle Web service 535 messages can include AgentCheckIn messages, which are requests from an agent for a list of available jobs; GetWork messages, which are requests from an agent for a specific work unit; NotifyWorkResult messages, which inform the control server of the status or results of an assigned work unit; and corresponding result messages.

The distributed processing system control 540 provides an interface, such as interface 200, for system wide control and monitoring of the distributed processing system. As discussed above, the interface can include a portal web page through which users can stage, launch, review, and control jobs. The distributed processing system control 540 communicates controls signals via the job manager Web service 530 and job data, such as pool and job ID numbers and status information, via the datalayer Web service 515.

Agent applications run on each individual computing resource and coordinate with the control server to process the work units comprising a job. The agent is responsible for monitoring the capabilities and availability of its associated computing resource; selecting appropriate work units for processing; transferring and installing applications and data for processing work units when necessary; launching and monitoring applications that process work units; and transferring the results once the application is complete. In a further embodiment, the agent includes a self-update mechanism to ease system maintenance and a metering mechanism for accounting for computing resource usage. An additional embodiment of the agent includes or can interface with a software license management mechanism that ensures applications executed by the distributed processing system comply with software license restrictions.

When running on a shared computing resource, such as a user desktop, an embodiment of the agent is adapted to be completely unobtrusive to the primary user of the computing resource by processing distributed processing work units as background tasks, with little or no interference to the primary user of the computing resource. In an embodiment, the agent runs as a service in the Microsoft Windows operating system. The agent can be hidden from the primary users of a computing resource or alternatively include a user interface enabling primary users to adjust the operation of the agent, or disable the agent, thereby removing the computing resource from the distributed processing system.

Because this embodiment uses distributed agents to control the allocation and processing of work units, the distributed processing system has tremendous flexibility and scalability for a broad variety of applications. Increasing the number of computational resources does not substantially increase the burden for the control server. Additionally, the distributed processing system allows for significant flexibility in how jobs are defined. A job can be a process triggered by a single hit to a Web site, such as a complicated or data intensive operation that would be a significant burden for a traditional centralized web server. Alternatively, the distributed processing system can define a job as a collection of thousands of different financial model simulations, such as those used for Monte Carlo analysis or other analysis techniques. The distributed processing system is readily adaptable to a wide number and variety of jobs, ranging from numerous jobs each requiring only a few seconds of processing to single jobs requiring hours or days of processing time.

Figure 6:
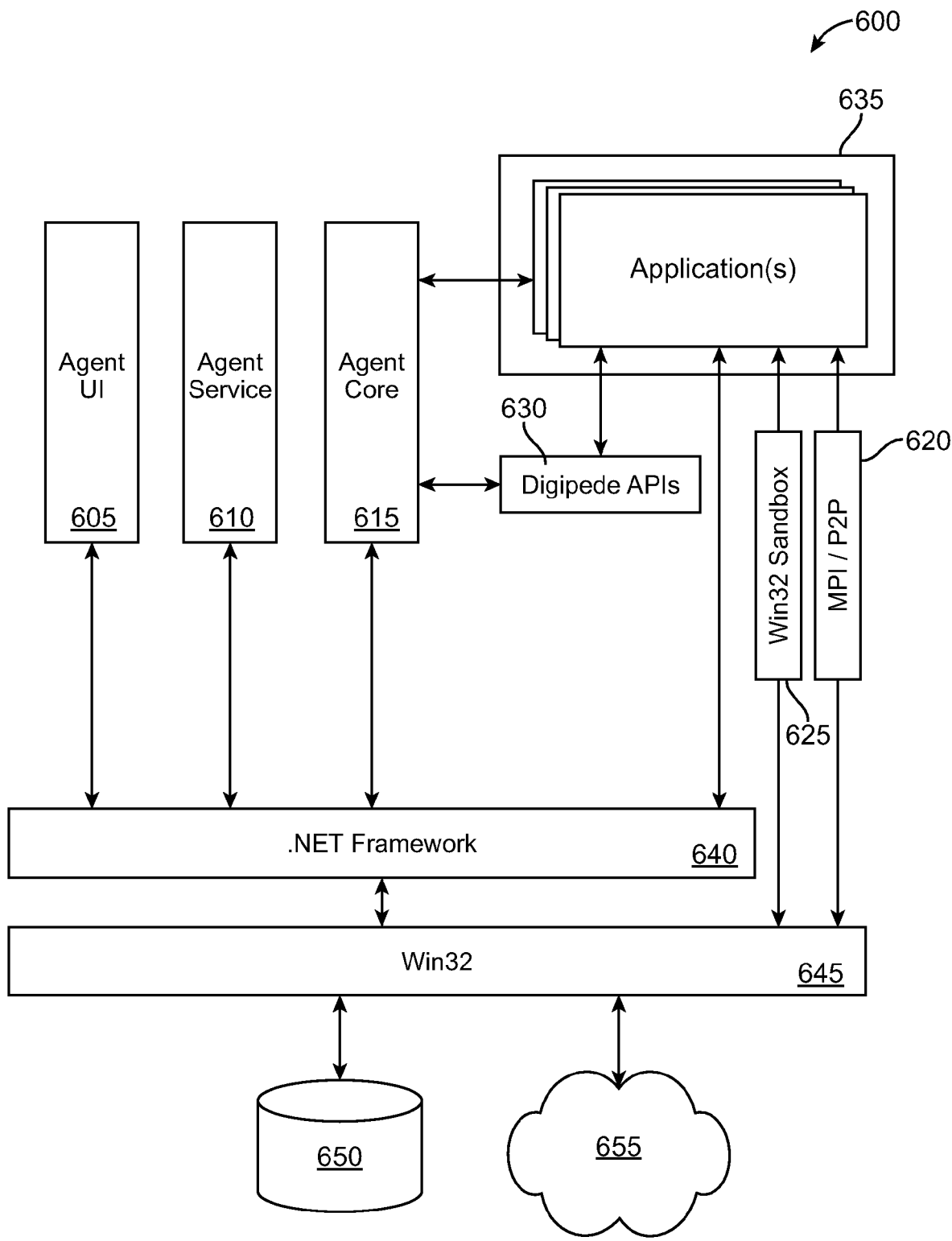
FIG. 6 illustrates the architecture of an agent application for a distributed processing system according to an embodiment of the invention.

FIG. 6 illustrates the architecture of an agent application 600 for a distributed processing system according to an embodiment of the invention. The architecture 600 includes an agent user interface module 605, which enables primary users to disable the agent and thereby remove the computing resource from the distributed processing system, an agent service module 610, and an agent core module 615. In an embodiment, modules 605, 610, and 615 are .NET assemblies for use with the Microsoft .NET framework. Accordingly, an embodiment of the architecture also includes a .NET Framework 640 for executing these modules.

An embodiment of the architecture 600 also includes MPI/P2P module 620, Win32 Sandbox module 625 and APIs 630. APIs 630 and agent core module 615 are interfaced with one or more applications 635 used to process work units. Additionally, through standard operating system calls, such as Win32 API functions on the Microsoft Windows operating system, the agent architecture 600 provides applications 635 with access to various resources 655 on the network. For instance, applications 635 may need to utilize a database 650 that resides on another computer on the network, or may need to directly read or write files to or from a server on the network.

MPI/P2P Module 620 provides two communications frameworks that enables the distributed processing system to host applications that utilize MPI and P2P communications. There is a class of distributed computing problems (sometimes referred to as "chatty applications") in which, though not coupled tightly, the work units are not entirely independent. For these chatty applications, there needs to be some level of communication between the applications hosted on different computing resources to process their respective work units. To facilitate this communication, the distributed processing system allows the hosted application to utilize the Windows MPI (the Message Passing Interface), which is a form of P2P (peer-to-peer) communication, to communicate with computing resources that are processing different work units.

The Win32 Sandbox module 625 enables the agent to protect its computing resource from distributed applications that might cause harm (both intentionally and unintentionally) by running the application in a protected area (a "sandbox").

Figure 7:
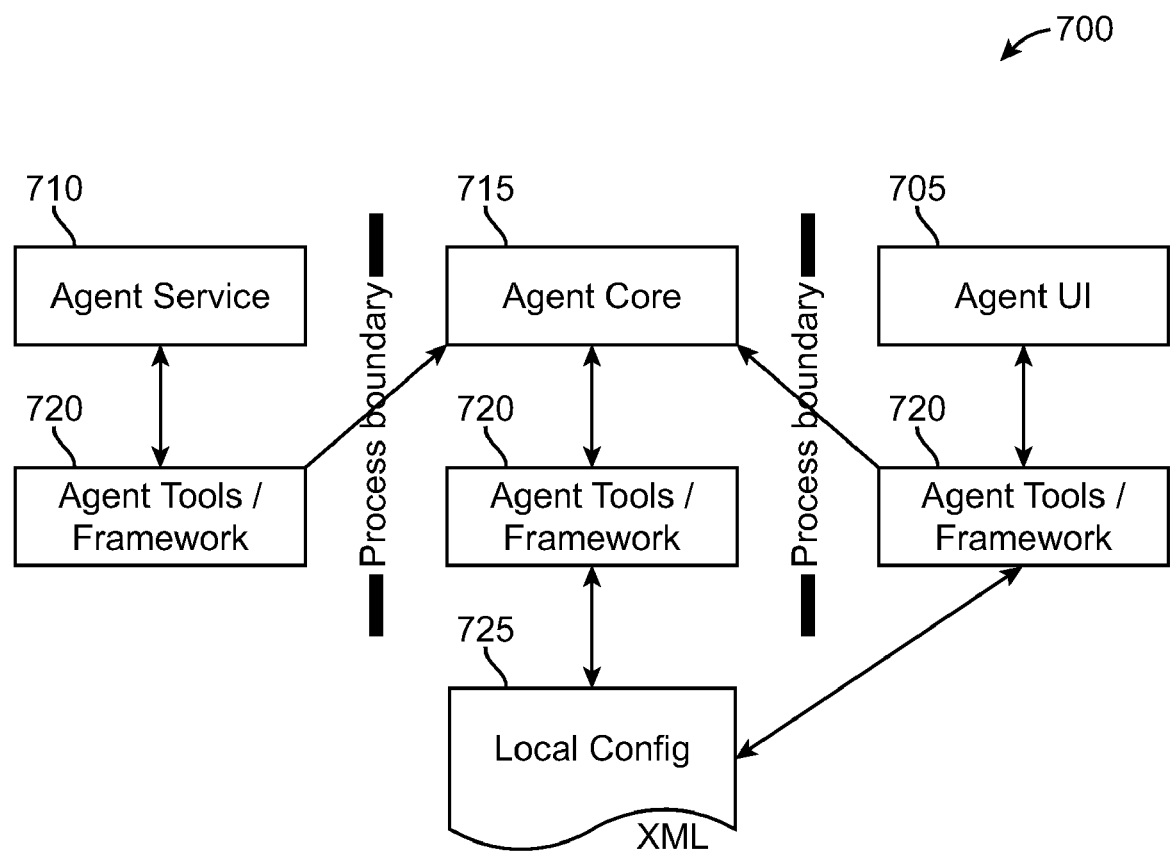
FIG. 7 illustrates the components of an agent application for a distributed processing system according to an embodiment of the invention.

FIG. 7 illustrates the components of an agent application 700 for a distributed processing system according to an embodiment of the invention. Agent application 700 includes user interface module 705, a NeverIdle Service module 710, and an agent core module 715. The user interface module 705 handles communications with the primary user of the computing resource. The NeverIdle service module 710 is adapted to interact with the NeverIdle Web service provided by the control server discussed above. In an embodiment, the NeverIdle service module is implemented as an operating system service that can execute without requiring a user to be logged in to the computing resource.

The agent core module 715 is adapted to determine the capabilities and availability of the computing resource running the agent. In an embodiment, the agent core module uses standard operating system mechanisms, for example the Windows Management Instrumentation (WMI) in Microsoft Windows, to detect the capabilities of the computing resource. The agent core module 715 manages the activities of the distributed processing system of the computing resource, including fetching descriptions of available work units from the control server and applications and data required to process work units, and communicating work unit results.

The agent core module 715 also monitors the activity of the computing resource to determine availability. For example, the agent core module 715 can determine periods when the computing resource is heavily used by the primary user and thus unavailable for processing work units from the distributed processing system. Conversely, the agent core module 715 can determine periods when the computing resource is lightly used or idle and thus available for processing work units from the distributed processing system. In a further embodiment, the agent core module 715 can predict availability of the computing resource based upon past patterns of usage of that computing resource. The predicted availability can then be used by the agent core module 715 in selecting appropriate work units to execute.

The user interface module 705, a NeverIdle Service module 710, and an agent core module 715 are each interfaced with an instance of a shared tool module 720. Shared tool module includes functions shared by the modules to allow for binary reuse. Additionally, shared tool module 720 includes functions for managing agent configuration and for communications between the modules. The configuration of the agent is stored in local configuration file 725, which in an embodiment can be in XML format. The local configuration file 725 includes local user preferences and configuration information. In an embodiment, information in local configuration file 725 is encrypted to prevent tampering.

An embodiment of the agent can further include an updater that enables the agent to update itself to the latest version without any user intervention. The agent periodically contacts the control server to see if there is a new version of the agent available, presenting the agent version and any other information necessary for the control server to determine whether a new version is available. When the control server informs the agent that a new version of the agent is available, the agent will initiate the download of a new version. After the agent has successfully completed the download of the new files, it will initialize a new object in agent core module 715 to start the updater.

As discussed above, one task of the agent is selecting appropriate work units for execution by the associated computing resource. In an embodiment, the agent selects appropriate work units by comparing attributes specifying the capabilities of the computing resource with attributes specifying the requirements of a work unit. The set of attributes associated with a computing resource can include: a computing resource ID, which is a unique identifier for computing resources within the distributed processing system; a set of pool ID, which identify the pools that the computing resource belong to; the default application, if any, installed on the computing resource for processing work units; downtime, which is the scheduled downtime of the computing resource; availability, which is the percentage of processor time available when the computing resource is idle; agent update, which specifies whether automatic updates of the agent on the computing resource are permitted; and sleep parameters.

In the event a computing resource is a shared resource, the agent can share the computing resource between its primary user and the distributed processing system. In an embodiment, the agent can run work unit processes at a lower priority than the primary users' normal processes. In this way, the computing resource can be used even while a primary user is using the machine—the distributed processing system applications run unobtrusively "in the background," only using computing power not needed by the primary user. In a further embodiment, the agent utilize the computing resource for processing work units according to a schedule (e.g. "Never run jobs from 9 to 5."). These two embodiments can be combined, so that the agent does not run jobs during periods dictated by the schedule, and outside of those periods runs jobs at a low priority.

In a yet a further embodiment, the agent can be set to only run jobs when the computing resource is idle (that is, when the agent detects that no one is using the machine). In this case, the agent is programmed to detect when the machine is idle (for example, when the primary user has not moved the mouse or pressed any key on the keyboard), wait a specified time, then begin processing work units. The "Sleep parameters" discussed above indicate how long the agent must wait after detecting an idle resource before it starts performing work.

The set of attributes can also include information about the hardware and software configuration of the computing resource, such as the CPU type, CPU speed, network connection speed, available memory and disk storage, operating system, and installed applications. In an embodiment, the agent uses Windows Management Instrumentation (WMI) in Microsoft Windows to detect such information.

Similarly, attributes specifying the requirements of a work unit can include: a Work unit ID, which uniquely identifies a work unit within a job; a sequence, which indicates if this work unit has been assigned to another agent previously and which agent this was; a name, which is human-readable text that identifies this work unit; a Job ID, which uniquely identifies the job including this work unit; one or more File Override, which indicate that files should be overridden (on input or output) and indicates the names of the files to be used for this particular work unit; and one or more substitution attributes, which provides key/value pairs for a command-line substitution that occurs for each work unit. As example of a substitution attribute, the command line for a job could be specified as "process_db [dbname]". The identifier "[dbname]" is a substitution key. For each work unit, there would be a substitution with the key "dbname" and a differing value, (e.g., "database001"). There may be more than one Substitution for each work unit.

Additionally, each work unit can include attributes with values inherited from its associated job. In an embodiment, these attributes include: a priority value, specifying the importance of the job; an affinity, indicating one or more pools that can or must process the work unit; minimum hardware, software, and data requirements for processing the work unit.

The agent retrieves a list of available work units from the control server and selects a work unit matching the availability and capabilities of the computing resource. In an embodiment, the agent checks in with the control server via the NeverIdle Web service and requests a list of active jobs and available work units for the pools on which the agent is registered. The Job Manager responds with a "job table"—a list of all of the active jobs and available work units on those pools (along with which pools the jobs are on). The job table includes the length of time that each work unit of a job is expected to take and the requirements each work unit has (in terms of software, memory, disk, processor family and processor speed). In a further embodiment, the job table has unique versions as the active jobs on a pool change over time. When the agent already has a copy of a previous version of the job table, the control server can dramatically reduce the network traffic required by providing agents with a set of changes from the previous version of the job table instead of a complete table.

The agent processes the job table and creates a list of requested jobs and work units it would like to work on in the order it prefers. In creating a job request list, the agent evaluates the job table and rules out jobs or work units for which it does not meet the requirements. The agent also takes into account its work schedule and the length of time necessary for work units. The agent can rule out work units that might violate its schedule, for example if work units take 2 hours and computing resource only has 30 minutes to do work before it goes offline. Additionally, the agent will rank the remaining jobs of the job table in terms of the pools that they run on. Each computing resource assigned to multiple pools can prioritize work from one pool over another pool. For example, a computing resource can be set up to always run jobs on pool 3 if they exist before running jobs on pool 4.

The agent sends a list of requested jobs and work units that it wishes to work on back to the Job Manager on the control server through the NeverIdle Web Service. The Job Manager processes the list and decides which of the requested work units to assign to the requesting agent based on the following criteria:

a. It weights the release of work units based on the priority given to the job at submission time. This weighting is configurable. The default weighting allows the Agent to perform most of the work involved in choosing the appropriate job, yet allows the Job Manager enough control to ensure that starvation doesn't occur for lower priority jobs.
 b. The Job Manager can adjust the weighting based on several influences: the amount of time until a job is completed, etc.
 c. The Job Manager can take into account systemwide limits—how releasing work units will affect network utilization, and whether or not releasing work units will result in over-utilization of any particular Data Resource (e.g., regarding bandwidth, client access licenses, and software licenses).

The Job Manager releases one or more work units to the agent.

In another embodiment, some or all of this weighting is performed by an agent, running on a computing resource, rather than the Job Manager running on the control server. In some of these embodiments, the agent performs a weighting of available jobs and work units based on job priority, the computing resources' capabilities, availability and typical usage patterns, shared or common applications and/or data already loaded on or readily available to the computing resource, and other types of affinity information. The agent produces a ranking of available jobs and work units from this analysis. This ranking is presented to the control server, which then attempts to assign work units to the agent in accordance with its ranking.

Once an agent selects or is assigned a work unit to process, the agent begins staging the data required for processing the work unit. In an embodiment, the agent organizes work unit data to support Application-required file structures, to support local caching, and to support file versioning. The agent supports whatever file organization is required by any given Application. For example, an Application called "foo.exe" might require the following structure (while some other Application might require something completely different):

| File | Location (relative) | Description | Applies To |
|---|---|---|---|
| "Foo.exe" | "." | Main application executable | Job |
| "FooTool.dll" | "." | Support DLL | Job |
| "ModParm.dat" | "dat" | Model Parameters | Job |
| "in.dat" | "dat" | Input data | Work Unit (must be renamed to "in.dat" before exec) |
| "out.dat" | "dat" | Output data | Work Unit (must be renamed to something else after exec) |

The description of this structure is contained in an Application Structure object. This object references a list of File objects that identify each file required by the Job. Note that individual Files may be placeholders for actual files. For example, in the above example, the File for "Foo.exe" clearly specifies a specific file, but in the case of the input file "in.dat", the relating File merely points to the required existence of such a file because the exact file depends on the Work Unit being executed. In this example, the file will need to be accessed from a local cache of persistent data or downloaded from a remote server and renamed to "in.dat" for local use.

Local caching is used so that agents can reuse job- or application-specific files for processing multiple work units. In the above example, the first three files ("Foo.exe," "FooTool.dll," and "ModParm.dat") are necessary for every run of the application and should be cached to avoid redundantly downloading on the computing resource. Additionally, if a new Job is created that is structurally identical to a previous job, then the agent can reuse the files that it has already downloaded. An example of this situation occurs as users run new Jobs that differ from previous jobs only in their Work Units. Local caching is managed through the sharing of Application objects across Jobs. Each Job references a specific Application Structure that defines its storage requirements.

Versioning enables agents to take advantage of caching when a Application Structure changes only slightly. For example, if a subsequent Job is structurally the same as the example above, but "ModParm.dat" has been updated, it is useful for a new Job to take advantage of Agents that already possess the other files from the previous run. Versioning is supported by a combination of Application Structure versioning (called the A Version) and individual File versions. Because the same filename might exist across different Application Structures, the system does not use the filename alone as a unique identifier. For example, different applications might both have a "modelparm.dat" file, which are different despite the same name. In an embodiment, the agent uniquely identifies files using a combination of the AID (Application ID), the ItemID, and the RemoteName. In a further embodiment, network traffic can be further reduced by having the server components create a "difference" file between two versions of a file for transport to the agent. In the event of minor changes to a file in the Application Structure, transporting this "difference" may result in far less network traffic than transporting an entirely new file.

To identify the file structure required for a Job, the JobInfo object references an Application Structure object through the AID and A Version fields. In turn, the Application Structure identifies to the Agent what files are necessary to run the Job, where the files need to be stored, from where the files need to be fetched, and to where results need to be sent. The Application Structure includes miscellaneous header information, such as whether the Application Structure is for a Job or for the Agent installation, and a list of Files, each one identifying a particular "slot" in the entire structure required for the Job. Each element includes information about the local and remote filenames, the relevance of the data, the direction in which the data need be transferred, as well as other information. It also contains an identifier that can be used to determine the remote location for the file using the FileRemoteLocations list.

The Application Structure also includes a list of FileRemoteLocations, each one identifying a server that can be used for transferring files. The definition of these servers is flexible to allow both data-replication and data-partitioning across multiple servers. If more than one server is identified there, then the Agent can randomly choose a server, for example taking the weighted location value into account. Furthermore, the FileRemoteLocations can be updated during the life of a Job to facilitate the addition, removal, or re-weighting of servers.

In an embodiment, the definition of the Application Structure is intended to define all the files that will be required by a Job during all stages of a Job's lifetime. Each File identifies to which part of the Job's lifetime the related file applies, such as during the Job fetch phase, the work unit fetch phase, or the work unit upload phase.

In an embodiment, the agent stages data for a work unit as follows:

Adding Files to the PackageManager
1. The agent core module determines that an Application Structure needs to be fetched. It notifies a PackageManager (PM) of this event (with AddAgent( ), AddJob( ) or one of the AddWorkUnit functions).
2. Package Manager determines if the Application Structure (of the same version) already exists:
    i. If so, it verifies that it is valid (i.e., all associated FileOverrides exist on disk and confirms size and checksum. If verification fails, the Package Manager will mark the failed files for re-download. Returns to caller.
    ii. If the Application Structure exists in a previous version, then the Package Manager copies the files shared between versions into a new "root" structure and marks the new files for download. Returns to caller.
    iii. If the Application Structure does not exist, then the "root" directory is created and all the new files are marked for download. Returns to caller.

Package Manager Operation
1. Chooses files for transfer (giving priority to results and to files with higher priority). If no files exist, go to sleep and go back to 1.
2. Begin/continue transferring.
3. When a file transfer is completed, check to see if complete:
    a. For a download operation, are all of the required files available (i.e., all JobStructure and Job items for an added Job, all WorkUnit items for a work-unit, etc.). If not, goto 2.
    b. For an upload operation, have all of the required files been sent (i.e., all of the files for which mbIsResult is true). If not, goto 2.
4. Notify the caller that the operation has been completed.

In a further embodiment, the agent is automatically updated using the same Application Structure mechanism.

Once the data required for a selected work unit has been transferred to the computing resource, the agent executes the application and instructs it to process the work unit. In an embodiment, an ApplicationControl class defines how the Agent interacts with an Application. An object of this type is part of the Application Structure. The following table describes different mechanisms available to the agent for controlling applications using Application control API.

| ApplicationAPIType | The Application is controlled by ... |
|---|---|
| CommandLine | ... running an executable or batch job that is associated with the JobStructure. |
| WindowsBatch | ... running a Windows batch job that is associated with the ApplicationControl object. |
| DotNETScript | ... running a C# or VB.NET script that is associated with the ApplicationControl object. |
| DigipedeDotNET | ... using the Digipede.NET Application API to communicate with an executable associated with the JobStructure. |
| DigipedeCOM | ... using the Digipede COM Application API to communicate with an executable associated with the JobStructure. |
| DigipedeMessages | ... using the Digipede Messaging Application API to communicate with an executable associated with the JobStructure. |

For each mechanism, the application control API includes one or more of the following controls.

| ControlType | Identifies ... |
|---|---|
| ApplicationStartType | ... how to launch the application. |
| ApplicationStopType | ... if the application can be stopped gracefully, and if so, how to. |
| ApplicationProgressType | ... if progress can be determined by the application, and if so, how to. |
| ApplicationRestartType | ... if the application can be restarted without losing results, and if so, how to. |
| ApplicationCheckpointType | ... if the application can checkpoint its results, and if so, how to. |
| ApplicationPriorityType | ... how to set the priority of the application. |
| ApplicationResultType | ... how to determine the success or failure of an executed job. |

Although each control mechanism is based on different technology, the Application Control API includes similar sets of controls for each mechanism. The following sections identify the specifics for each of the control mechanism supported by the application control API. Command line is the most basic of control mechanisms. The object.mstr( . . . )CommandLine fields are used to execute a program (an executable or batch job) defined in the JobStructure. The particular field used depends on the ControlType (see below). Note that the referredto program may be the actual application (when object.mStartType==Application) or it may be a program that controls the application (when object.mStartType==Controller). Regardless, the same command-line will be used for starting the application and for all ControlTypes for which the value is set to UseApplicationAPIType. The command-line itself will be subject to command substitution allowing for some flexibility in interacting with existing jobs.

There are several object.mstr( . . . )CommandLine fields, one for each of the ControlTypes. The appropriate field is chosen as specified in the following table:

| ControlType | Uses |
|---|---|
| StartType | mstrCommandLine |
| StopType | Use mstrStopCommandLine if non-null, otherwise use mstCommandLine. |
| ProgressType | Use mstrProgressCommandLine if non-null, otherwise use mstCommandLine. |
| CheckpointType | Use mstrCheckpointCommandLine if non-null, otherwise use mstCommandLine. |
| RestartType | Use mstrRestartCommandLine if non-null, otherwise use mstCommandLine. |
| ResultType | Use mstrResultCommandLine if non-null, otherwise use mstCommandLine. |

Note that for all ControlTypes aside from StartType, the command-line is only relevant if the ControlType's value is UseAPI.

Substitution allows for the expansion of variables specified in the command-line as follows:

| String | Is replaced with ... |
|---|---|
| $cmd | ... the relevant command string for the operation being performed. The command strings are: "start", "stop", "progress", "checkpoint", "restart", and "result". |
| ${n} | ... the full path to the local file representing the FileStructureNode where the FSNID==n for this run of the application. |
| $tmpfile | ... a unique temporary file name. |
| $jobid | ... the current JobID |
| $wuid | ... the current WorkUnitID |
| $$ | ... $ |
| $nospace | Forces termination of the expansion string (e.g., "$12abc" means "$12 (no space) abc", but "$1$$2abc" results in "$1 (nospace) 2abc". Of course, with the $1 replaced. |
| $entry | ... the value of the object.mstrEntryPoint field. |

In this embodiment, note that the variables themselves are generally terminated with white-space, but can also be terminated with a '$' if the intention is to have a concatenated result. The following table illustrates this using $3:="abc" and $4="def":

| Expression ... | ... Yields |
|---|---|
| "$3 space $4" | "abc space def" |
| "$3$4" | "abc4" |
| "$3$$4" | "abcdef" |
| "$3$ space $4$" | "abc space def" |
| "$4$.tmp" | "def.tmp" |
| "$4.tmp" | Error! |

An embodiment of the Windows batch control mechanism and .NET script control mechanism are similar to command line control mechanism.

Figure 14:
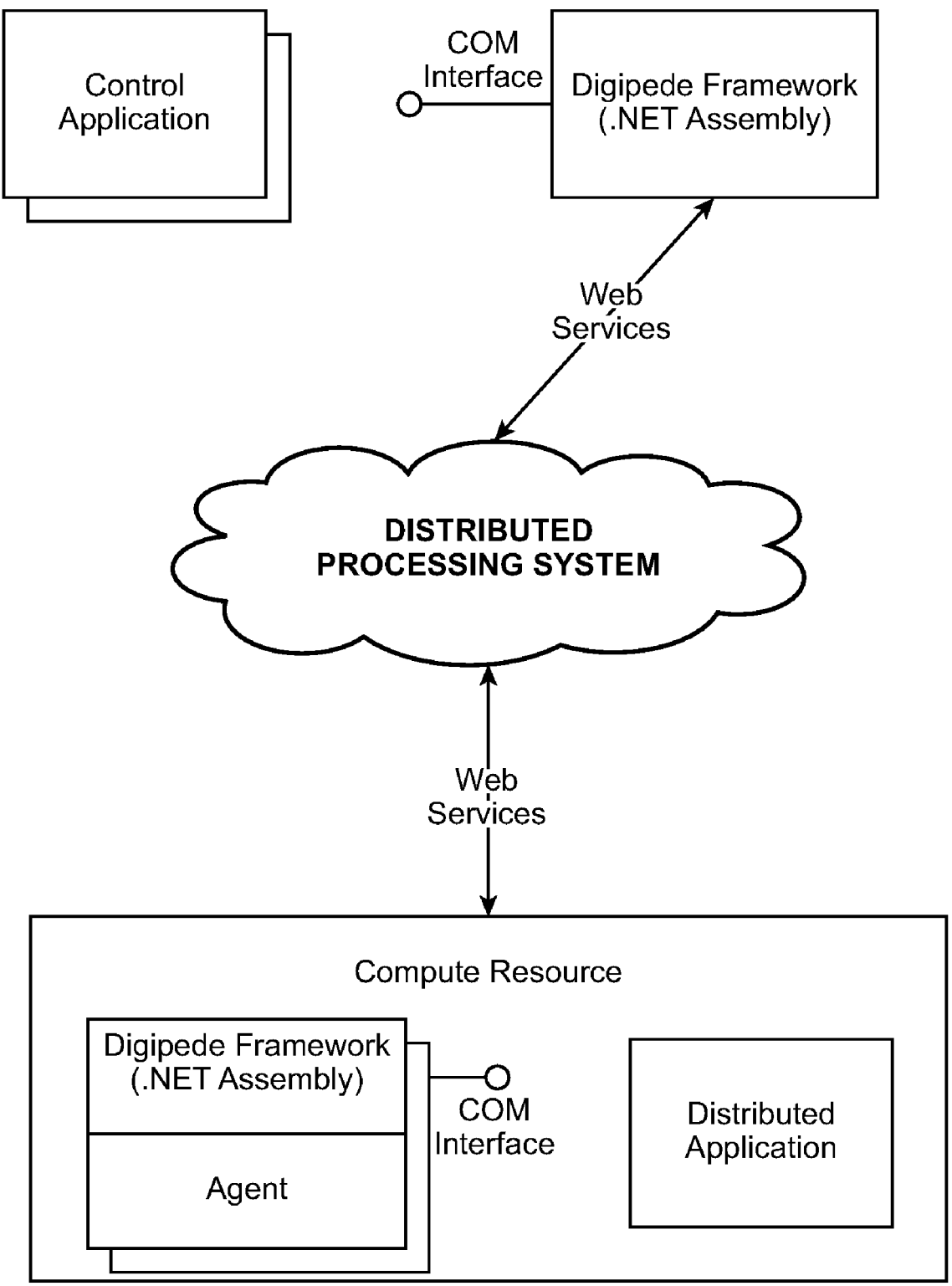
FIG. 14 illustrates an example web services interface for the distributed processing system according to an embodiment of the invention.

FIG. 14 illustrates an example web services interface for the distributed processing system according to an embodiment of the invention. This embodiment of the distributed processing system allows for applications to interact with it programmatically by providing a .NET Common Language Specification compatible framework and COM interfaces for both Control applications (that is, applications that will start and monitor jobs on the network) and Hosted Applications (that is, applications that will be run by the agents on the computing resources to complete work units). This rich API allows full control over all aspects of a job—from starting and stopping it to monitoring it while it is running.

In further embodiments, discussed in detail below, this API provides distributed object execution capabilities that allows developers to easily create applications for distributed processing systems using parallel computing resources within a single computer or over a network of computers.

An embodiment of the Control Application API includes the following functions:
SubmitJob—this is used to create a job on the network. A job submission can either define a new job or refer to a previously created job;
GetJobStatusSummaries—this is used to check the status of one or more jobs. The returned message will indicate the status of the job (waiting, running, paused, aborted or completed) as well as the numbers of work units that are waiting, running, completed or failed; and
ControlJob—this is used to control a job that is running; a job can be paused, resumed, stopped, restarted or aborted.

An embodiment of the hosted application API includes NotifyWorkStatus function that enables a hosted application to report on its progress on a particular work unit. In addition to passing information to the distributed processing system (and, indirectly, to the control application), the return value can be used to pass information to the hosted application itself—perform a checkpoint operation, discontinue work, or pause work.

The application control API includes functions for monitoring the progress of an application in processing work units. In an additional embodiment, the application control API includes checkpointing capabilities, enabling applications to store the intermediate results of a partially processed work unit and to resume processing the work unit from the intermediate results following an interruption. As the distributed processing system does not require applications to be modified, the functions for monitoring and checkpointing depend upon the capabilities of the application. The following parameters define different possible monitoring and checkpointing operations of the agent depending upon the capabilities of the application.

ApplicationProgressType

| Value | Behavior |
|---|---|
| None | The application cannot report or the Agent cannot determine progress information. |
| CheckResultLength | The Agent determines progress by checking the length of the result files. This requires that the result files have FileOverrides containing the expected file length in the miLength field. If there are multiple result files then the progress is determined to be a blended result of the progress on all the files: progress = sum(iCurrentLength[1..n])/sum(miLength[1..n]). |
| ReportCPUUse | The Agent will monitor the CPU usage and report accordingly. Note that this is not progress per se, but does given an indication that the Application is running |
| UseAPI | The Agent communicates with the application via the API to determine the progress. The Application returns a value representing the progress. |

ApplicationCheckpointType

| Value | Behavior |
|---|---|
| None | The application cannot checkpoint. |
| Automatic | Checkpointing is done automatically by the Application. |
| UseAPI | The Agent calls the API to instruct the Application to create a checkpoint. |

In a further embodiment, the application control API enables the agent to set the priority of the application processing the work unit on a computing resource. For shared computing resources, the priority determines how the computing resource divides its processing between the primary user, if any, and the work unit. The following parameter defines different possible priority assignments by the agent for the application.

ApplicationPriorityType

| Value | Behavior |
|---|---|
| ForcedByAgent | The system priority is forced by the Agent. |
| ManagedByApplication | The system priority is managed by the application itself. |

In another embodiment, the application control API enables the agent to determine when the application has completed processing of the work unit. The following parameter defines different possible mechanisms for detecting the results of the application.

ApplicationResultType

| Value | Behavior |
|---|---|
| ResultCode | The Application will return a result code that indicates failure or success. Once a successful result is reported, the Agent will check for the existence of the expected result files. |
| CheckFileLength | The Application will be deemed to have completed successfully if and when the application exits and all files represented by relevant result Files are at the desired length. |
| ResultExistence | The Application will be deemed to have completed successfully if and when the application exits and all the files represented by relevant result Files exist. |
| UseAPI | The Agent communicates with the application via the API to determine the result. |

The following table illustrates a summary of the Application Types and their associated controls as defined by an embodiment of the application control API. An 'X' indicates that the two can be used together.

| | Application-APIType | Command Line | Windows-Batch | DotNET-Script | Digipede |
|---|---|---|---|---|---|
| StartType | Application | X[1] | | | X |
| | Controller | X[1] | X | X | |
| Stop | Terminate | X[2] | X | X | X* |
| | Close | X | X | X | X* |
| | UseAPI | X | X | X | X |
| Progress | None | X | X | X | X |
| | CheckResultLength | X | X | X | X* |
| | UseAPI | X | X | X | X |
| Checkpoint | None | X | X | X | X |
| | Automatic | X | X | X | X |
| | UseAPI | X | X | X | X |
| Restart | Application | X | X | X | X |
| | Controller | X | X | X | X |
| Priority | ForcedByAgent | X | X | X | X |
| | ManagedByApplication | X | X | X | X |
| ResultType | ResultCode | X | X | X | X |
| | CheckResultLength | X | X | X | X* |
| | ResultExistence | X | X | X | X* |
| | UseAPI | | X | X | X |

Figure 8A:
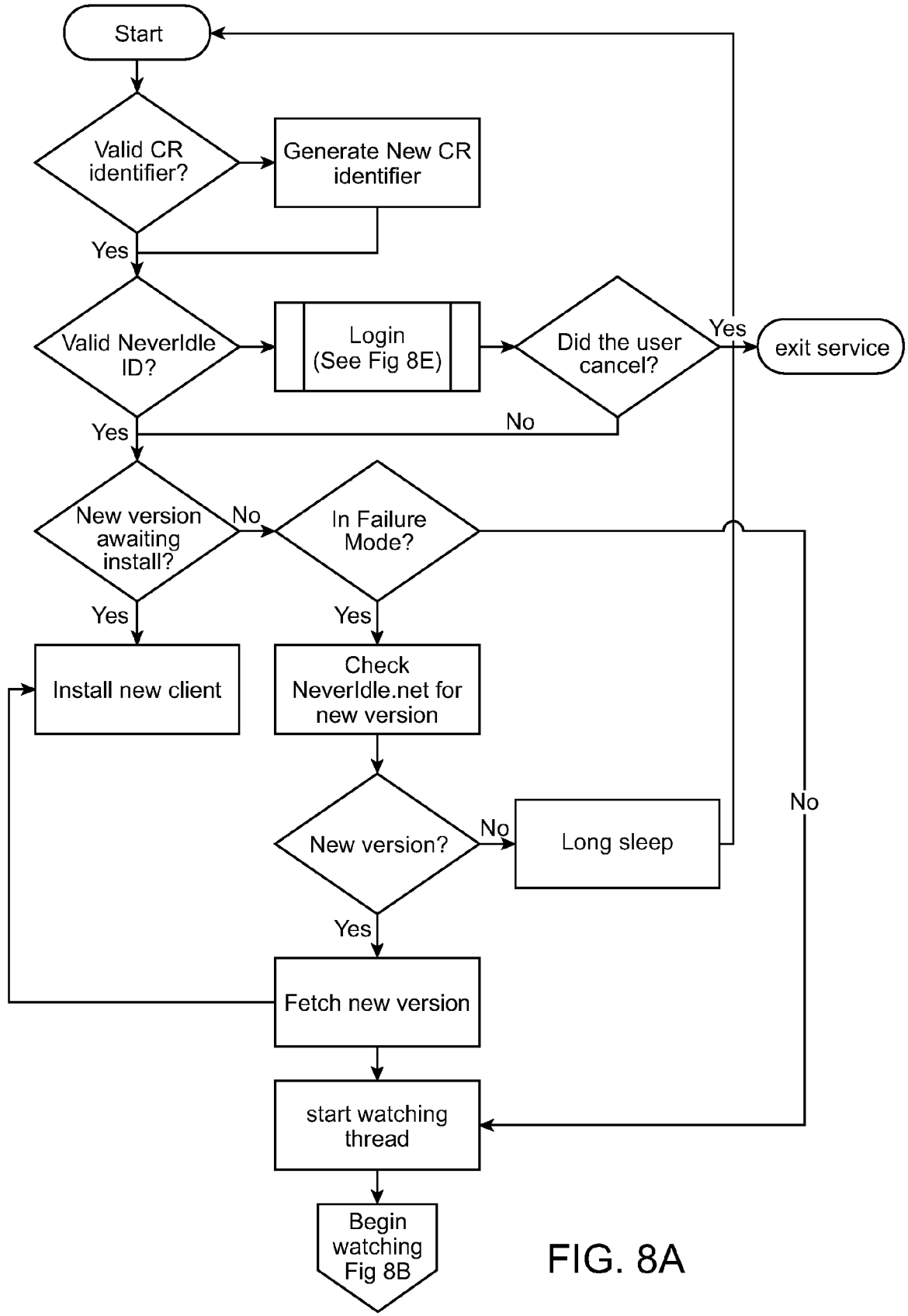
FIGS. 8A-8F are flowcharts illustrating the operation of the NeverIdle service according to an embodiment of the invention.
Figure 8B:
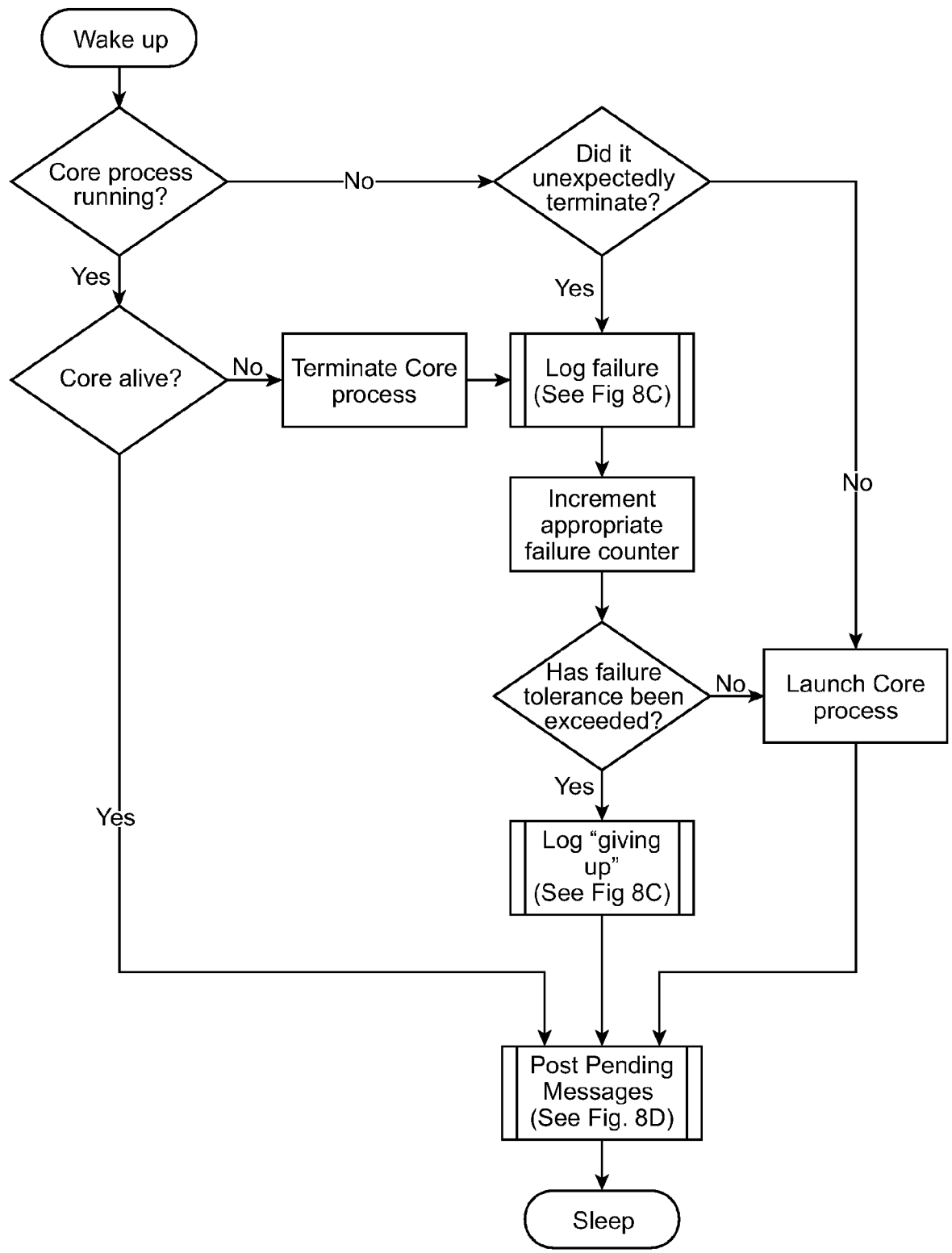
Figure 8C:
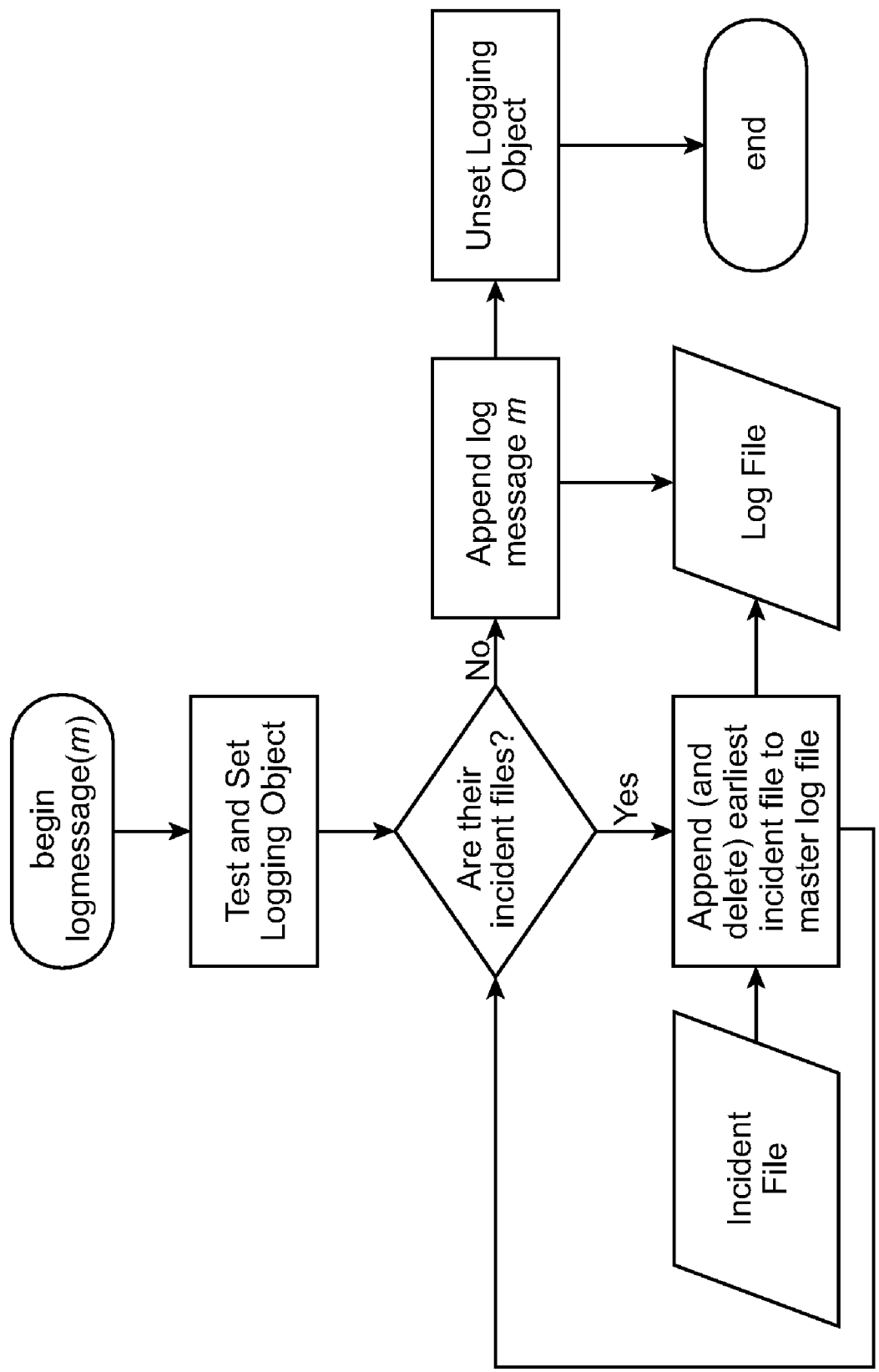
Figure 8D:
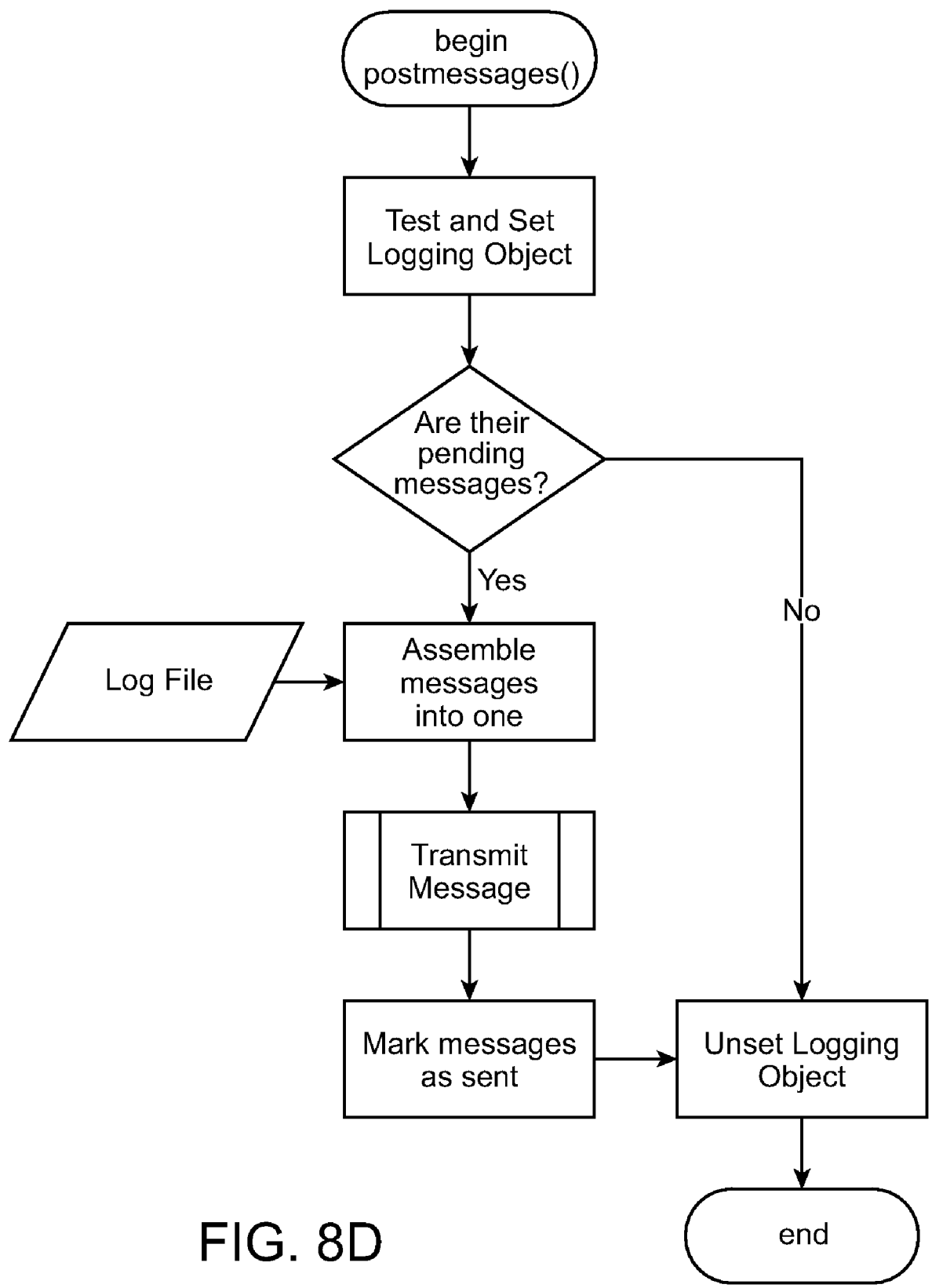
Figure 8E:
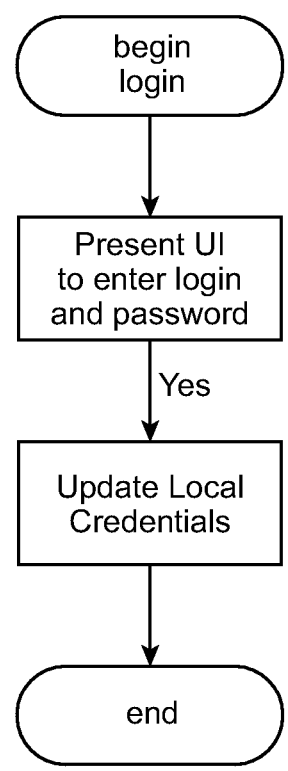
Figure 8F:
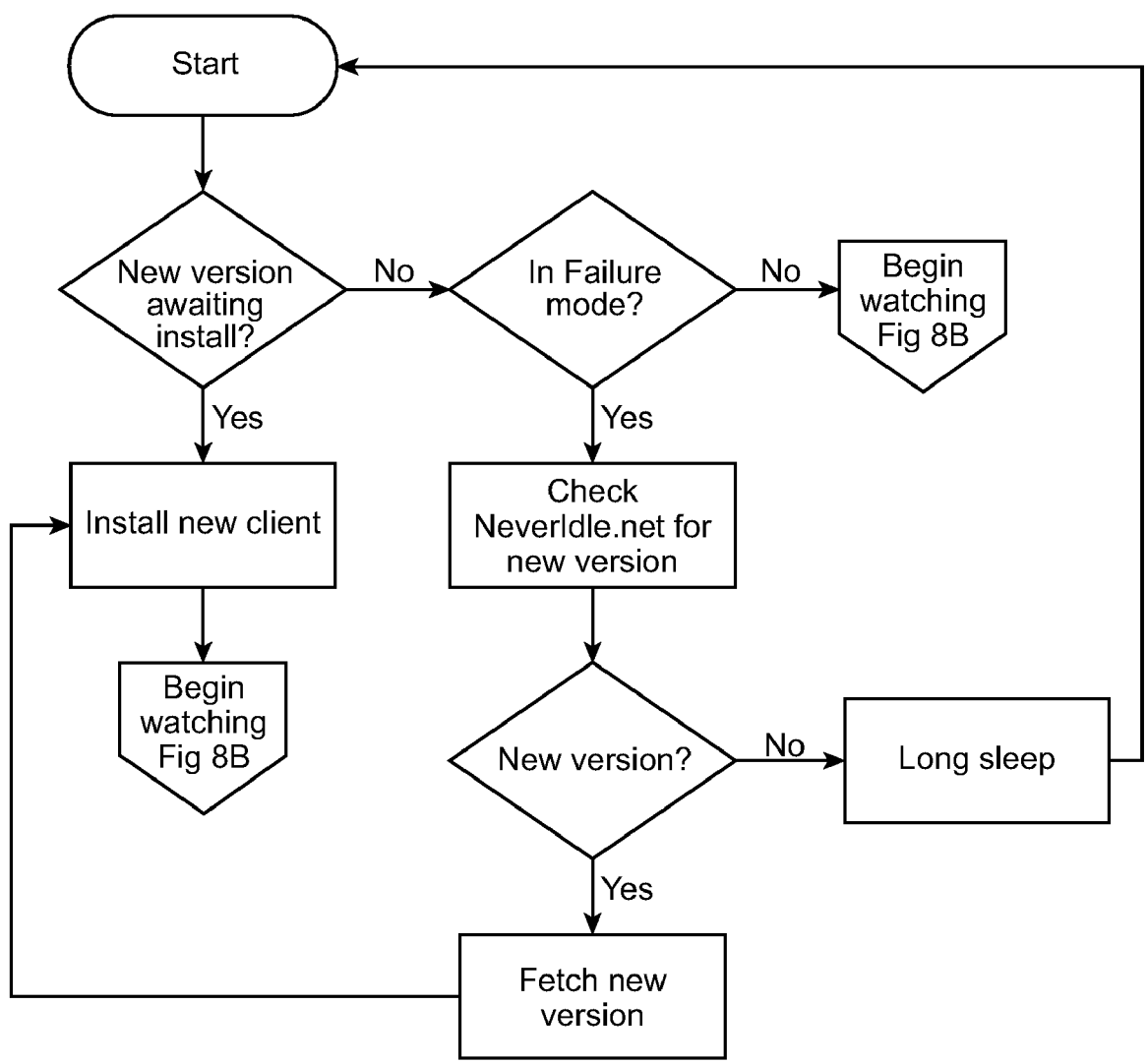

FIGS. 8A-8F are flowcharts illustrating the operation of the NeverIdle service 710 according to an embodiment of the invention. FIG. 8A illustrates the startup and initialization of the NeverIdle service. FIG. 8B illustrates the watching process of the NeverIdle service. FIG. 8C illustrates the logging process of the NeverIdle service. FIG. 8D illustrates the message posting process of the NeverIdle service. FIG. 8E illustrates the agent login process of the NeverIdle service. FIG. 8F illustrates the startup and initialization process of the agent.

The following table summarizes the contents of messages communicated between control servers and agents using the NeverIdle webservice.

| Message | Description | Response |
|---|---|---|
| MsgBaseResult | This is the "base class" for messages returned from the server to the agent. | N/A |
| MsgGenericLog | The agents send log files (files that log their own status) to the server for monitoring purposes. | N/A |
| MsgAgentCheckIn | The agents check in on each pool that they are registered. | MsgAgentCheckInResult |
| MsgGetWork | The agents use this to request work from the Job Manager (after they have been told which job to work on). The agents send the Job ID and the number of work units requested | MsgGetWorkResult |
| MsgNotifyWorkStatus | This message is sent to notify the server of the progress (or completion) of a work unit | MsgNofityWorkStatusResult |
| MsgAgentCheckInResult | Sent from the server to the agent, contains the job table for a pool. | N/A |
| MsgGetWorkResult | Sent from the server to the agent, contains WorkUnit information for work units that have been assigned to this agent | N/A |
| MsgGetAgentInfo | Sent from the server to the Agent to request information about the agent (amount of memory, disk space, CPU | MsgGetAgentInfoResult |

-continued

| Message | Description | Response |
|---|---|---|
| | family, CPU speed, installed software, etc.) | |
| MsgGetAgentInfoResult | Sent from the agent to the server, contains information requested | |
| MsgNotifyWorkStatusResult | Sent from the server to the agent--tells the agent to continue working or cease work on a work unit (if the job was aborted, or if the work unit was completed by another agent) | |
| MsgAgentOperation | Sent from the server to the agent--tells the agent to perform operations on itself (e.g., Add yourself to Pool X) | MsgAgentOperationResult |
| MsgAgentOperationResult | Sent from agent to server, tells the result of the MsgAgentOperation | |

A further embodiment of the distributed processing system includes security provisions to protect the integrity of the distributed processing system, its associated computing resources, and the jobs processed by the system. In an embodiment, standard security protocols and best practices such as SSL and the WS Security family of standards are used by the distributed processing system. To minimize the burden on the control server, the control server encrypts and caches re-usable documents as appropriate.

One aspect of security is authentication, which controls access to the services of the distributed processing system. In an embodiment, the distributed processing system is protected from unauthorized use through the use of login and password authentication. In a further embodiment, both users and agents must be authenticated by the distributed processing system. The security differences between users and agent are controlled by associating roles and privileges with their respective accounts. For agents, an embodiment of the distributed processing system uses each agent's computing resource ID number generated when the computing resource is registered with one or more pools.

Figure 9:
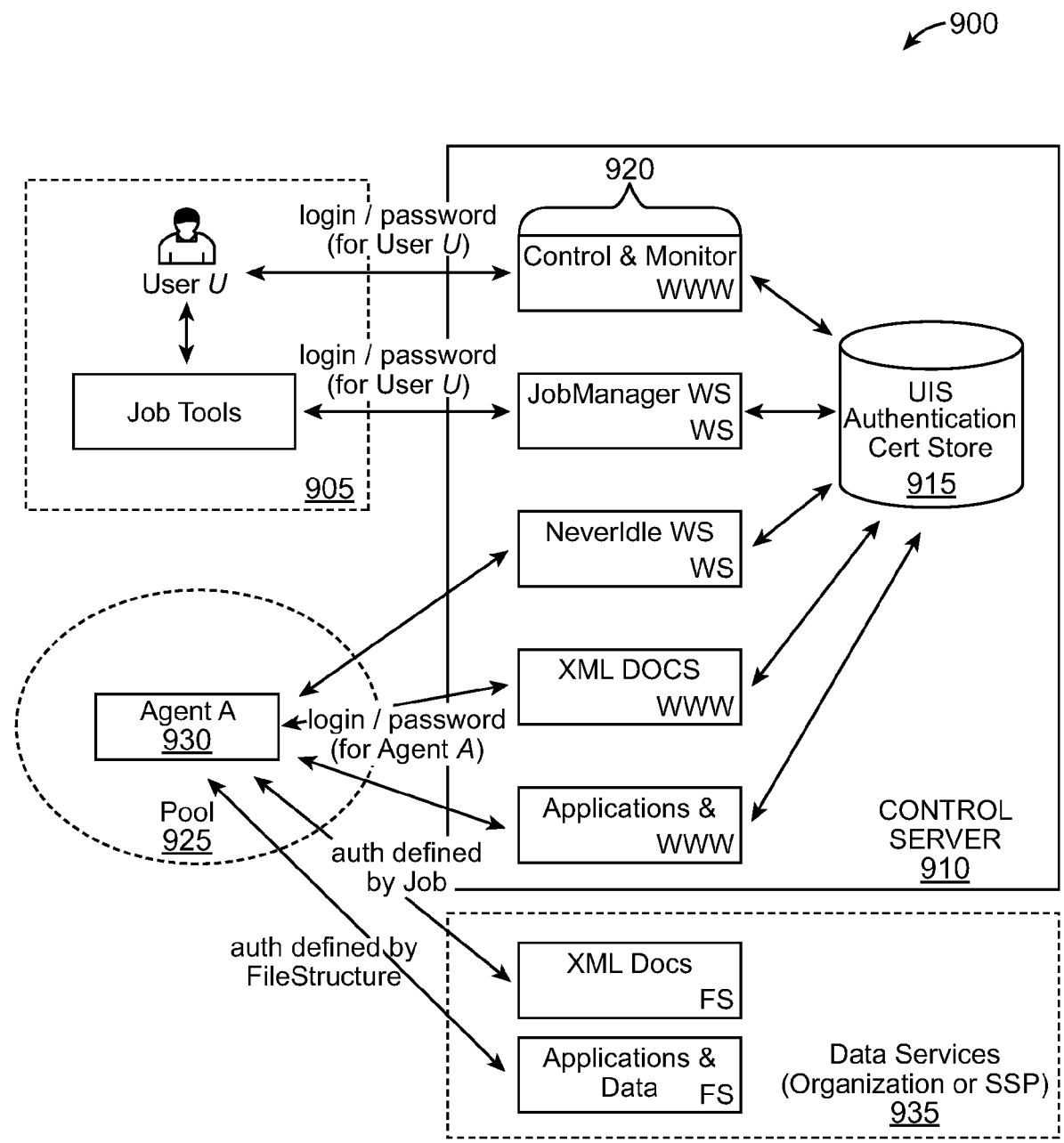
FIG. 9 illustrates the authentication system for a distributed processing system according to an embodiment of the invention.

FIG. 9 illustrates the authentication system 900 for a distributed processing system according to an embodiment of the invention. Distributed processing system users 905 can be authenticated by providing login and password information to the control server 910 via a control server interface, such as that shown in FIG. 2, or via a custom user interface, such as that shown in FIG. 3. The control server 910 includes a set of modules 920, such as those described with reference to FIG. 5. The set of modules verify authentication information provided by users and agents using authentication store 915. In an embodiment, the authentication store is maintained by an operating system platform provided directory service, such as Active Directory on the Microsoft Windows operating system platform.

Agent applications 930 running on computing resources in pool 925 also provide authentication information to the control server 910 to gain access to the distributed processing system. Once authenticated, agents 930 can access applications and data 935 needed to process work units. In a further embodiment, a user's privileges are passed on to the jobs initiated by the users. The work units of the job in turn inherit these privileges. When agents 930 select a work unit for processing, they inherit the privileges associated with the work unit and use these privileges to access the applications and data 935 required to process the work unit. When an agent has completed processing of a work unit, these privileges expire.

Another aspect of security is data protection. Cryptography can be used to protect the integrity and secrecy of data in the distributed processing system. In an embodiment, the distributed processing system uses public key cryptography and digital certificates for data protection. Another aspect of security is cryptographically secure signatures. Such signatures are used to protect the integrity and ensure that a data item (communication, job input, or application) can be guaranteed to have come from a specific source without any intermediate tampering. In an embodiment, the distributed processing system uses public key cryptography and digital certificates for such signing. Digital certificates are the publicly available credentials that prove identity, such as a public key signed by a trusted authority.

Figure 10A:
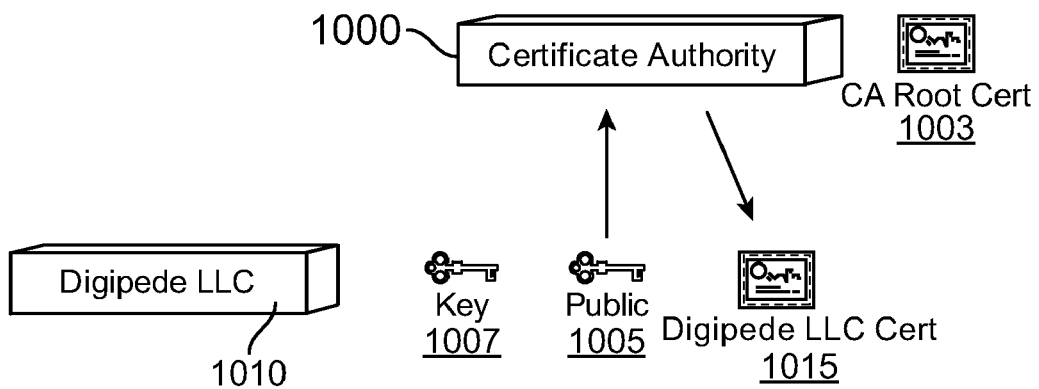
FIGS. 10A-10B illustrate the creation of digital certificates and the chain of trust for a distributed processing system provider.

An embodiment of the distributed processing system uses a series of digital certificates create a chain of trust that ensures the authenticity of the keys. FIG. 10A illustrates the creation of a certificate for a distributed processing system provider. In an embodiment, the certificate authority 1000 has a root certificate 1003. A distributed processing system provider 1010 creates a public key 1005 and a private key 1007. By providing the public key 1005 to the certificate authority 1000, the certificate authority 1000 can create a distributed processing system provider certificate 1015. The private key 1007 can be used to verify the integrity of the certificate 1015 and to generate information that other entities can then verify with certificate 1015.

Figure 10B:
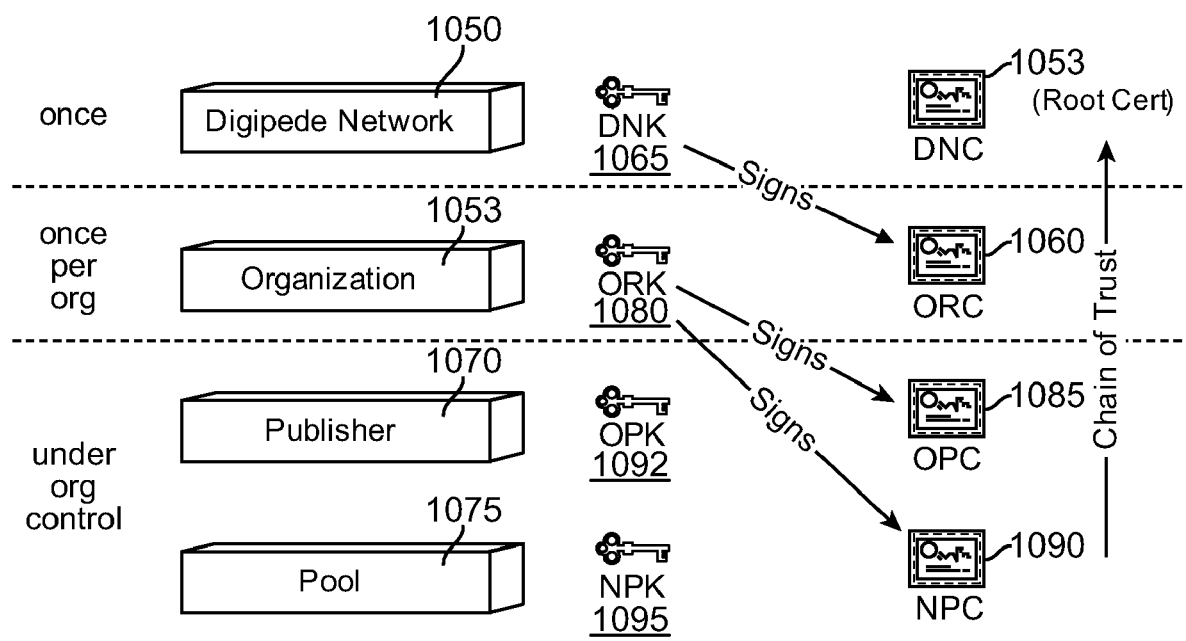

FIG. 10B illustrates the chain of trust in a distributed processing system using digital certificates according to an embodiment of the invention. The root authority 1050 in a distributed processing system, such as the control server, has a distributed processing system provider certificate 1053. Using private key 1065, the root authority 1050 signs a certificate 1060 associated with an organization 1055 within the distributed processing system using private key 1065. The organization 1055 in turn signs certificates 1085 and 1090 associated with publisher 1070 and pool 1075, respectively, using private key 1080. Publisher 1070, which is any entity that can create a job for the distributed processing system, and pool 1075 have private keys 1092 and 1095.

Figure 11A:
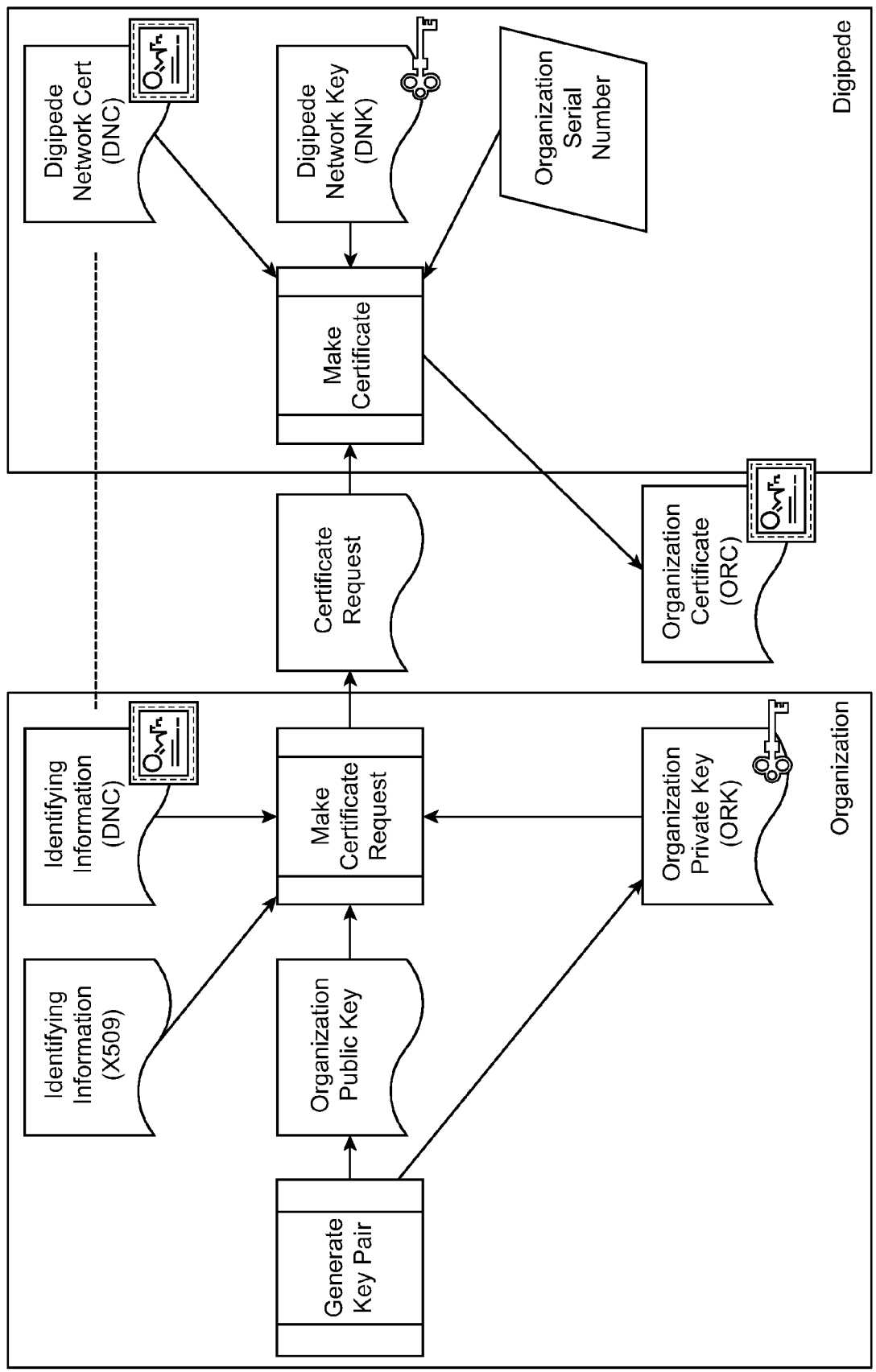
FIGS. 11A-11B illustrate methods of generating of signed certificates and keys according to an embodiment of the invention.
Figure 11B:
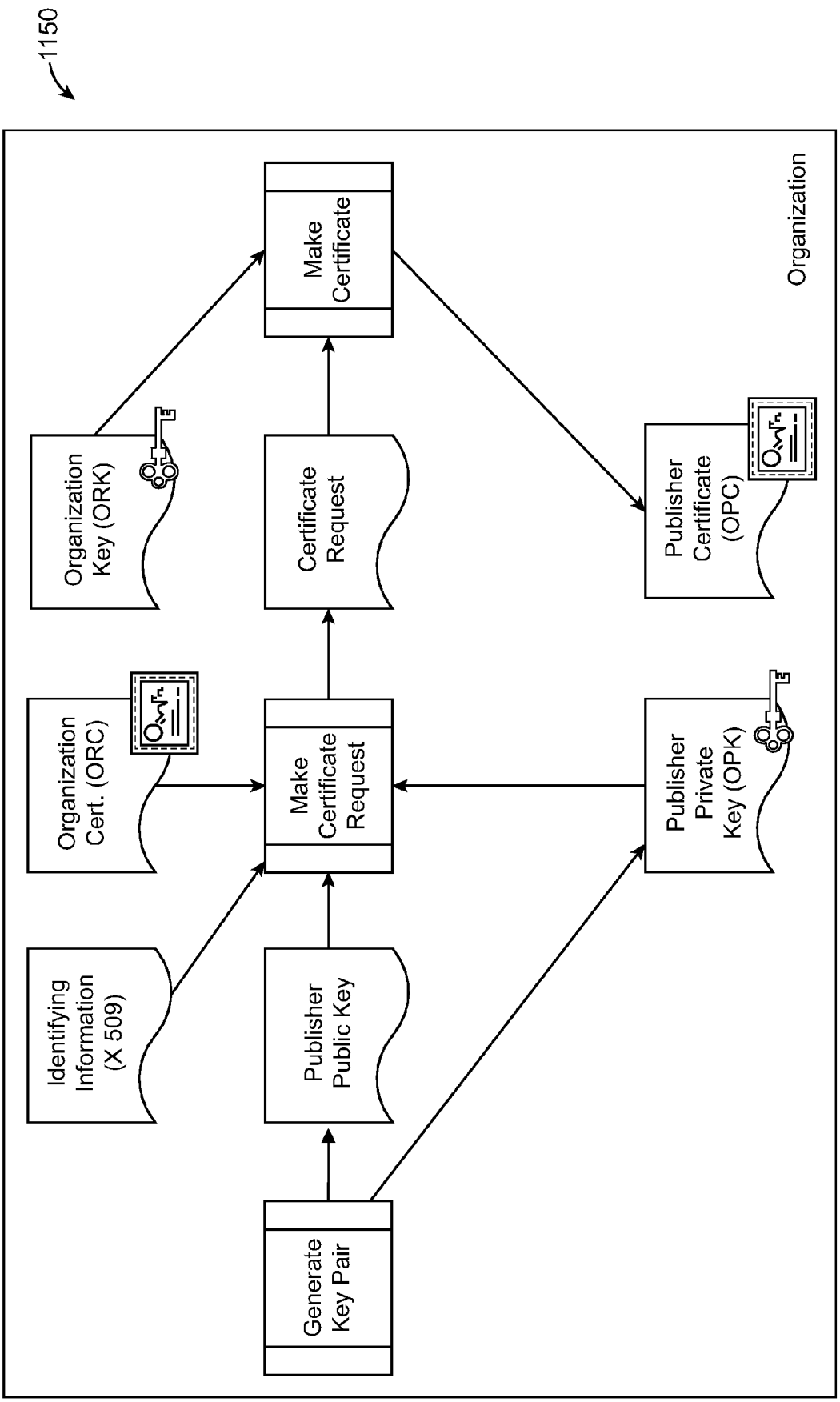

FIG. 11A illustrates the method 1100 of generating of signed certificates and keys for an organization. FIG. 11B illustrates the method 1150 of generating signed certificates and keys for a publisher. The generation of signed certificates and keys is similar for other entities in the distributed processing system, with each entity dependent upon a higher-level entity to sign its certificate, as shown in FIGS. 10A and 10B.

Figure 12A:
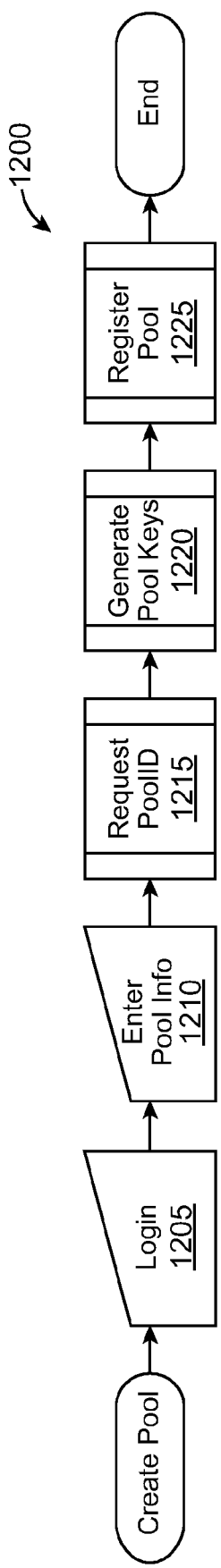
FIGS. 12A-12B illustrate methods 1200 of creating a pool and pool credentials according to an embodiment of the invention.

To simplify the creation of pools and the generation of certificates and keys, an embodiment of the distributed processing system includes a job tools smart-client application. An embodiment of the job tools application communicates with the control server via the Job Manager Web service discussed above. FIG. 12A illustrates a method 1200 of creating a pool using the job tools application according to an embodiment of the invention. The outputs of method 1200 include a public and private keys for the pool and a PoolServerLocator.

At login 1205, the user enters login and password for the distributed processing system. This is used for authentication to the JobManagerWS.

At Enter PoolInfo 1210, the user enters all of the initial settings for the Pool, including an arbitrary Pool Name and a PoolServerLocator. The PoolServerLocator includes the attribute PSLEncryptionAttr, which specifies whether the PoolServerLocator is encrypted; and OPC, which are the certificates for Publishers authorized to create Jobs on this Pool.

At Request PoolID 1215, the job tool requests a new and system-unique Pool ID from the Job Manager Web Service. The Generate Pool Keys step 1220 follows a similar process specified above in FIG. 11B.

Register Pool step 1125 registers the Pool with Job Manager Web service, including sending the pool certificate and the PoolServerLocator to the control server.

Figure 12B:
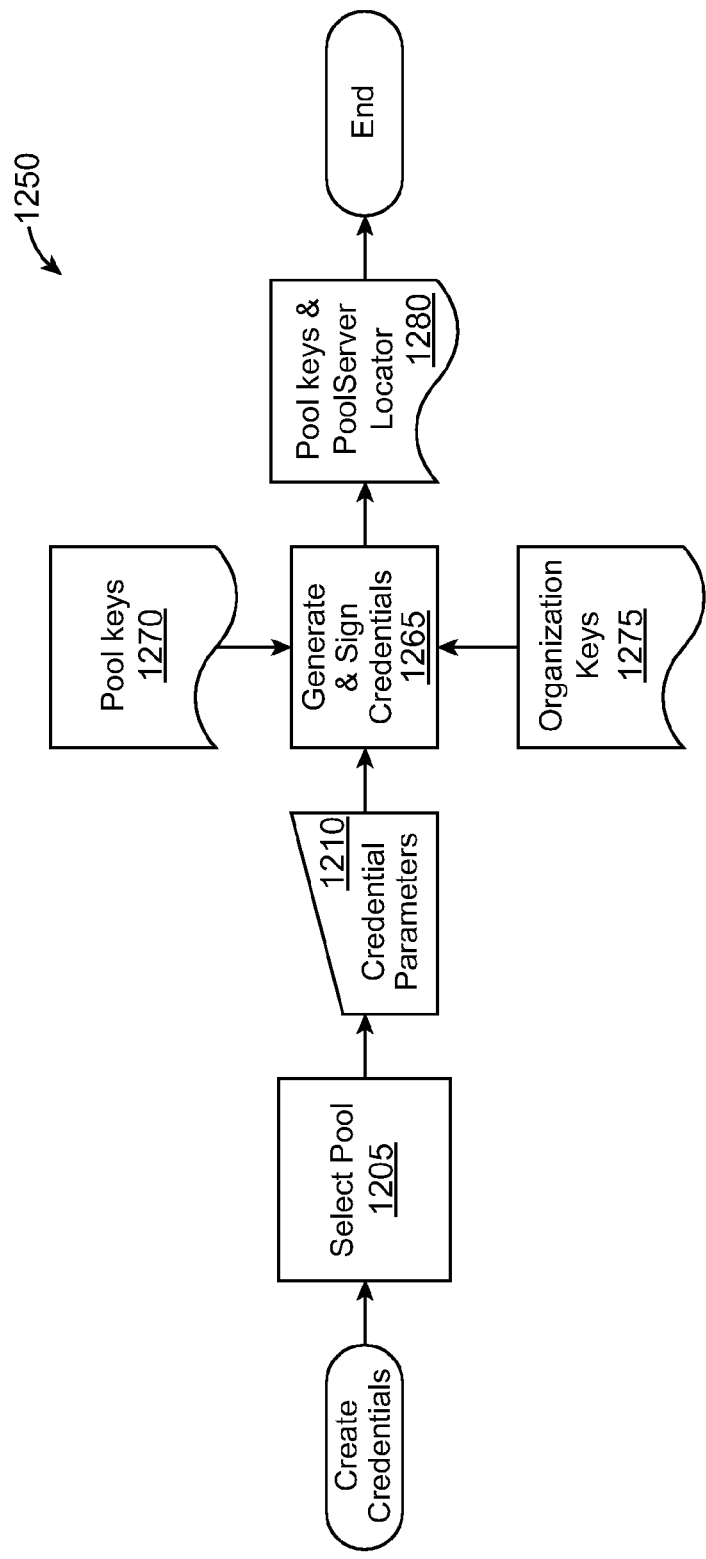

Agents are associated with Pools by having "Pool Credentials" installed. These credentials have a limited lifetime and are created by the Organization through the Job Tools. FIG. 12B illustrates a method 1250 for creating pool credentials according to an embodiment of the invention. The main output of method 1250 is a PoolServerLocator paired with a Pool Invitation.

At step 1255, the user enters login and password for the Distributed processing system and Selects a Pool previously created. At step 1260, the user enters parameters for the credentials, including a Join Expiry, which specifies how long these credentials will be useable for addition to the Pool; and a PoolServerLocator, which specifies the PoolServerLocator fields as discussed above.

Step 1265 generates and signs pool credentials using the pool keys 1270 and organization keys 1275 previously computed. In an embodiment the pool credentials can include an invitation expiry option and/or an invitation that requires confirmation by the control server before accepting an agent into the distributed processing system. Step 1280 then outputs the pool keys and the PoolServerLocator.

Figure 13:
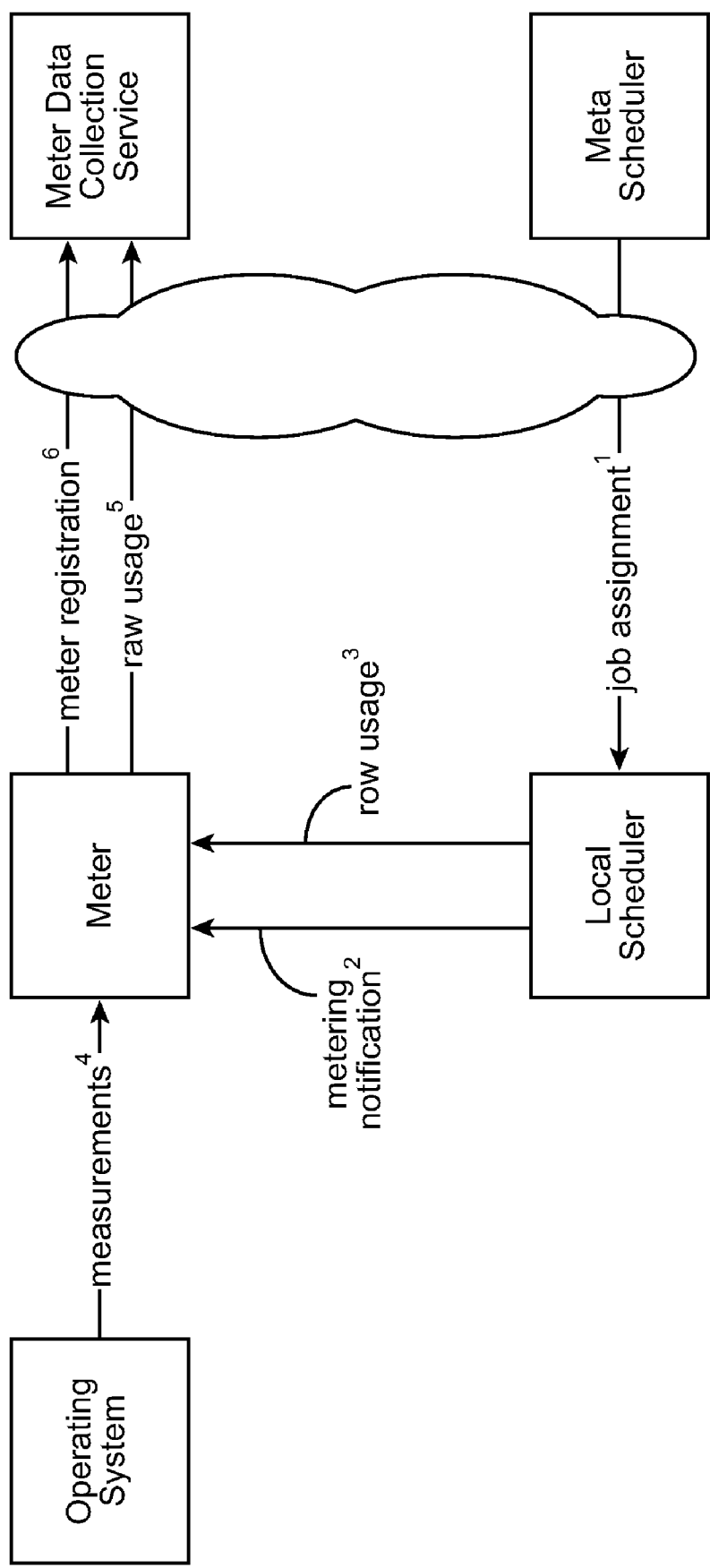
FIG. 13 illustrates a system for monitoring and metering computing resources for a distributed processing system according to an embodiment of the invention.

FIG. 13 illustrates a system for monitoring and metering computing resources for a distributed processing system according to an embodiment of the invention. In an embodiment, a software component called a "Meter Agent" monitors the activities on the computing resource. The Meter Agent monitors the Agent and all hosted applications and measures the resources they use on the system. The resources that can be monitored include: Amount of CPU time used, measured in CPUH (hours of CPU usage); Peak CPU used, measured in percent (100% would mean that, at some moment, the agent and hosted applications utilized all of the CPU power); Amount of data read from the hard disk; Amount of data written to the hard disk; Number of hard disk accesses; Number of bytes of data transferred to the network over a period of time; Peak transfer rate to the network; Number of bytes of data transferred from the network over a period of time; and Peak transfer rate from the network. The information captured by the Meter Agent is sent to the control server, where it can be aggregated and used for informational, cost-allocation, or billing purposes. In a further embodiment, All of the above quantities can be measured on a per-work-unit basis, and can also be measured and quantified on different time periods (allowing for different prices at different times of the day, for example).

The information collected by the meter agent can be used for setting prices, measuring quantities, aggregating, storing, presenting results, and billing for access to computing resources. The distributed processing system can automatically create and analyze pricing schedules to enable an organization to set prices for access to computing resources. The distributed processing system can also automatically aggregate and store measurements of computing resource usage to enable an organization to present a bill to users of such access.

In a further embodiment, the distributed processing system can be interfaced with an automated trading exchange for computing resources. An automated trading exchange enables one or more participating distributed processing systems to buy and sell access to their computing resources. A distributed processing system can submit bids to buy or sell computing resources to the trading exchange. A bid may be at a fixed price or market price for a specified computing resource type. The exchange may offer fixed or variable quantities of various specified computing resource types. The exchange can support spot and futures markets. A distributed processing system may act on its own behalf, or as an agent for other distributed processing systems.

An organization can sell access to the computing resources of its distributed processing system to other organizations having compatible distributed processing systems. Organizations can sell excess capacity of its distributed processing system or maintain dedicated pools of computing resources specifically for selling access to other organizations. The sale of computing resource access can be implemented through a trading exchange as discussed above or directly. In an embodiment, automated scheduling enables the distributed processing system of an organization to reserve access on another organization's computing resources. The automated metering services discussed above allow one organization to bill another organization based on reserved and/or actual usage of such resources. The security model discussed above can be extended to allow an organization to specify privileges for such scheduling and use of resources.

Figure 15:
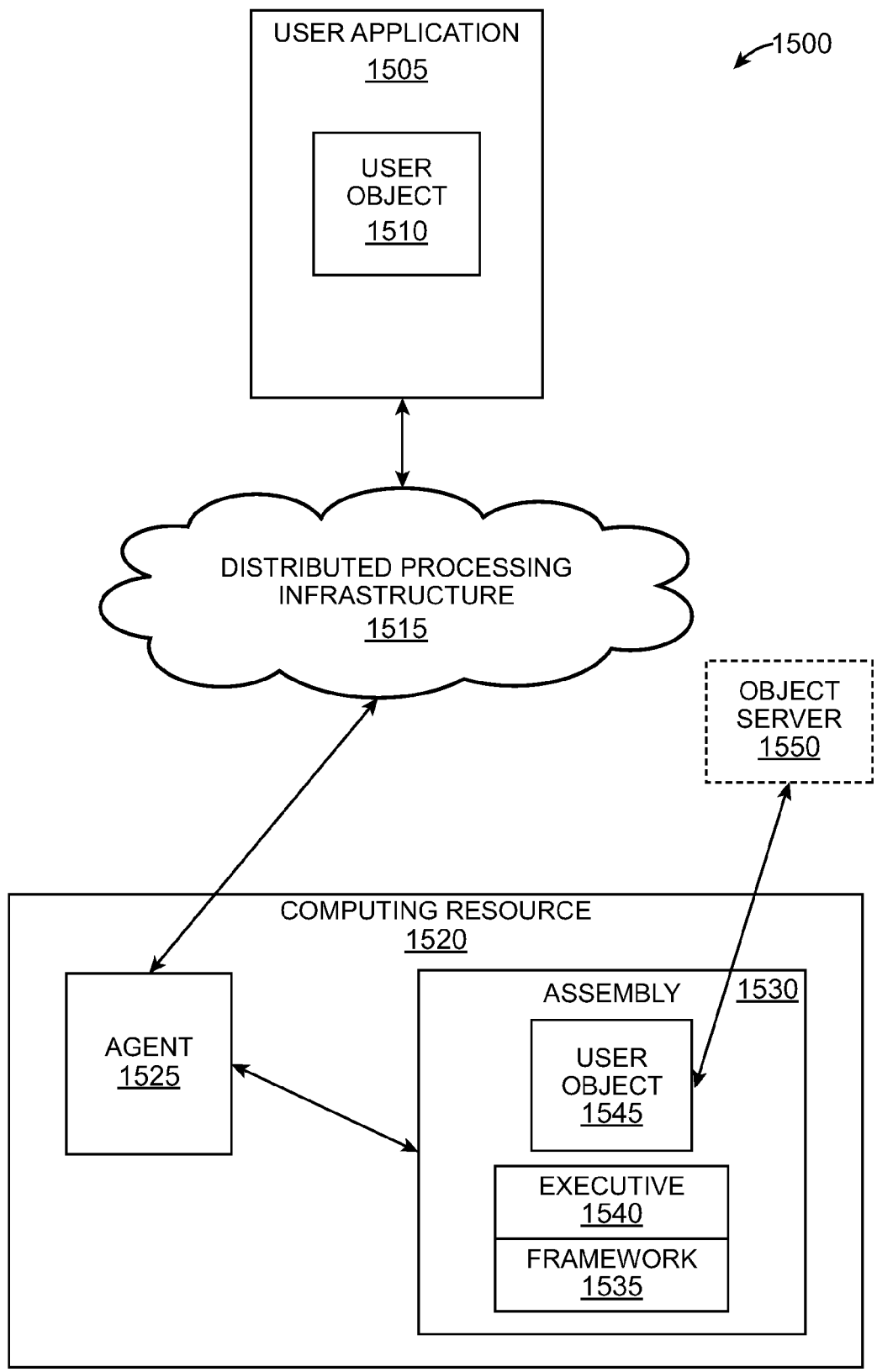
FIG. 15 illustrates a distributed object execution system according to an embodiment of the invention.

FIG. 15 illustrates a distributed object execution system 1500 according to an embodiment of the invention. Previously, applications required extensive engineering to take advantage of parallel processing systems. For example, developers often would have to create multi-threaded applications for parallel processing systems. In a multithreaded application, applications are divided into threads of execution that are capable of being executed in parallel. One or more threads is then assigned to each computing resource, which can be processor core, a microprocessor including one or more processor cores, or a stand-alone computer including one or more microprocessor. Multithreaded applications present numerous challenges, including inter-thread communication, thread synchronization, thread race and lock conditions, and load balancing between threads.

As an alternative to traditional multithreaded applications, an embodiment of distributed object execution system 1500 enables developers to create applications that are scalable over parallel processing systems of any size with minimal additional engineering effort. The distributed object execution system 1500 leverages the distributed processing systems described above. In an embodiment, a user application 1505 includes a user object 1510. User application can be written in any convention programming or scripting language, including both compiled and interpreted languages such as C, C++, C#, Java, Fortran, and various forms of Basic.

User object 1510 is defined in user application 1505 to include methods and/or associated data that the developer wishes to run in parallel to improve execution speed. In an embodiment, the user object 1510 is derived from base class provided by a library, API, SDK, or other programming interface of a distributed processing infrastructure 1515. The base class can include default constructors, methods, interfaces, and/or data types adapted to interface with the distributed processing infrastructure 1515. These features of the base class may be overridden with developer specified data and methods to perform functions required by the user application 1505. The developer can specify one or more methods of the user object 1510 to be capable of execution by the distributed processing infrastructure 1515.

In alternate embodiments, the user application 1505 can use other programming models instead of an object-orientated programming model. In these embodiments, user object 1510 can be replaced with a corresponding data structure, procedure, and/or other components that are adapted to provide an interface with a distributed processing system.

To utilize the distributed object execution system 1500, the user application 1505 invokes a method of the user object 1510 that is designated for execution in parallel. In conjunction with this method invocation, the user application 1505 can optionally specify one or more arguments or parameters for this method. Additionally, the method can optionally rely on data defined within the user object 1510 or other associated objects.

In response to this method invocation, the user object 1510, its associated method, and/or associated data is transferred to the distributed processing infrastructure 1515. This transfer can be facilitated by the distributed processing system interface API described above. In further embodiments, programming models that enable the transfer, dynamic creation, and/or sharing of programming objects, such as Microsoft's component object model (COM) or .NET framework, or other programming platforms providing similar functions, facilitates this transfer to the distributed processing infrastructure 1515. In additional embodiments, data transfer techniques, such as serialization, can be applied to the user object 1510 to facilitate this transfer.

Following the invocation of a designated method of user object 1510, an embodiment of the user application 1505 continues to execute while awaiting results of the method invocation. During this period, user application 1505 can invoke additional methods of user object 1510 or any other object for execution by the distributed object execution system 1500 as well as perform any other operations.

The distributed processing infrastructure 1515 includes components for controlling and operating a distributed processing system as described above. In an embodiment, this can include a control server application, similar to control server 500 discussed above. The distributed processing infrastructure includes functions for creating and maintaining pools of computing resources, initiating and managing jobs and tasks to be processed by agents on computing resources, and communicating with agents on computing resources and one or more user applications, such as user application 1505.

In response to receiving the user object 1510, or in some implementations data associated with the user object 1510, the distributing processing infrastructure creates a job and one or more associated tasks for executing the invoked method. As described above, the job can include a job priority and job criteria such as minimum computing resource capabilities required to execute the method.

As described above, agents on computing resources that are available for processing tasks, such as agent 1525 on computing resource 1520, contact the distributed processing infrastructure to request information on available jobs and tasks. In this embodiment, this job and task information can include jobs and tasks associated with user object 1510 as well as other user objects from user application 1505 and any other user applications. The agents use this information to request one or more jobs or tasks. In an embodiment, this request can be based on weighting and affinity analysis as described above.

In response a request from an agent, such as agent 1525, the distributed processing infrastructure 1515 assigns the job associated with the invoked user object 1510 to agent 1525 for processing by computing resource 1520. In an embodiment, the agent 1525 enables the execution of the method of the user object 1510 associated with the assigned job as follows. An assembly process 1530, which in an embodiment may be a .NET assembly, is instantiated on computing resource 1520. The assembly process 1530 includes a framework module 1535 for interacting with the agent 1525 and an executive module 1540 for instantiating and executing a replica of user object 1545. The executive module 1540 can be a standard module associated with the assembly process 1530 or in an additional embodiment be specific to the user application based on a standard parent class.

In an embodiment, user object 1545 is a deserialized version of the user object 1510 received from the agent 1525 via the distributed processing infrastructure 1515. In an alternate embodiment, user object 1545 is a replica of user object 1510 that is instantiated from information provided by the agent 1525 via the distributed processing infrastructure 1515. In a further embodiment, the assembly process 1530 uses an object server 1550, such as COM object server, to instantiate user object 1545.

Assembly 1530 executes the invoked method of user object 1545 on computing resource 1520. During execution, an embodiment of the assembly 1520 provides status information on the execution to agent 1525, which in turn informs the distributed processing infrastructure 1515 that execution is proceeding normally. If an error occurs during the execution of the user object 1545, the distributed processing infrastructure is notified accordingly. In response to an error or if the agent fails to provide status information within an appropriate time period, possibly indicating the computing resource 1520 is no longer functioning, the distributed processing infrastructure can make the job associated with the user object 1510 available for execution by other computing resources or return an error message to the user application 1510.

Once execution of the invoked method is complete, the assembly 1530 informs the distributed processing infrastructure 1515 of the completed task via agent 1525. The distributed processing infrastructure 1515 in turn communicates this information back to the user application 1505. In an embodiment, result data from the execution of the method of the user object 1545, if any, can be communicated via agent 1525 and distributed processing infrastructure 1515 with the user application 1505. In another embodiment, result data is communicated with the user application 1505 via the object server 1550.

In an embodiment, an event handling mechanism is used by the user application to receive and respond to the results of the invocation of a method of user object 1510. The distributed processing infrastructure 1515 communicates with the user application 1505 and raises an event when the processing of the user object 1510 by the distributed object execution system 1500 has been completed or when an error has occurred. An event handler in the user application 1505 processes the event to retrieve result data from the invocation of user object 1510 or to respond to an error. In an embodiment, the result data is stored in data attributes or other portions of the user object according to the methods specified by the developer.

Figure 16:
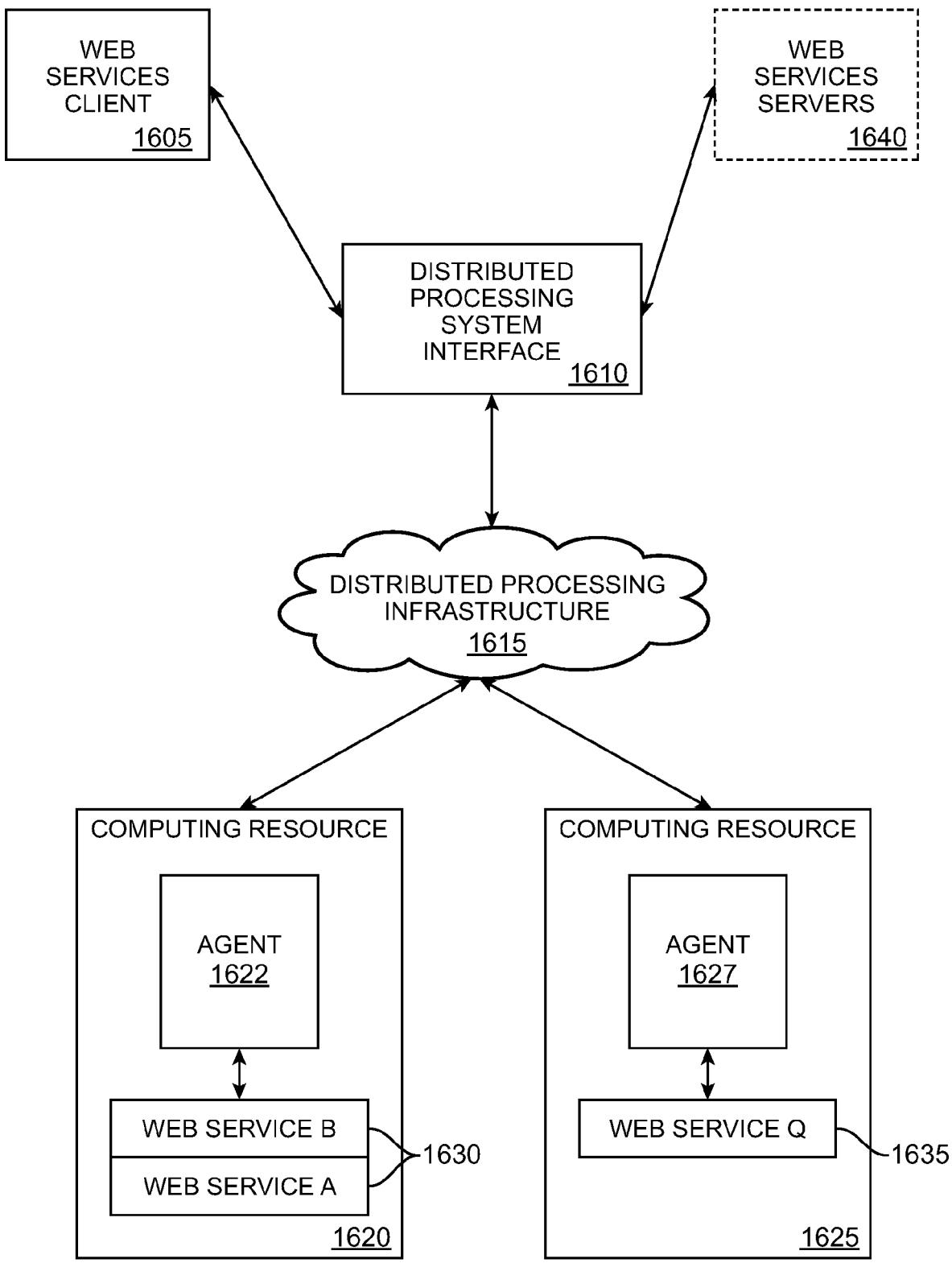
FIG. 16 illustrates a distributed web services processing system according to an embodiment of the invention.

FIG. 16 illustrates a distributed web services processing system 1600 according to an embodiment of the invention. The distributed web services processing system 1600 leverages the distributed processing systems described above to redirect arbitrary Web services requests to computing resources of the distributed processing system, thereby decreasing or eliminating the need for dedicated web services servers.

A web services client 1605 contacts the distributed processing system interface 1610 with a web services request. In an embodiment, the distributed processing system interface 1610 listens at specific web services endpoints and masquerades as one or more web services. If the web services request matches a web service provided by one or more computing resources of the distributed web services processing system 1600, the distributed processing system interface 1610 repackages the web services request into a job and tasks for execution by one or more computing resources. If the web services request does not match a web service provided by one or more computing resources of the distributed web services processing system 1600, the web services request can be forwarded to optional dedicated web services servers 1640 for processing.

As described above, computing resources 1620 and 1625 include agents 1622 and 1627. One or more computing resources can support one or more web services. Each computing resource can support a different web service or combinations thereof, depending upon the capabilities of the computing resources and administrator preferences. For example, computing resource 1620 includes web services A and B 1630, while computing resource 1625 includes web service Q 1635.

In an embodiment, agents on computing resources that are available for processing web services requests, such as agents 1622 and 1627, contact the distributed processing infrastructure 1615 to request information on available jobs and tasks. In this embodiment, this job and task information can include jobs and tasks associated with one or more web services requests from one or more web services clients 1605. The agents use this information to request one or more jobs or tasks based on the capabilities, affinities, weights, and availabilities of their respective computing resources, which can include the web services installed on their respective computing resources. In an embodiment, this request can be based on weighting and affinity analysis as described above.

In response to agents requests, the jobs and tasks associated with web services requests are assigned to specific computing resources for processing. When the processing of all of the tasks associated with a web services request is complete, the distributed processing system interface 1610 repackages the results as a web services response, which is then forwarded to the web services client 1605.

In an embodiment, a workbench application includes a user-interface component that allows users to describe, submit, monitor, and control distributed computing jobs. Users can use the workbench application to setup and submit distributed computing jobs without using a programming or scripting language, which greatly increases the ease of deploying, configuring, and using the distributed processing system.

Figure 17A:
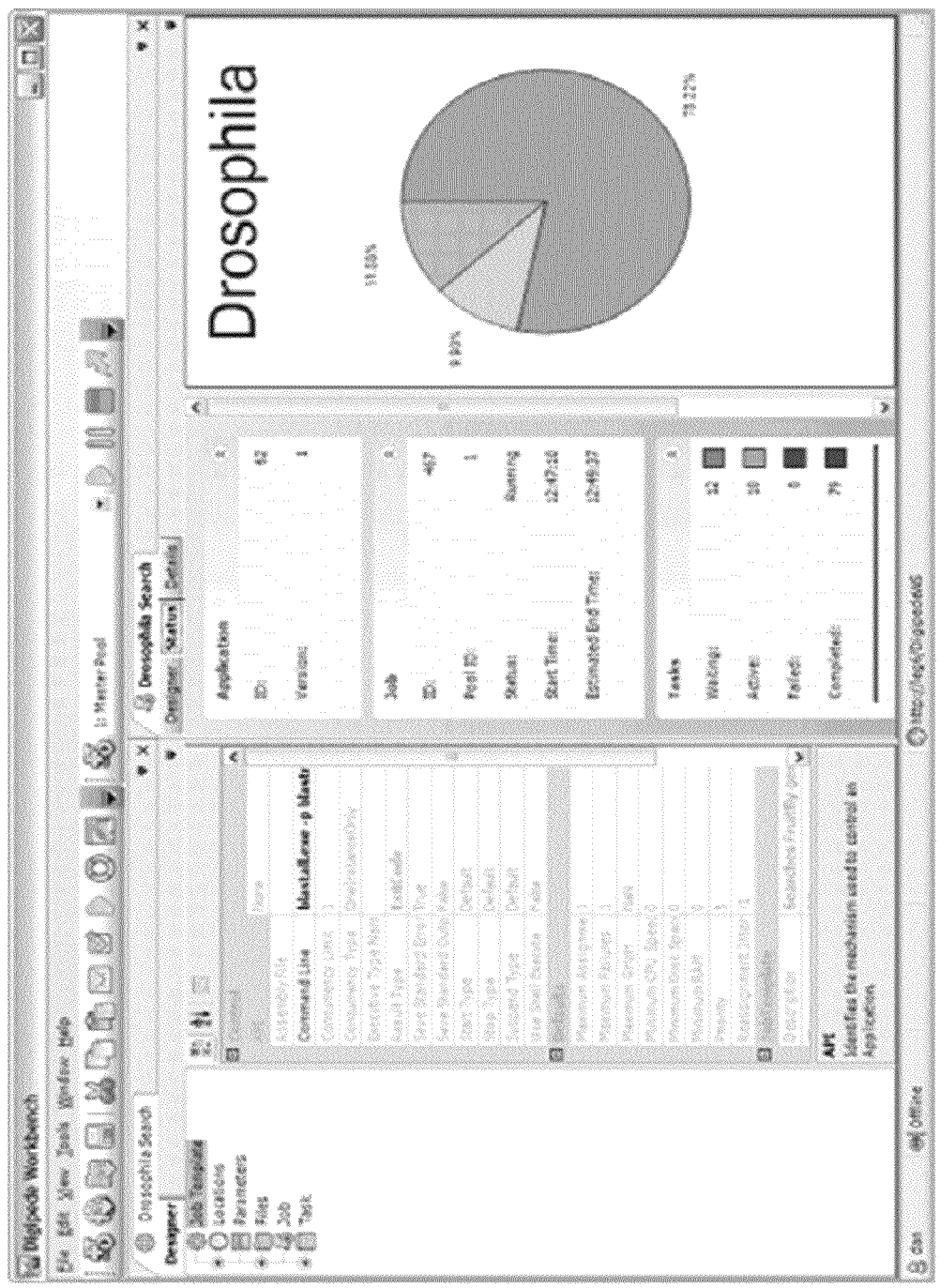

FIG. 17A illustrates an example screen display 1700 of a workbench application according to an embodiment of the invention. In this example screen display 1700, the left half of the screen shows the Job Template designer 1705, which is a representation of XML data that represents a job template in the system. The right half 1710 of example screen display 1700 shows the monitoring of a job in progress. In an embodiment, the workbench application provides numerical and/or graphical representations of the numbers of tasks waiting to be executed, actively being executed on the system, failed, and completed, the start time and estimated end time of the job, and other job status information.

Figure 17B:
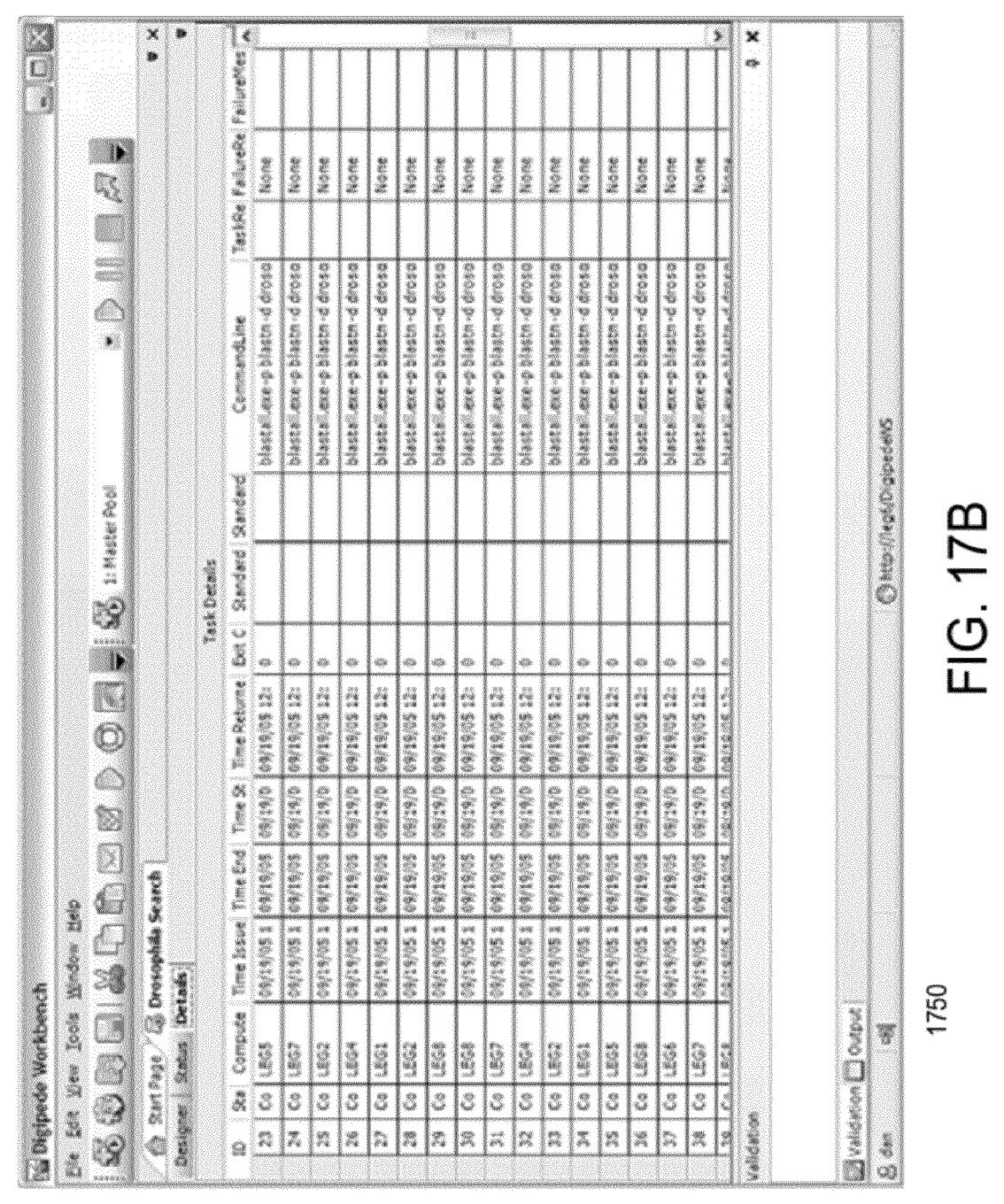

FIG. 17B illustrates an example screen display 1750 of a workbench application according to an embodiment of the invention. Example screen display 1750 presents details from the execution of job. In example screen display 1750, each task is represented by a row and includes details such as the computing resource on which the task was run, the times of execution, standard out, standard error, any error information, and other task status information.

In an embodiment, the workbench application provides a graphical user interface for describing all aspects of a distributed computing job. These aspects can include the data files must be installed on a computing resource to process a task; the location of any required files; protocols and security credentials used to access applications and data files associated with tasks; the desired location for files to be transferred to the computing resource; any file renaming required; and other information relevant to caching of data, such as the size of data files.

In a further embodiment, the workbench application further simplifies the user interface for performing all of the above actions by providing a "wizard" that gives the user a guided step-by-step interface for defining a job template. Once a job template defining a job is created, it can be cached for use in defining additional similar jobs. For additional jobs, the workbench application provides a simplified wizard that allows users to run a jobs based on an existing job template.

Figure 18A:
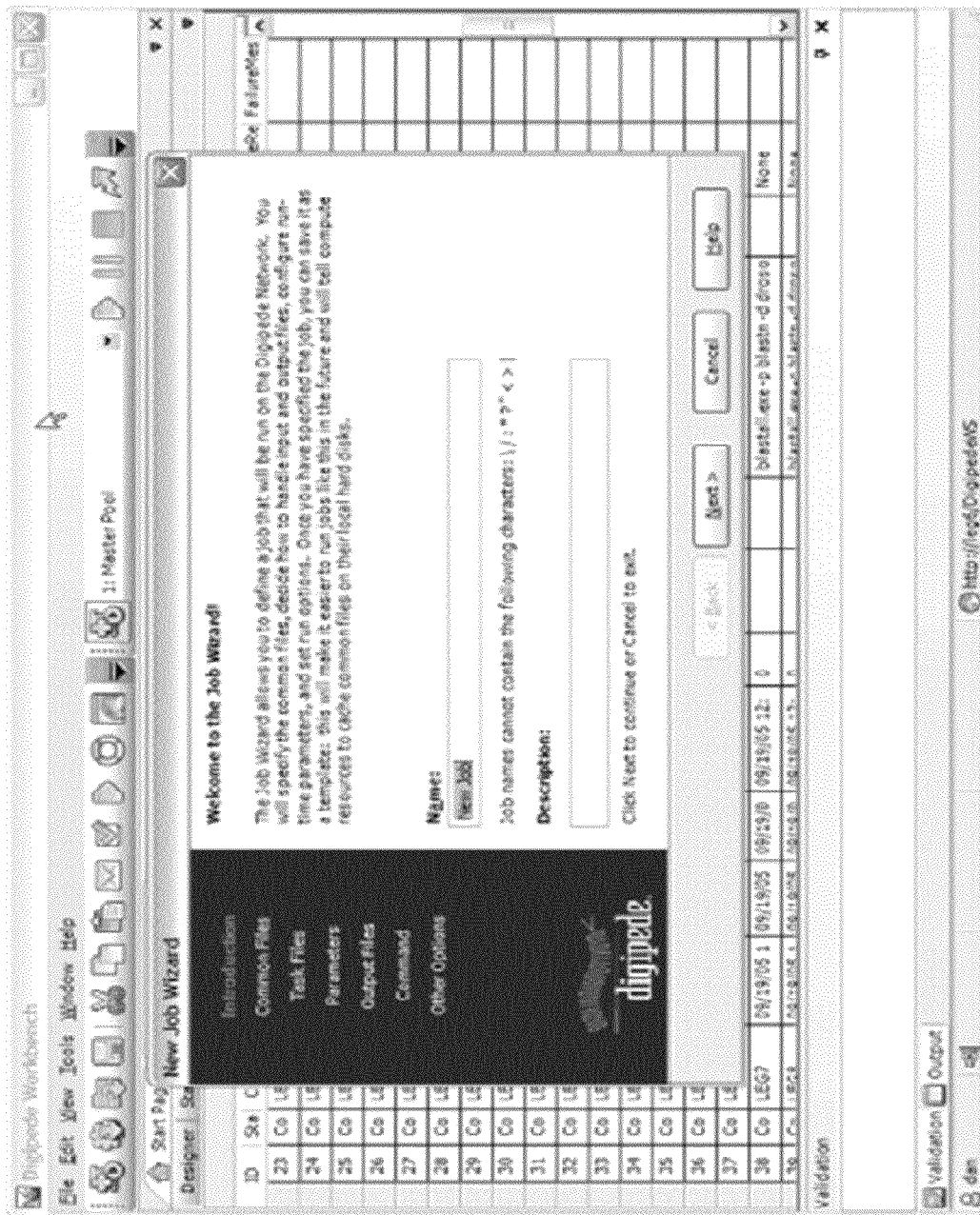
FIGS. 18A-D illustrate example screen displays of a workbench application according to an embodiment of the invention.

FIG. 18A illustrates an example screen display 1800 of a workbench application according to an embodiment of the invention. Example screen display 1800 is part of a wizard that gives the user a guided step-by-step interface for defining a job template. Example screen display 1800 allows users to enter a name and description for a new distributed processing job.

In an embodiment, another aspect to describing a distributed computing job is the files that must be moved to a particular computing resource to execute one task. An embodiment of the workbench application provides graphical user interface to allow the user to select all of the files required by a task. In a further embodiment, the workbench application can generate a job template that can then be used to divide the set of task files into individual tasks, using for example heuristics based on file extensions and types, without requiring the user to decide which computing resources will receive task files.

Figure 18B:
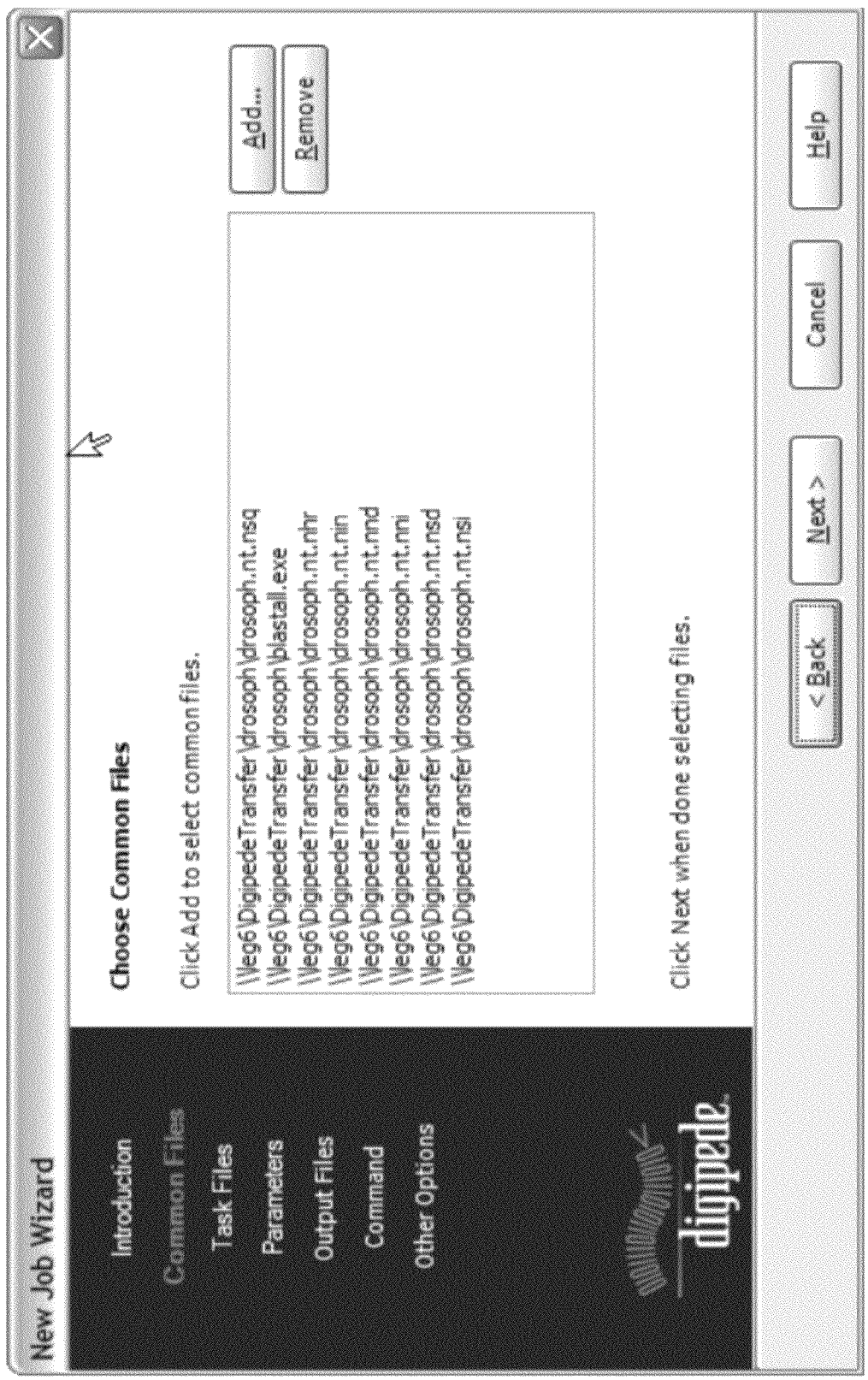

FIG. 18B illustrates an example screen display 1805 of a workbench application according to an embodiment of the invention. Example screen display 1805 is part of a wizard that gives the user a guided step-by-step interface for defining a job template. Example screen display 1805 illustrates an interface used to select common files, which are files used by every task of a job. Additional similar interfaces can be used to select or specify files required for specific tasks of a job.

In an embodiment, the workbench application also provides a graphical user interface for allowing the user to define any result files that will be produced on the computing resources that execute tasks for the distributed computing job.

In an embodiment, the workbench application provides a graphical user interface facility that allows users to define parameters that will be passed to the tasks of a distributed computing job when they are executed on the various computing resources. Parameters many consist of text, ranges of numbers, random numbers, or values pulled from a file. These parameters can be used to control applications executed by the distributed processing system. For example, the parameters can be provided to applications via a standard input interface, such as that provided by applications capable of being executed from a command line or shell. These parameters can include variable names that represent files or parameters as specified above; the variable names will be replaced with actual file names or parameter values when the command line is executed on the computing resource.

Figure 18C:
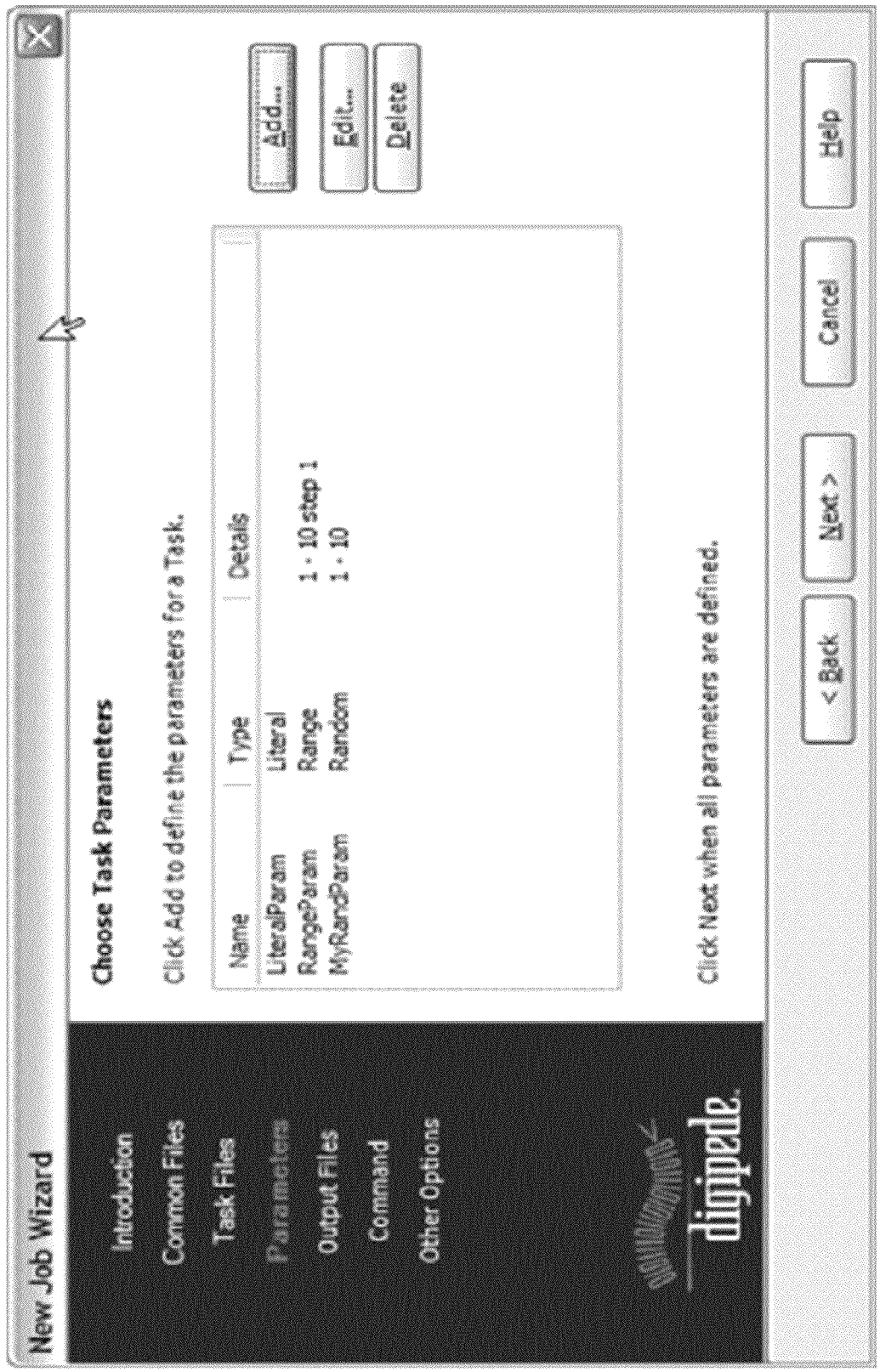

FIG. 18C illustrates an example screen display 1810 of a workbench application according to an embodiment of the invention. Example screen display 1810 is part of a wizard that gives the user a guided step-by-step interface for defining a job template. Example screen display 1810 illustrates an interface used to specify parameters for tasks of a distributed computing job.

In an embodiment, the workbench application provides graphical user interface for allowing the user to set requirements on the participation in the distributed computing job. The user may select minimum hardware or software requirements (e.g., minimum CPU clock speed, minimum amount of RAM, existence of a particular data set) that will be used by the agents on the computing resources to select particular jobs or tasks for execution.

In an embodiment, the workbench application provides graphical user interface for allowing users to set guidelines for the agents on computing resource for advising them on how to best execute a task in a distributed computing job. For example, the user can set the job to run one task per CPU simultaneously on a computing resource with multiple CPUs, or can tell the agent to execute multiple tasks simultaneously for very brief tasks. The user can specify in which directory the job should run, the priority of the job compared to other jobs in the system, whether or not standard out and standard error should be monitored and saved, and how tolerant of failure the agent should be (e.g. should it result in immediate job failure, or should the other agents continue to process work on this job).

Figure 18D:
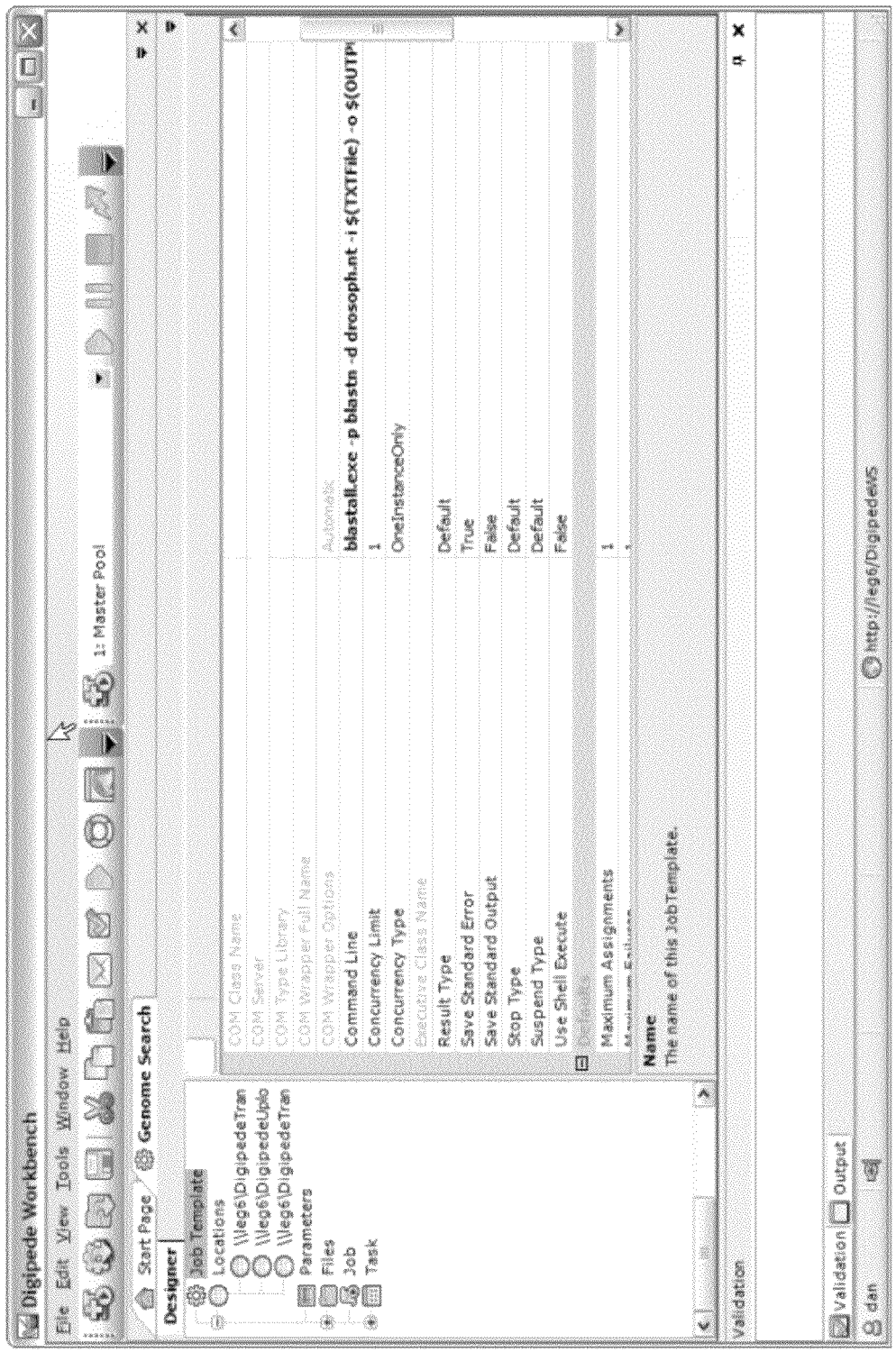

In an embodiment, a job template and one or more distributed computing jobs derived from the job template can be specified as one or more data files. In an embodiment, these data files store the parameters of a job in XML format. The data files can be created, viewed, and edited using text editors and other software applications adapted to process XML data. In an embodiment, the wizard and other user interface features of the workbench application can create the appropriate data files automatically. In a further embodiment, the workbench application includes a module that parses the data files defining a job template and/or a distributed computing job and provides a user interface for accessing, viewing, and modifying this data. FIG. 18D illustrates an example screen display 1820 of a workbench application according to an embodiment of the invention. Example screen display 1820 is part of a job designer user interface for directly accessing, viewing, and modifying the data defining job templates and associated distributed computing jobs. Example screen display 1820 provides a full representation of the XML data that defines a job template. An embodiment of the workbench application allows the user to create job templates and distributed computing jobs using the guided wizard interface, directly through the job designer user interface, or a combination of both.

In an embodiment, the workbench application provides a graphical user interface that allows users to validate a job. The validation process determines if the files associated with a job, such as a job template file and job file, are fully specified, that is, every task sets a value for its parameters and these values are internally consistent.

In an embodiment, the workbench application provides a graphical user interface that allows users to submit a job to the distributed processing system. In the event that a job does not submit successfully, an embodiment of the user interface provides feedback that explains what may have failed, such as an invalid user ID or a failed network connection.

In an embodiment, the workbench application provides a graphical user interface that allows a user to monitor a job running on the distributed computing system. This embodiment of the interface can give a progress indicator that shows how many of the tasks have been completed and how many tasks are currently being executed by computing resource. The workbench application can provide an estimate of the time of completion of the job based on the time taken to complete tasks thus far and the number of tasks yet to be executed.

In an embodiment, the workbench application provides a graphical user interface that allows the user to control a job running on the distributed computing system. This interface gives the user the ability to pause a running job (which indicates to the server that it should temporarily not allow any more tasks to be claimed by agents), to resume a paused job (allow the agents to begin claiming tasks again), to abort a job (permanently stop executing tasks on that job), and to resubmit a job.

In an embodiment, the workbench provides a graphical user interface that allows users to view information relating to the run of a distributed computing job. This information can include which computing resource ran an individual task, the start and end times of each task, the command line used to execute each task, any error information that was returned from each task.

Figure 19:
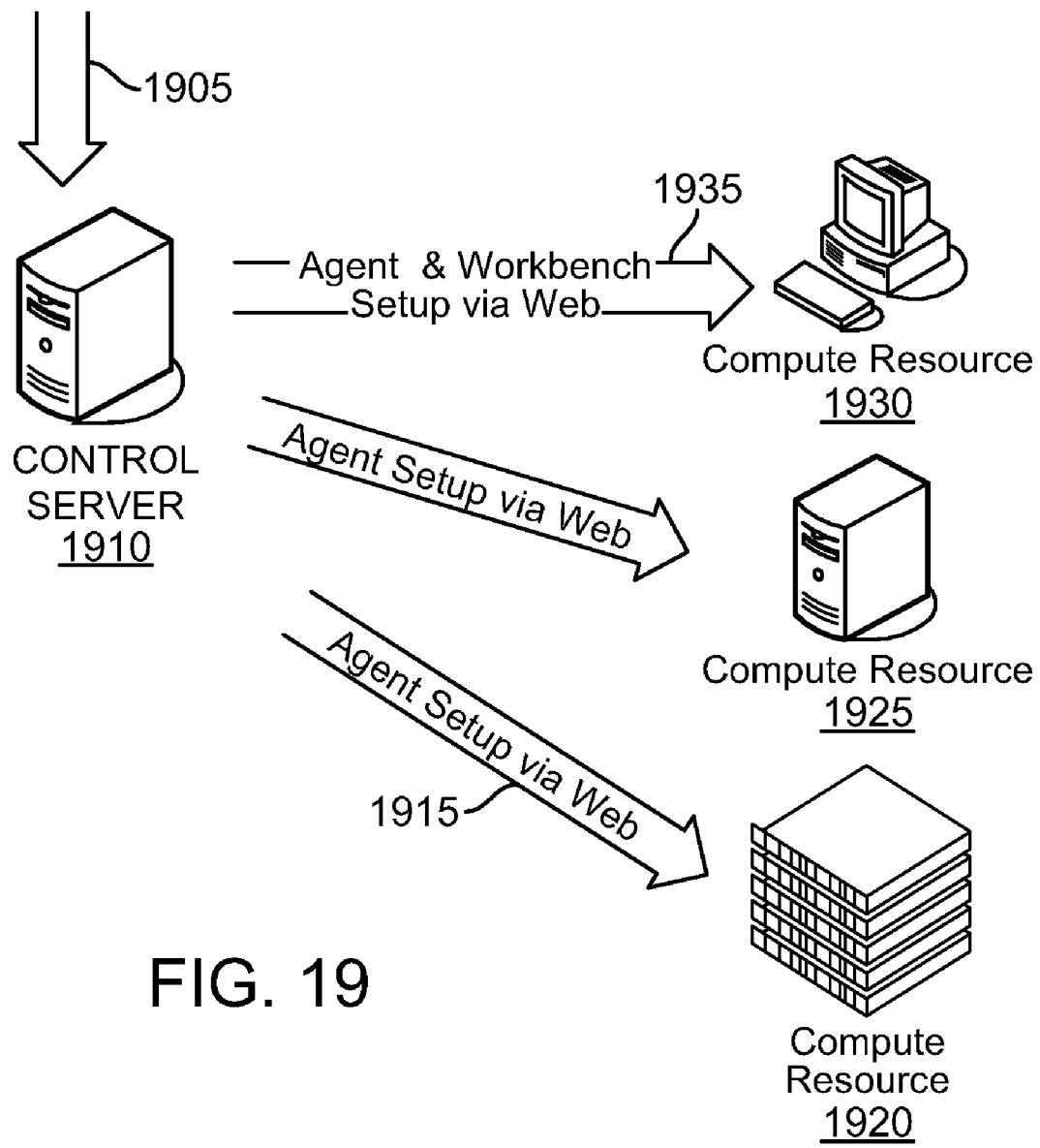
FIG. 19 illustrates a software installation process according to an embodiment of the invention.

In a further embodiment of the invention, a software installation and update process facilitates the creation and maintenance of distributed computing systems. FIG. 19 illustrates a software installation process according to an embodiment of the invention. At step 1905, an installation software package 1907 is loaded on to a computer 1910 that will be the control server for the distributed computing system. The installation software package 1907 is installed on the computer 1910. This installs the control server software on computer 1910, making computer 1910 a control server for the distributed computing system.

Additionally, the installation of the installation software package 1907 creates an installation web site on control server 1910. The installation web site is accessible to other computers connected with the control server 1910. The installation web site provides links to agent and workbench application installation programs.

To add a specific computer as a computing resource to the distributed computing system, at step 1915 the computer 1920 accesses the installation web site provided by control server 1910 to download the agent installation program. The agent installation program is then executed by computer 1920 to install the agent application and add computer 1920 as a computing resource of the distributed computing system. This step can be repeated for additional computers such as computers 1925 and 1930.

Additionally, workbench applications can be installed on computers to enable the creation and monitoring of distributed computing jobs. In an embodiment, a workbench application can be installed on some or all of the computers that are also computing resources of the distributed computing system. At step 1935, the computer 1930 accesses the installation web site provided by control server 1910 to download the workbench application installation program. The workbench application installation program is then executed by computer 1930 to install the workbench application.

In further embodiment, the installation of agent and workbench applications can be further automated using scripts in conjunction with management protocols to automatically retrieve and install agent and/or workbench applications from the installation web site of control server 1910.

Figure 20:
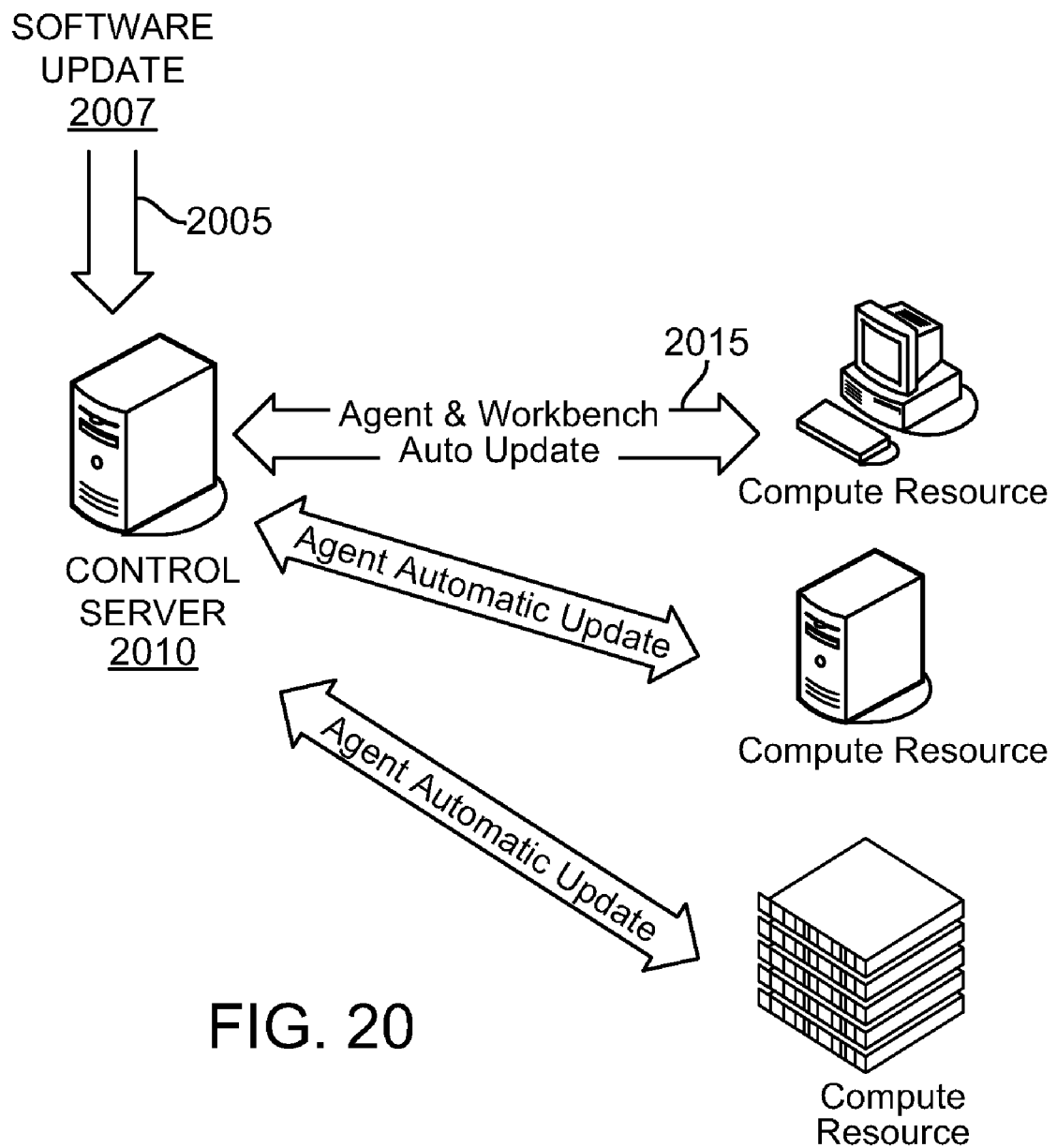
FIG. 20 illustrates a software update process according to an embodiment of the invention.

FIG. 20 illustrates a software update process according to an embodiment of the invention. At step 2005, a software update is loaded and installed on the control server 2010. Meanwhile, at step 2015, the agent software on each computing resource provides its software version to the control server 2010. This information can be reported prior to step 2005.

The control server 2010 provides a control interface, such as a control web site for managing the distributed computing system. Upon loading the software update on to the control server 2010, the control interface will enable a control input for initiating the update of agent software applications.

Upon initiating an update of agent software applications, an update job is added to the queue of pending distributed computing jobs. In response to an update job, agent applications on computing resources will compare its software version with the version provided by the control server. If an agent application on a computing resource is an older version than that provided by the control server, the agent application on the computing resource downloads and installs the updated agent application. In a further embodiment, if an error occurs during the installation, the agent application will automatically roll-back to its previous version.

A computing resource can include one or more processors, with each processor having one or more processor cores, with each processor and processor core capable of executing instructions and processing data independently of the other processors and/or processor cores. Embodiments of the distributed computing systems described above can be applied to multiprocessor and multicore computing resources without any modification, relying on the parallel processing capabilities native to each computing resource's operating system and to each work unit. Additionally, further embodiments of the invention can be adapted to specifically take advantage of multiple processors and multicore processors to further improve execution performance of applications by the distributed processing system.

Figure 21:
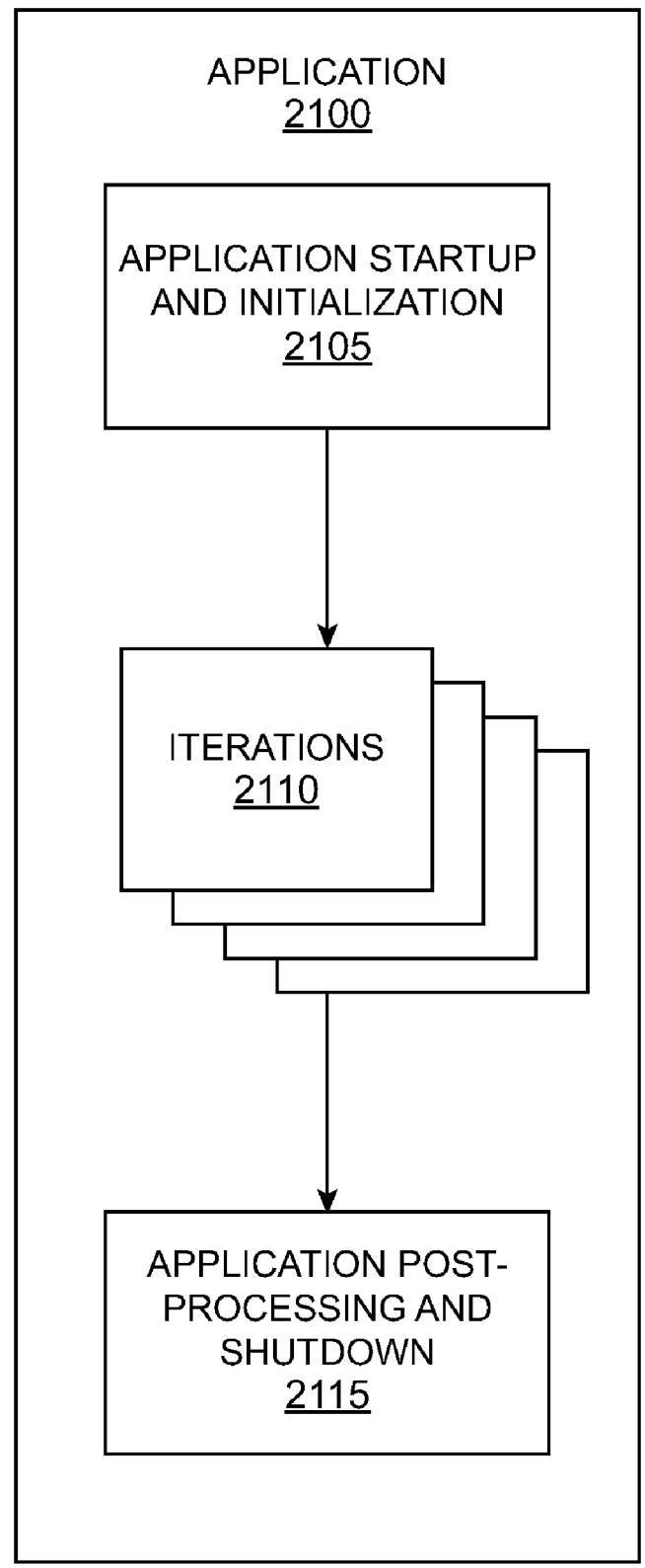
FIG. 21 illustrates typical execution phases of a parallel application.

FIG. 21 illustrates typical execution phases of a parallel application 2100. Parallel application has three execution phases: an application startup and initialization phase 2105, which performs any application initialization and preprocessing required by the application 2100; one or more loop iterations 2110, which perform the majority of data processing; and an application post-processing and shutdown phase 2115.

It should be noted that these execution phases are intended as general illustrations and these application execution phases can be composed sequentially into a larger applications and/or broken down into further parallel applications. For example, an application can include two sets of phases 2105, 2110, and 2115 executed sequentially. In another example, the application post-processing and shutdown phase 2115 could also be a parallel application in its own right, having its own initialization phase, one or more iterations for post-processing data, and a shutdown phase.

Additionally, example parallel application 2100 may be implemented either as a single process or many processes executing sequentially or in parallel. Additionally, a parallel application may re-run a single instance of a process to perform multiple iterations. Application processes may be single threaded, for example older applications that were not engineered for multiprocessor and multicore systems, or multi-threaded, requiring a fixed or variable number of threads.

Figure 22:
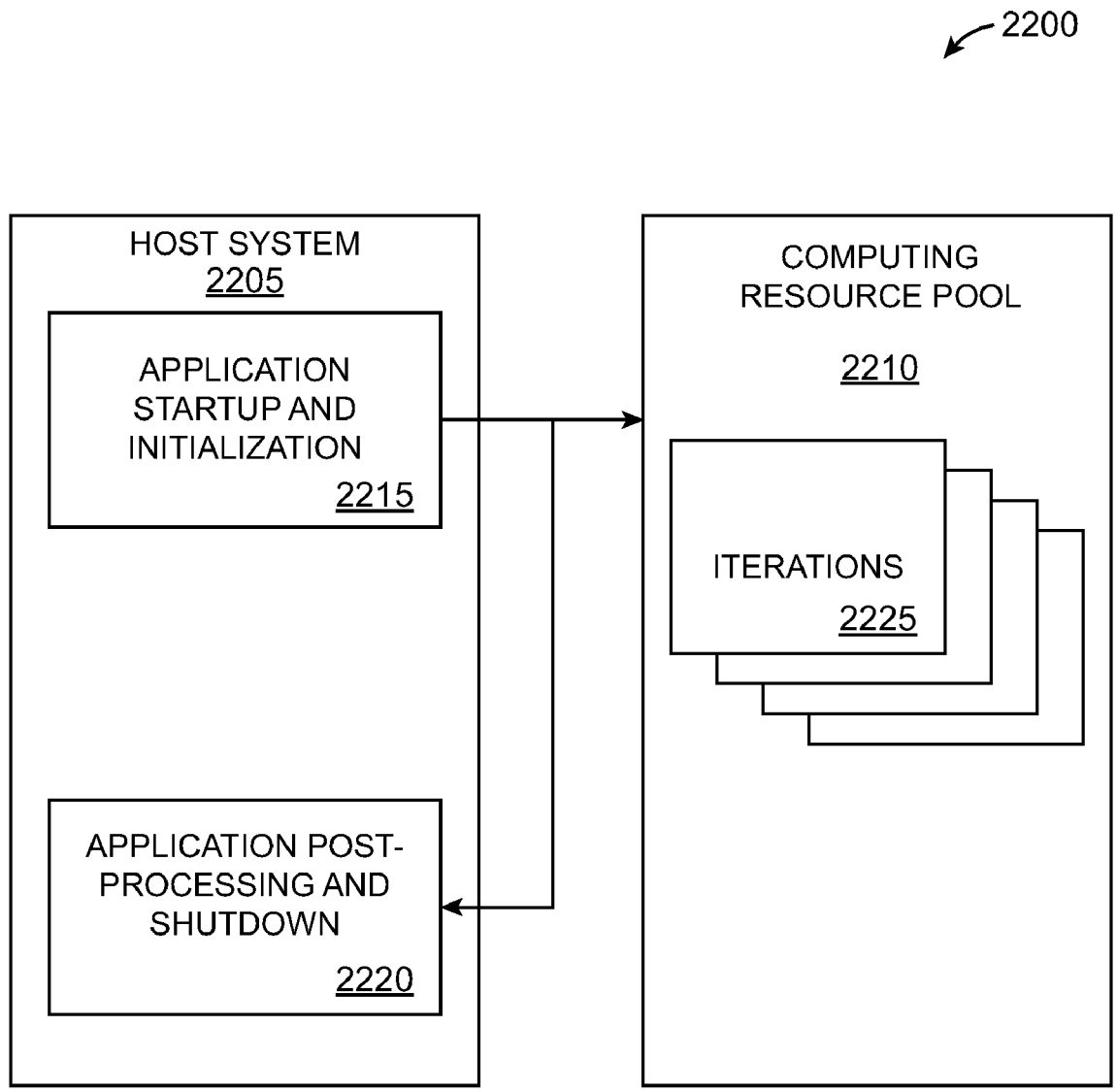
FIG. 22 illustrates an example allocation of application execution phases in a distributed processing system according to an embodiment of the invention.

FIG. 22 illustrates an example allocation of application execution phases in a distributed processing system 2200 according to an embodiment of the invention. Distributed processing system 2200 includes at least a host system 2205 adapted to initiate a job or set of work units using a parallel application. In this example, the job or set of work units is to be executed by the distributed processing system 2200. Distributed processing system 2200 also includes a computing resource pool 2210 including one or more computers available for processing work units.

The distributed processing system 2200 performs the application startup and initialization phase 2215 on the host system. In an embodiment, the distributed processing system 2200 generates one or more work units corresponding with the set of application iterations in the iterations phase 225. For example, each iteration of an application can be assigned to a separate work unit. Alternatively, multiple of application iterations can be assigned to a single work unit. This can be done if there are performance benefits or other optimizations resulting from performing multiple iterations of an application on the same computing resource, such as more efficient use of memory (e.g., overall space requirements, memory bus, or memory caches), reuse of data, or reduced network traffic.

The distributed processing system 2200 then distributes work units corresponding with iterations of the application to computing resources in the computing resource pool 2210 for execution by the computing resources. The computing resource pool 2210 may execute work units corresponding with application iterations partially or entirely in parallel by one or more computing resources of the computing resource pool 2210. The number of application iterations executed in parallel depends on the number and availability of computing resources in the computing resource pool 2210 as well as the requirements of the application.

After completing execution of their assigned work units, the computing resources of the computing resource pool 2210 return the results of the work units, corresponding with the results of the application iterations 2225, to the host system 2205. Host system 2205 then executes the application post-processing and shutdown phase 2220.

In further embodiments, the distributed processing system 2200 generates one or more work units for portions of the application startup and initialization phase 2215 and/or application post-processing and shutdown phase 2220. The distributed processing system 2200 then assigns these work units to computing resources in the computing resource pool, so that all or portions of the application startup and initialization phase 2215 and/or application post-processing and shutdown phase 2220 are performed by the computing resource pool rather than the host system 2205.

Figure 23:
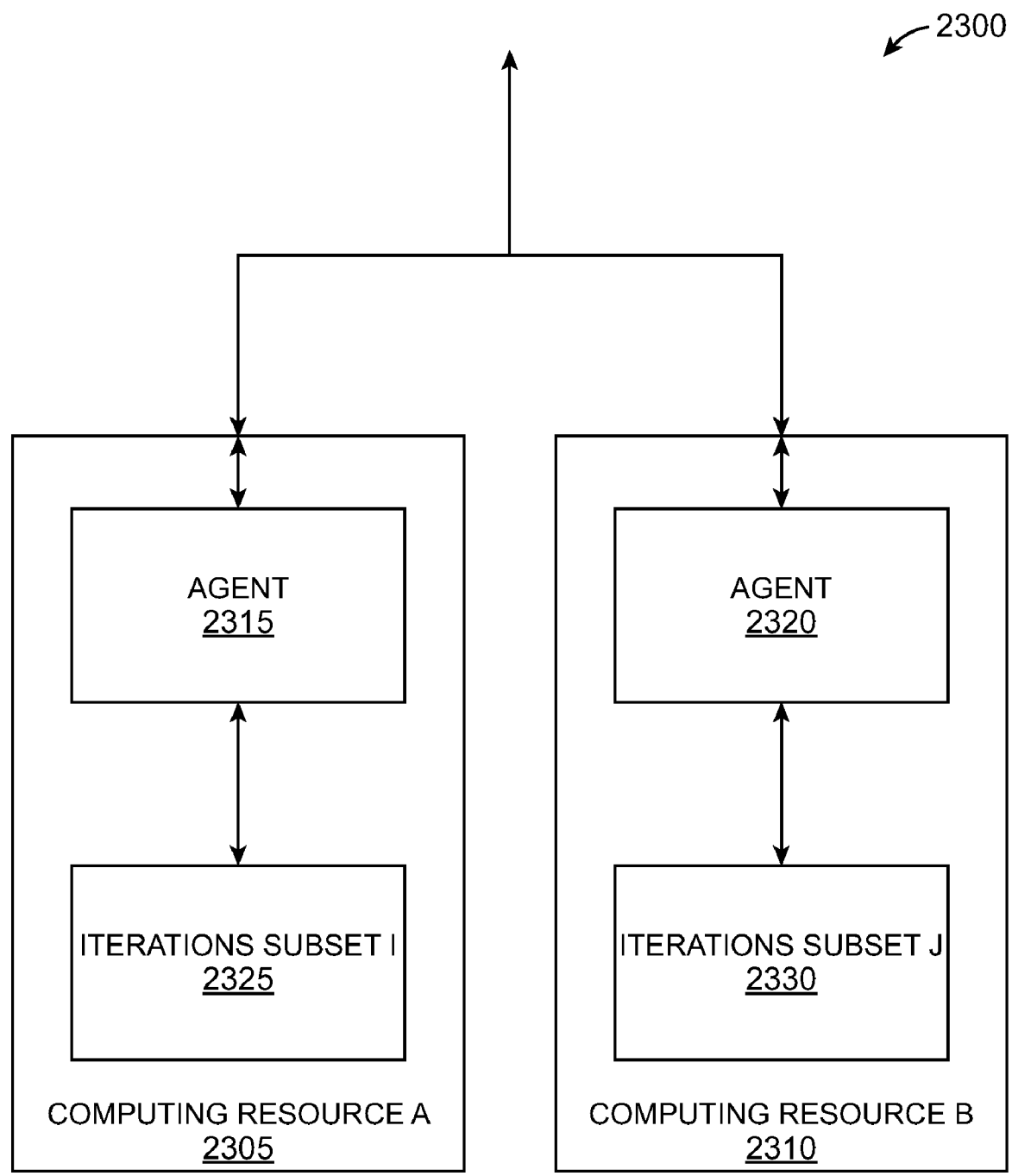
FIG. 23 illustrates an example allocation of application execution phases to multiprocessor and multicore computing resources according to an embodiment of the invention.

Work units corresponding to iterations of an application may be distributed to computing resources in a distributed processing system in a number of ways. FIG. 23 illustrates an example allocation 2300 of application execution phases to multiprocessor and multicore computing resources according to an embodiment of the invention. In example allocation 2300, computing resource A 2305 and computing resource B 2310 are included in a computing resource pool. An agent application 2315 executed by computing resource A 2305 selects work units to be executed by computing resource A 2305. Similarly, an agent application 2320 executed by computing resource A 2310 selects work units to be executed by computing resource A 2310.

In this example, agent 2315 selects one or more work units that include a first subset of the iterations of the application, iterations subset I 2325. Similarly, agent 2320 selects one or more work units that include a second subset of the iterations of the application, iterations subset J 2330. Iterations subsets I 2325 and J 2330 together comprise all or a portion of the iterations to be executed by the application. In this example allocation 2300, the iterations of the application are distributed to at least two computing resources 2305 and 2310 for execution. In further examples, the iterations of the application can be distributed to any arbitrary number of computing resources for execution.

As discussed above, the agent applications executed by computational resources select work units for execution. Although the methods discussed above are applicable to multiprocessor and multicore computing resources without any modification, instead relying on the parallel processing capabilities native to each computing resource's operating system, embodiments of the invention can be tailored to multiprocessor and multicore system to provide further performance improvements.

Figure 24:
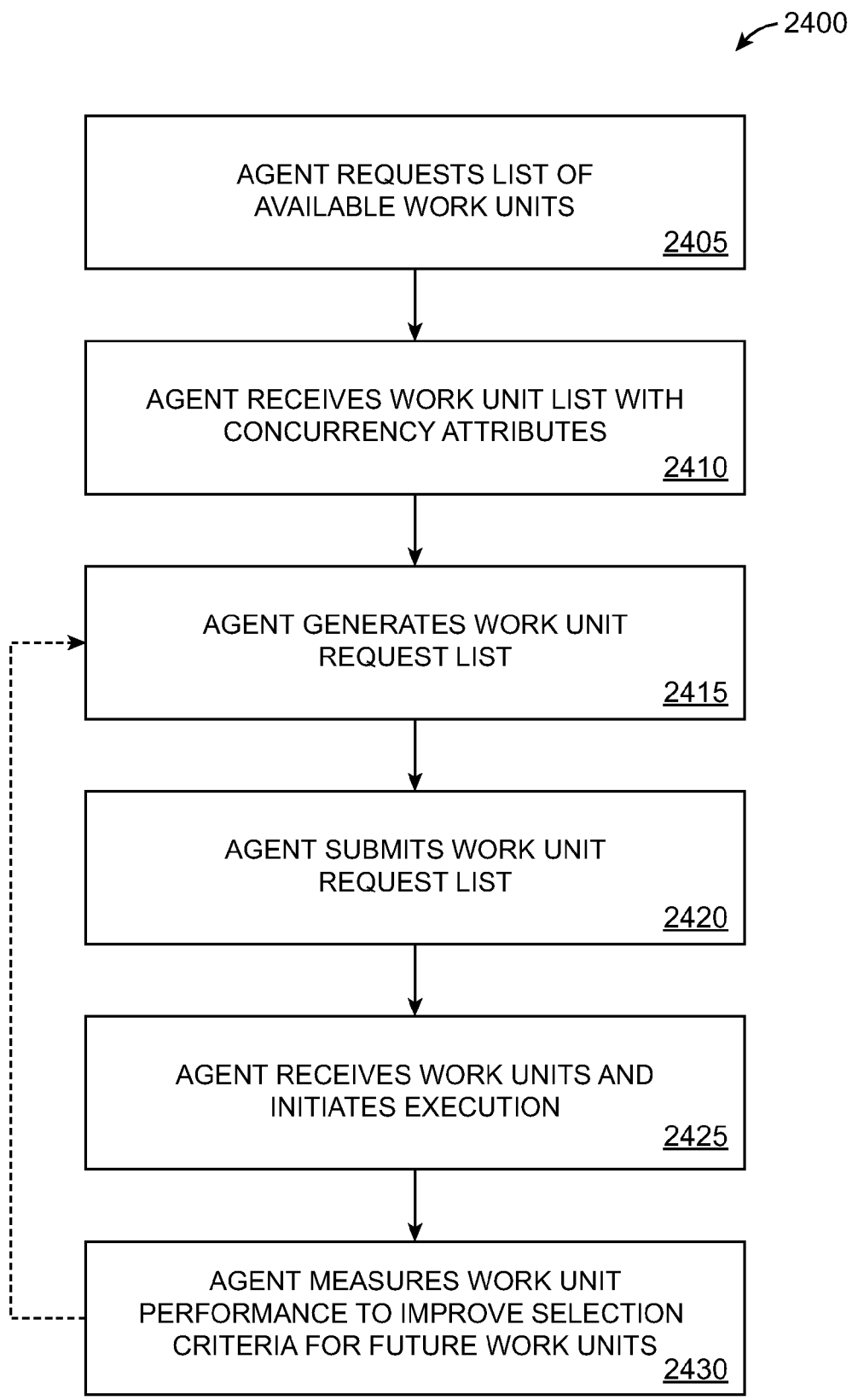
FIG. 24 illustrates a method of assigning work units associated with parallel application to multiprocessor and multicore computing resources according to an embodiment of the invention.

FIG. 24 illustrates a method 2400 of assigning work units associated with parallel application to multiprocessor and multicore computing resources according to an embodiment of the invention. In an embodiment, method 2400 is executed by an agent associated with at least one computing resource having multiple processors and/or processor cores.

In step 2405 of method 2400, an agent associated with a computing resource requests a list of available work units from a control server for the distributed processing system. In response to this request, the agent receives a work unit list from the control server in step 2410. In an embodiment, the work unit list provides information on the attributes or requirements of the work units included in the work unit list. Work unit attributes can include a Work unit ID; a sequence; a name; a Job ID; one or more File Overrides; substitution attributes; priority values; an affinity; and minimum hardware, software, and application and data requirements for processing the work unit.

In an embodiment, the work unit list also includes concurrency attributes for some or all of the work units included in the work unit list. Concurrency attributes specify how the work unit may be executed on a multiprocessor and/or multicore computing resource. Concurrency attributes can include a concurrency type and factor N. The concurrency factor N is an arbitrary positive integer and specifies either the number N of work units per computing resource; N work units-per processor and/or processor core; N cores-per work unit; or a variable number of cores with at least N processors and/or cores-per work unit and at most O processors and/or cores-per-work unit. For example, the concurrency attributes can be expressed as the number N of cores is per work unit. The concurrency attributes can also include a concurrency limit M, which is the total number of concurrent tasks per machine and may be any arbitrary integer.

In a further embodiment, concurrency attributes can include processor affinity and/or preference attributes. Processor affinity and preference attributes are optional attributes specifying that a work unit is to be executed by one or more specific logical processors. Examples of a logical processor include a single core of a multicore processor, a single thread of execution on a multi-threaded processor, or a single-core, single-threaded processor. Processor affinity and preference attributes can list a single logical processor, a set of logical processors, or a prioritized list of logical processors for executing work units.

Work units with processor affinity attributes will only be executed by a logical processor included in its processor affinity attributes. For work units with processor preference attributes, the distributed processing system will attempt to execute these work units on a logical processor included in the processor preference attributes, but may execute these work units on other logical processors if this is not possible or optimal.

In step 2415, the agent evaluates the work unit list, its attributes, and its concurrency attributes to determine a work unit request list specifying one or more work units that the agent would like to execute on its associated computing resource. In an embodiment, the work unit request list is an ordered list of the work units based on the capabilities of the computing resource and the attributes of the work units.

In an embodiment, the agent selects and prioritizes work units to create the work unit request list by first determining the number A of processors and/or processor cores available on the computing resource for executing work units on the distributed processing system. In a further embodiment, the agent may reserve one or more processors and/or processor cores for the computing resource, making these processors and/or processor cores unavailable for executing work units from the distributed processing system.

After determining the number of available processors and/or processor cores in the computing resource, the agent analyzes the concurrency attributes of each work unit on the work unit list. For each work unit on the work unit list, the agent determines the minimum number NN and maximum number OO of processors and/or processor cores that the work unit may require for execution. If the minimum number NN of processors and/or processor cores for a work unit exceeds the number A of available processors and/or processor cores, then this work unit is removed from further consideration.

In a further embodiment, work units are monitored during execution on a computing resource by the agent to determine utilization of processors and processor cores. In this embodiment, the agent determines the typical processor and processor core utilizations for the applications associated with work unit. When evaluating the work unit list to select additional work units for execution, the agent may adjust the concurrency attributes of a work unit based on the previously determined typical processor and processor core utilizations for its associated applications. For example, an agent may determine that a work unit associated with a financial analysis application will typically utilize two processor cores efficiently. If the work unit list includes a work unit associated with this financial analysis application, the agent will adjust the concurrency attributes of this work unit so that the minimum number of processor cores required is two.

After the agent removes from consideration work units that require too many processors and/or processor core for the agent's associated computing resource, the agent then prioritizes the remaining work units on the work unit list using: the scheduling algorithm in use on the pool of computing resources (e.g., FIFO, weighted priorities, etc.); the existence of the associated applications and application data already stored and installed on the computing resource; and previous executions of other work units from the same job.

Following the creation of the work unit request list by the agent in step 2415, in step 2420 the agent submits the work unit request list to the control server. In an embodiment, the work unit request list includes the number A of available processors and processor cores on the computing resource as well as the concurrency attributes of each work unit on the work unit request list. In embodiments where the agent adjusts the concurrency attributes of work units based on previous executions of similar work units, the work unit request list can include this adjusted concurrency data.

In response to the work unit request list, the control server selects work units for execution by the computing resource associated with the agent. In an embodiment, the control server selects work units from the work unit request list to attempt to use all of the available processors and processor cores. Additionally, the control server may select work units according to work unit or job priority. The control server then sends the selected work units to the agent for execution by the computing resource.

In step 2425, the agent receives the selected work units and initiates their execution on the computational resource. In an embodiment, the agent starts the application or applications associated with the selected work units on the computing resource. The application is started or initialized with the input data, parameters, and/or other instructions required to execute the selected work units. Alternatively, if the computing resource is already executing an application associated with a work unit, the agent can direct the application to begin executing the work unit as soon as the application is available.

Once the agent initiates execution of the work units in step 2425, in optional step 2430 the agent monitors the execution of work units on the computing resource. The agent may monitor the execution of the work units and associated applications on the computing resource for accounting purposes. In an additional embodiment, as discussed above, the agent tracks the work units utilization of processors and processor cores and compares it against the concurrency attributes of the work unit. This measured utilization is then stored for later use in selecting work units in step 2415. This "learning" allows for agents to self-improve their utilization, and throughput through better work unit selection.

There is a balance in parallel applications between the simple application model (e.g., a reusable process that executes one task and then exits) and a larger monolithic multithreaded application (e.g., one process with many threads performing many tasks in parallel). A simple application model may rely on the operating system for memory isolation at some cost to efficiency. For example, simple application model processes can have significant startup time, can be tracked individually by the operating system, and require some dedicated memory. On the other hand, the monolithic multithreaded application, while having a relatively smaller memory and resource footprint, is much harder to program correctly and maintain. In addition, such an investment in converting simple model applications to monolithic multithreaded applications may not yield benefits when scaled-out to a distributed processing system.

An embodiment of the invention blurs the distinction between simple model application processes, which may or may not be thread-safe, and monolithic, multithreaded applications making use of multiple processors, processor cores and operating system processes. This allows developers and users to use one application model for all of their computation needs, from single computer systems to distributed processing systems.

In an embodiment, developers can define the application hosting behavior of applications using an API. The application hosting behavior defines how the application should be executed by a multiple processor and/or multiple core computing resource. In an embodiment, the application hosting behavior for jobs and work units is specified by an API used to develop and deploy applications in the distributed processing system.

Table 1 lists example application hosting behaviors in order from least thread safe to most thread safe. Additionally, if the application is using the Microsoft .NET environment, then .NET AppDomain structures may be used to isolate work units within a process with reduced overhead. This allows multiple non-thread-safe .NET applications or instances of an application to be executed within the same process.

TABLE 1

Application Hosting Behaviors

| Application Hosting Behavior | Application type |
|---|---|
| Execute one work unit per process. Execute concurrent work units with multiple processes. Discard each process after it completes a single work unit. | Not thread-safe, either not re-entrant or not durable. |
| Execute one work unit per process. Execute concurrent work units with multiple processes. Reuse each process for subsequent work units. | Not thread-safe, re-entrant and durable. |
| Execute all work units in one process. Execute one work unit per .NET AppDomain. Execute concurrent work units with multiple .NET AppDomains. Discard each .NET AppDomain after it completes a single work unit. | Not thread-safe (however, using "safe" .NET code, thread-safe at the process level). Not re-entrant, though durable. |
| Execute all work units in one process. Execute one work unit per AppDomain. Execute concurrent work units with multiple AppDomains. Reuse each AppDomain after it completes a single work unit. | Not thread-safe (however, using "safe" .NET code, thread-safe at the process level). Re-entrant and durable. |
| Execute all work units in one process. | Thread-safe. Re-entrant. Durable. |

In an embodiment, applications can be associated with properties and/or attributes that define the concurrency and application hosting behavior for the application. In this embodiment, the distributed processing system can automatically evaluate these properties and/or attributes associated with applications and execute the applications in the most appropriate manner.

In an embodiment, concurrency and application hosting behavior is defined in a declarative manner by application developers within the application source code and related files. This allows developers to "pre-configure" their applications for execution by distributed processing systems. This simplifies deployment of applications, because applications are automatically configured for the distributed processing system.

In addition, application developers can specify concurrency and application hosting behavior using attributes defined outside the application. These attributes can be associated with applications at any time and are evaluated by the distributed processing system at runtime. This allows developers to specify the concurrency and application hosting behavior of applications without having to access or modify the application source code. Using attributes, as opposed to declarative properties, is useful for legacy applications not originally intended for distributed processing systems where accessing and/or modifying the source code is impractical or impossible.

Table 2 lists example declarative properties for defining concurrency data and application hosting behavior. Table 3 lists example attributes properties for defining concurrency data and application hosting behavior. In an embodiment, either the declarative properties or attributes can be used to configure applications, which gives developers flexibility in creating and deploying applications for the distributed processing system.

TABLE 2

| Application Declarative Properties | |
|---|---|
| Per Application Properties | |
| Concurrency Type | TasksPerCore, CoresPerTask, DynamicCores, TasksPerComputer |
| Concurrency Limit (i.e., N) | Meaning is dependent on the Concurrency Type. |
| Concurrency Maximum (i.e., O) | |
| TaskLimit (i.e., M) | |
| ProcessHosting | One, ManyReusable, ManySingleUse |
| AppDomainHosting | One, ManyReusable, ManySingleUse |
| Per Job Properties | |
| ConcurrencyLimit/ ConcurrencyMaximum | Here to allow for override over job. |
| Per Work Unit Properties | |
| ConcurrencyLimit (N) | Per-task override, for use in the DynamicCores case. |

TABLE 3

| Application Attributes | |
|---|---|
| Per Application Attributes | |
| JobTemplateConcurrencyAttribute | Includes all of the per-application properties. |
| Per Job Attributes | |
| JobConcurrency Attribute | Includes all of the per-job properties. |
| Per Work Unit Attributes | |
| TaskConcurrency Attribute | Includes all of the per-task properties. |

As discussed above, applications may be executed by multiple computing resources in a distributed processing system to improve performance. In a further embodiment, the distributed processing system can be used to improve performance of applications on a single computing resource with multiple processors and processor cores. This embodiment uses similar techniques for defining jobs and work units. In this embodiment, a combined control server and agent module distributes the work units corresponding to the phases of the application execution to one or more processors or processor cores. Each processor or processor core executes a different instance of the single-threaded application to process its assigned work units. In this manner, the single-threaded application is transformed into a multithreaded application and performance is improved.

Figure 25:
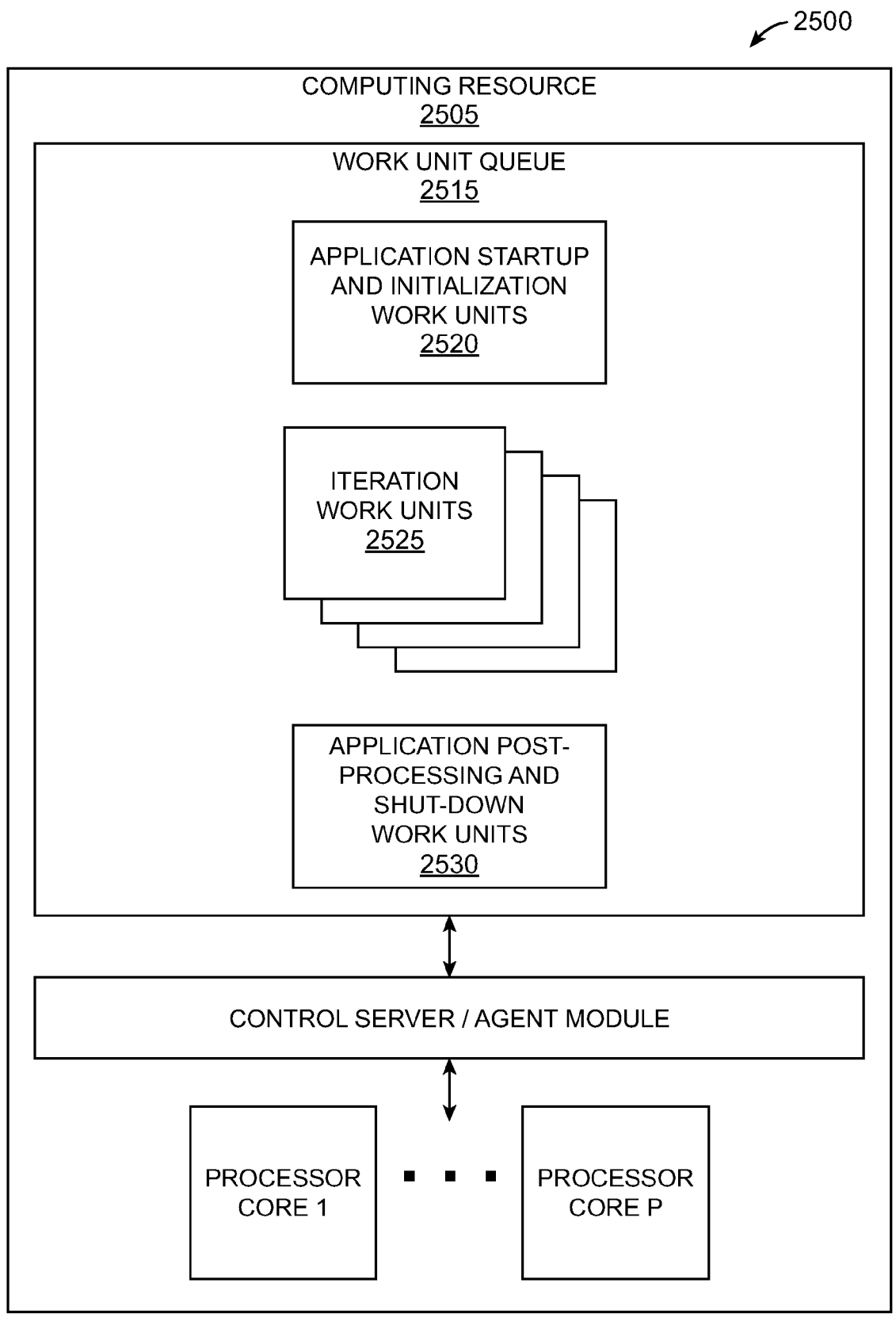
FIG. 25 illustrates a system for repurposing applications to efficiently utilize multiprocessor and multicore computing resources according to an embodiment of the invention.

FIG. 25 illustrates a system 2500 for repurposing applications to efficiently utilize multiprocessor and multicore computing resources according to an embodiment of the invention. System 2500 includes a computing resource 2505 having P processor cores 2510, including processor cores 2510a and 2510b, where P is any arbitrary positive integer greater than one. All or a portion of the processor cores 2510 may be part of the same processor. Additionally, some of the processor cores 2510 may be part of separate single core or multi-core processors.

Using the techniques described above, a single-threaded or multithreaded application can be converted to a set of work units corresponding with the execution phases of the application. Computing resource 2505 includes a work unit queue 2515 adapted to store this set of work units, including one or more application startup and initialization work units 2520, one or more application iterations work units 2525, and one or more application post-processing and shut-down work units 2530.

In an embodiment, a combined control server and agent module 2535 is adapted to select work units from work unit queue 2515 and distribute these work units for execution to the processor cores 2510. In an embodiment, the combined control server and agent module 2535 uses the selection and prioritization schemes similar to those discussed above. However, because system 2500 is implemented within a single computing resource 2505, embodiments of system 2500 can use faster and relatively lightweight internal communication systems, such as interprocess communication systems, rather than slower and high overhead networking protocols, for communicating work unit data, applications, status and control messages, and any other instructions or data within system 2500.

Embodiments of system 2500 can improve the performance of applications executed on a single computing resource by maximizing the utilization of multiple processors and processor cores on this computing resource. For example, the application may be a single-threaded application that does not natively support multiple processors and processor cores. In this example, system 2500 creates multiple work units corresponding with different iterations of the application. Each work unit is implemented as a separate instance of the application. System 2500 can then direct different processors or processor cores to execute two or more of these work units in parallel by simultaneously executing separate instances of the application with the parameters and data associated with each work unit. This example allows a single-threaded application to take advantage of multiple processors and processor cores without modifying the application itself.

In another example, the application may be a multi-threaded application that supports a limited number Q of processor cores, where Q is any arbitrary positive integer greater than one. If the number of processor cores Q supported by the application is less than the number of processor cores P available in the computing resource 2505, then P-Q processors or processor cores in computing resource 2505 may be idle during the application execution. For example, if an application supports 4 processor cores and a computing resource has 64 processor cores available, then 60 cores in the computing resource may be unused by the application.

To effectively utilize all of the processors and/or processor cores in a computing resource, this example of system 2500 creates multiple work units corresponding with different iterations of the application. Each work unit is implemented as a separate instance of the application. Additionally, each work unit is configured to utilize multiple processor cores, such as the maximum number of processor cores supported by the application. System 2500 can then direct groups of different processors or processor cores to execute two or more of these work units in parallel by simultaneously executing separate instances of the application with the parameters and data associated with each work unit. This example allows a multi-threaded application to fully take advantage of all of the processors and processor cores of a computing resource without modifying the application itself.

In a further embodiment, system 2500 can be augmented with additional computing resources at any time. In this embodiment, a job and a corresponding set of work units can be created by a first computing resource. As these work units are being executed by the first computing resource, one or more additional computing resources can be added to the pool of available computing resources. Each additional computing resource is associated with an agent application. Similar to the embodiments discussed above, when additional computing resources are added to the pool of available computational resources, their associated agents contact the combined control server and agent module 2535 to request work units for execution in a manner similar to that discussed in method 2400. In response to these requests, the combined control server and agent module 2535 distributes some of the work units from the work unit queue 2515 to these additional computing resources for execution.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of processing data in a distributed computing system, the method comprising:
    receiving, by a multiprocessor and/or multi-processor core computing resource included in a distributed computing system and from a control server, a list of available work units, wherein the list of available work units includes concurrency attributes associated with the available work units, wherein the concurrency attributes specify how at least a portion of the available work units may be executed on the multiprocessor and/or multi-processor core computing resource having greater than a minimum hardware configuration as specified by at least one attribute associated with the work unit;
    determining a selection of at least one of the available work units from the list of available work units based on the concurrency attributes;
    communicating the selection with the control server;
    receiving, by the computing resource, at least one work unit assignment from the control server, wherein the work unit assignment is associated with at least one of the available work units included in the selection; and
    performing, by the computing resource included in the distributed computing system, the work unit assignment;
    wherein determining a selection includes:
    determining parallel processing characteristics of at least the computing resource;
    comparing the concurrency attributes of the available work units with the parallel processing characteristics to identify concurrency attributes of the available work units that are compatible with the parallel processing characteristics; and
    determining the selection of available work units based on the comparison of the concurrency attributes with the parallel processing characteristics.

2. The method of claim 1, wherein the parallel processing characteristics include the number of processors of the computing resource available for use in the distributed computing system.

3. The method of claim 1, wherein the parallel processing characteristics include the number of processor cores of the computing resource available for use in the distributed computing system.

4. The method of claim 1, wherein the concurrency attributes include a minimum number of processor cores required to execute a work unit.

5. The method of claim 1, wherein the concurrency attributes include a maximum number of processor cores required to execute a work unit.

6. The method of claim 1, wherein comparing the concurrency attributes of the available work units comprises:
    identifying an application associated with at least one of the available work units;
    retrieving performance data determined from monitoring a previous execution of at least one prior work unit associated with the application specifying typical execution performance of the application by the computing resource;
    modifying the concurrency attributes of the available work unit associated with the application based on the retrieved performance data; and
    comparing the modified concurrency attributes of the available work unit with the parallel processing characteristics of the at least one computing resource.

7. The method of claim 1, further comprising:
    monitoring the performance of the work unit assignment;
    identifying an application associated with the work unit assignment;
    generating performance data specifying typical execution performance of the application by the computing resource; and
    storing the performance data for use in selecting an additional work unit.

8. A distributed processing system comprising:
    a distributed processing pool including at least one computing resource including multiple processor cores;
    a control server including a job queue adapted to coordinate the processing of at least one job including at least two work units by the computing resource of the distributed processing pool; and
    at least one agent executed by the computing resource of the distributed processing pool and adapted to initiate execution of the two work units in parallel by the multiple processor cores included in the computing resource according to an application hosting behavior associated with the work units;
    wherein the agent is adapted to initiate execution of the work units by the computing resource using a single process for the work units, wherein each work unit is executed in a separate application domain within the process;
    wherein the application hosting behavior is specified via a distributed processing system application programming interface.

9. The distributed processing system of claim 8, wherein the application hosting behavior indicates that the work units are not thread-safe.

10. The distributed processing system of claim 9, wherein the application hosting behavior indicates that the work units are not re-entrant or not durable.

11. The distributed processing system of claim 10, wherein the agent is adapted to initiate execution of the work units by the computing resource using a single process for each work unit and to terminate each process after the execution of its work unit is complete.

12. The distributed processing system of claim 9, wherein the application hosting behavior indicates that the work units are re-entrant and durable.

13. The distributed processing system of claim 12, wherein the agent is adapted to initiate execution of the work units by the computing resource using a single process for each work unit and to reuse each process after the execution of its work unit is complete to execute additional work units.

14. The distributed processing system of claim 8, wherein the application domain is a .NET AppDomain.

15. The distributed processing system of claim 8, wherein the agent is adapted to terminate each application domain after the execution of its work unit is complete.

16. The distributed processing system of claim 8, wherein the agent is adapted to reuse each application domain after the execution of its work unit is complete to execute additional work units.

17. The distributed processing system of claim 8, wherein the application hosting behavior indicates that the work units are thread safe and the agent is adapted to initiate execution of the work units by the computing resource using a single process for the work units.

18. A distributed processing system comprising:
a distributed processing pool including at least one computing resource including multiple processor cores;
a control server including a job queue adapted to coordinate the processing of at least one job including at least two work units by the computing resource of the distributed processing pool; and
at least one agent executed by the computing resource of the distributed processing pool and adapted to initiate execution of the two work units in parallel by the multiple processor cores included in the computing resource according to an application hosting behavior associated with the work units;
wherein the agent is adapted to initiate execution of the work units by the computing resource using a single process for the work units, wherein each work unit is executed in a separate application domain within the process;
wherein the application hosting behavior is specified via a distributed processing system application programming interface;
wherein the application hosting behavior is specified via a declarative property of an application associated with a work unit.

19. A computing system comprising:
a computing resource including at least two processor cores;
a work unit queue adapted to coordinate the processing of work units by the processor cores of the computing resource, wherein the work unit queue includes work units corresponding with an application startup and initialization phase, an iteration phase, and an application post-processing and shut-down phase of an application; and
a combined control server and agent module adapted to be executed by the computing resource and to initiate execution of the work units included in the work unit queue by the processor cores;
wherein the work unit queue is adapted to be operated by the combined control server and agent module;
wherein at least a portion of the work units included in the work unit queue are associated with application hosting behaviors specifying how the portion of the work units may be executed on the computing resource having greater than a minimum hardware configuration; and
wherein the application hosting behavior are defined in a declarative manner in at least one application to be executed by the portion of the work units.

20. The computing system of claim 19, wherein at least a portion of the work units correspond with separate instances of a single-threaded application.

21. The computing system of claim 19, wherein at least a portion of the work units correspond with separate instances of a multi-threaded application supporting a first number Q of processor cores, wherein the computing resource includes a second number P of processor cores, wherein the second number P is greater than the first number Q.

22. The computing system of claim 19, further comprising:
an additional computing resource; and
an additional agent module adapted to operate on the additional computing resource;
wherein the combined control server and the agent module is adapted to receive a work unit request from the additional agent module and to distribute at least a portion of the work units included in the work unit queue to the additional agent for execution by the additional computing resource.

23. The method of claim 1, wherein the concurrency attributes include a concurrency type.

24. The method of claim 6, wherein the performance data includes a measure of processor utilization of at least one computing resource previously executing the at least one prior work unit.

25. The method of claim 24, wherein modifying the concurrency attributes of the available work unit associated with the application based on the retrieved performance data comprises:
modifying a minimum number of required processors specified by the concurrency attributes of the available work unit based on the processor utilization included in the performance data.

* * * * *